US011477493B2

(12) United States Patent
Xu et al.

(10) Patent No.: US 11,477,493 B2
(45) Date of Patent: Oct. 18, 2022

(54) ADAPTATION FOR ENTROPY CODING OF BLOCKS OF IMAGE DATA

(71) Applicant: GOOGLE INC., Mountain View, CA (US)

(72) Inventors: Ruijie Xu, Sunnyvale, CA (US); Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 301 days.

(21) Appl. No.: 15/671,595

(22) Filed: Aug. 8, 2017

(65) Prior Publication Data
US 2019/0045226 A1     Feb. 7, 2019

Related U.S. Application Data

(63) Continuation of application No. 15/668,745, filed on Aug. 4, 2017.

(51) Int. Cl.
| | | |
|---|---|---|
| *H04N 19/124* | (2014.01) | |
| *H04N 19/91* | (2014.01) | |
| *H04N 19/44* | (2014.01) | |
| *H04N 19/60* | (2014.01) | |
| *H04N 19/176* | (2014.01) | |

(Continued)

(52) U.S. Cl.
CPC ........... *H04N 19/91* (2014.11); *H04N 19/124* (2014.11); *H04N 19/129* (2014.11); *H04N 19/159* (2014.11); *H04N 19/176* (2014.11); *H04N 19/44* (2014.11); *H04N 19/60* (2014.11)

(58) Field of Classification Search
CPC .. H04N 19/124; H04N 19/129; H04N 19/159; H04N 19/176; H04N 19/44; H04N 19/60; H04N 19/91
See application file for complete search history.

(56) References Cited

U.S. PATENT DOCUMENTS

| 5,500,678 A | 3/1996 | Puri |
|---|---|---|
| 5,767,909 A | 6/1998 | Jung |
| 8,140,121 B2 | 3/2012 | Matsukura et al. |

(Continued)

OTHER PUBLICATIONS

Bankoski, et al., "Technical Overview of VP8, An Open Source Video Codec for the Web", Jul. 11, 2011, 6 pp.

(Continued)

*Primary Examiner* — Shadan E Haghani
(74) *Attorney, Agent, or Firm* — Young Basile Hanlon & MacFarlane, P.C.

(57) ABSTRACT

Systems and methods are disclosed for entropy coding of blocks of image data. For example, methods may include partitioning a block of video data into a plurality of groups of elements; decoding, using an entropy decoder, data from an encoded bitstream to obtain, using a first scan order, elements of a first group from the plurality of groups of elements, wherein the first group includes elements forming a triangle in a corner of the block, and wherein the triangle includes elements of a first row and elements of a first column of the block; determining, based on the elements of the first group, a second scan order for a second group from the plurality of groups of elements; and decoding, using the entropy decoder, data from the encoded bitstream to obtain, using the second scan order, elements of the second group from the plurality of groups of elements.

17 Claims, 26 Drawing Sheets

(51) Int. Cl.
*H04N 19/129* (2014.01)
*H04N 19/159* (2014.01)

(56) References Cited

U.S. PATENT DOCUMENTS

| | | | |
|---|---|---|---|
| 8,311,119 B2 | 11/2012 | Srinivasan | |
| 9,197,890 B2 | 11/2015 | Sole Rojals et al. | |
| 9,386,306 B2 | 7/2016 | Tu et al. | |
| 9,445,093 B2 | 9/2016 | Zheng et al. | |
| 9,712,830 B1 | 7/2017 | Horn et al. | |
| 9,832,745 B2* | 7/2017 | Horn | H04N 19/124 |
| 9,832,475 B1 | 11/2017 | Horn et al. | |
| 2011/0206135 A1* | 8/2011 | Drugeon | H04N 19/176 375/240.24 |
| 2012/0230417 A1 | 9/2012 | Sole Rojals et al. | |
| 2012/0236931 A1* | 9/2012 | Karczewicz | H04N 19/132 375/240.02 |
| 2013/0054162 A1* | 2/2013 | Smith | G01R 15/142 702/59 |
| 2013/0083857 A1* | 4/2013 | Zheng | H04N 19/176 375/240.18 |
| 2015/0078432 A1 | 3/2015 | Wang et al. | |
| 2016/0080749 A1 | 3/2016 | He et al. | |
| 2016/0277746 A1* | 9/2016 | Fu | H04N 19/176 |
| 2017/0118473 A1 | 4/2017 | Thirumalai et al. | |
| 2017/0142448 A1 | 5/2017 | Karczewicz et al. | |
| 2017/0280163 A1* | 9/2017 | Kao | H04N 19/176 |
| 2018/0352232 A1 | 12/2018 | Filippov et al. | |

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Sole, Joel et al.; "Transform coefficient coding in HEVC"; IEEE Transactions on Circuits and Systems for Video Technology; Dec. 2012; pp. 1-12.
International Search Report and Written Opinion in PCT/US2018/030346, dated Jul. 4, 2018, 14 pgs.
J. Sole et al., "Unified scans for the significance map and coefficient level coding in high coding efficiency", JCT-VC Meeting; 96.MPEG Meeting; Mar. 16, 2011-Mar. 23, 2011; Geneva;(Joint Collaborative Team on Video Coding of ISO/IEC JTC1/SC29/WG11 and ITU-T SG.16 ); URL: http://wftp3.itu.int/av-arch/jctvc-site/, No. JCTVC-E335, Mar. 11, 2011, pp. 1-5.
Tung Nguyen et al., "Improved Context Modeling for Coding Quantized Transform Coefficients in Video Compression", 28th Picture Coding Symposium, PCS2010, Dec. 8-10, 2010, Nagoya, Japan, pp. 378-381.

* cited by examiner

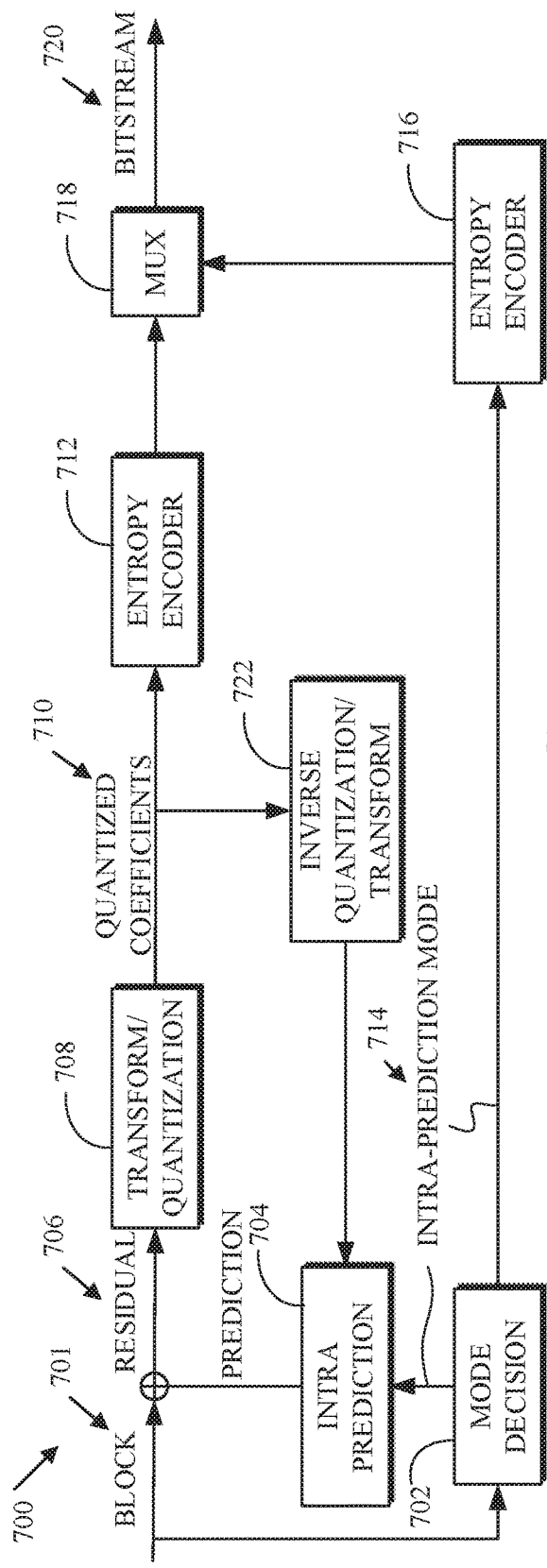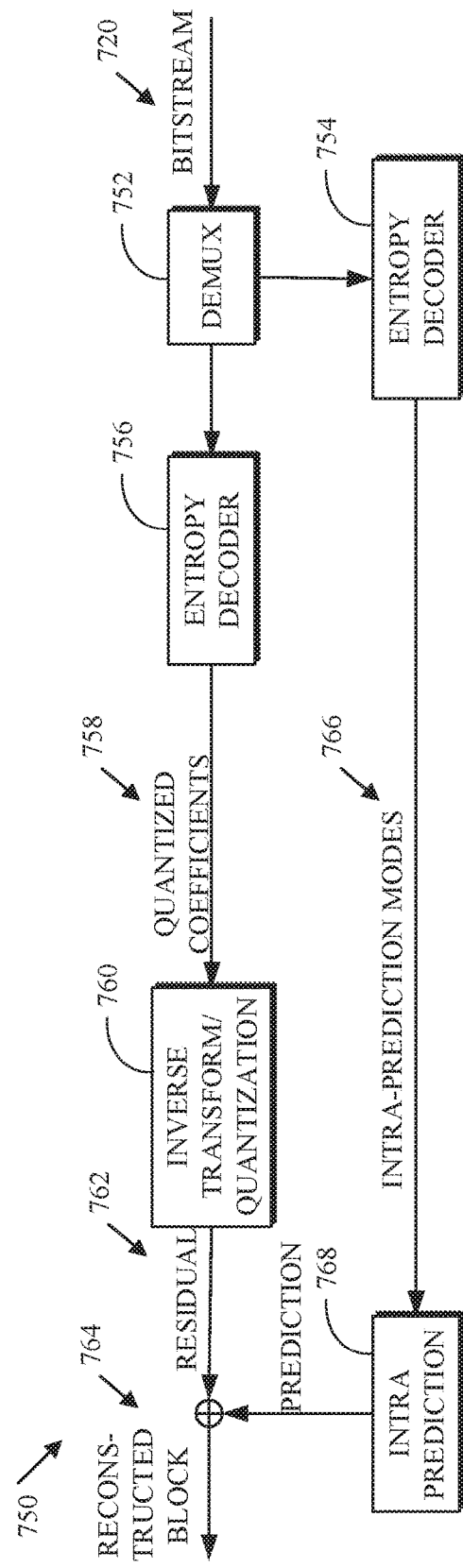
FIG. 7A
FIG. 7B

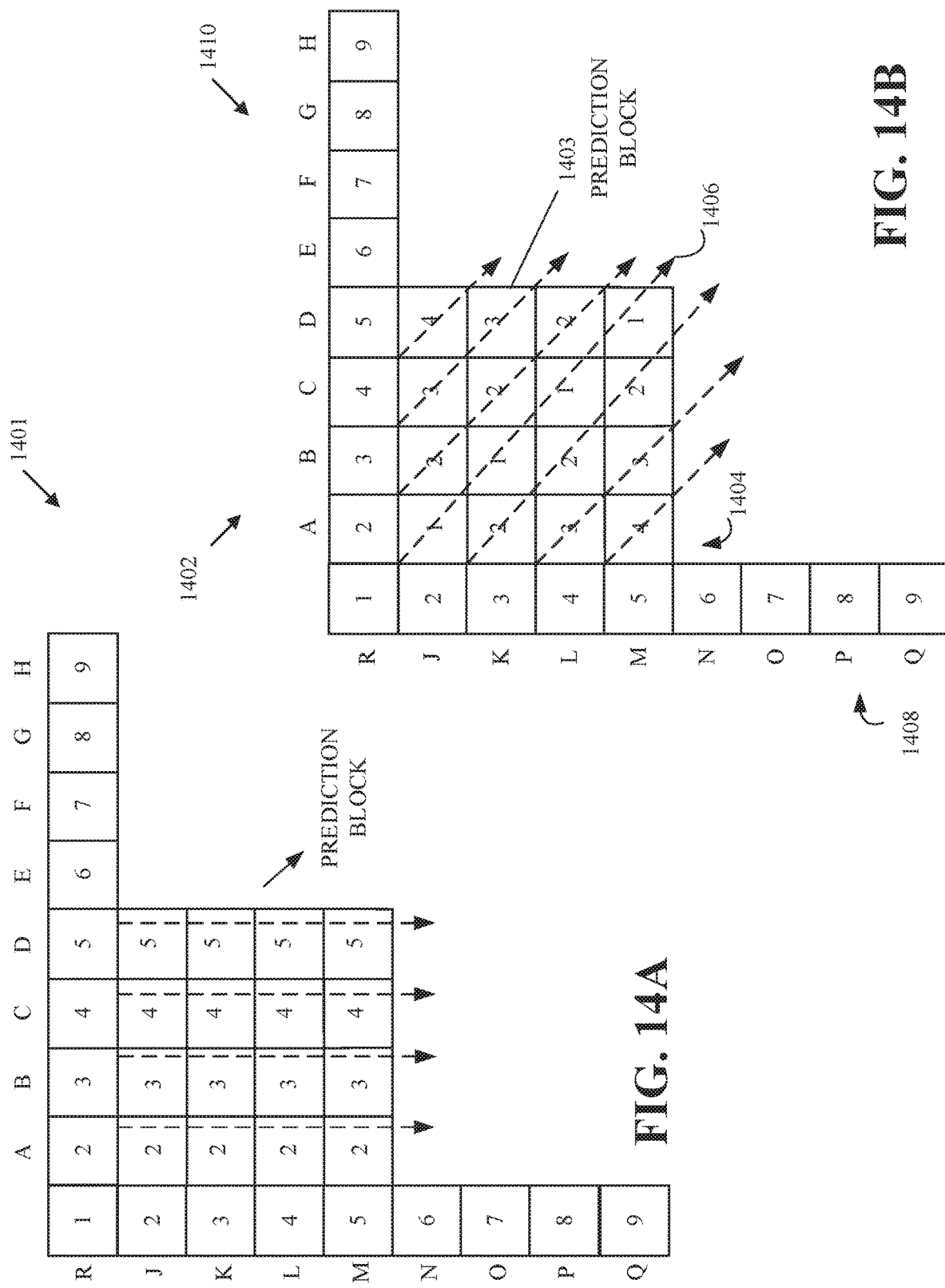

FIG. 22A

FIG. 22B

ADAPTATION FOR ENTROPY CODING OF BLOCKS OF IMAGE DATA

CROSS-REFERENCE TO RELATED APPLICATIONS

This application claims the benefit of U.S. patent Ser. No. 15/668,745 filed on Aug. 4, 2017. The entire contents of that application are hereby incorporated by reference in the specification of this application.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and reference frames to reconstruct the frames or images.

SUMMARY

This application relates to encoding and decoding a current block of video data. Disclosed herein are aspects of systems, methods, and apparatuses for encoding and decoding the current block using adaptation for entropy coding.

One aspect of the disclosed implementations is a system for decoding video. The system includes a memory and a processor. The memory stores instructions executable by the processor to cause the system to: partition a block of video data into a plurality of groups of elements; decode, using an entropy decoder, data from an encoded bitstream to obtain elements of a first group from the plurality of groups of elements; determine a category based on the elements of the first group; based on the category, select a context for an element from a second group from the plurality of groups of elements; and decode, using the entropy decoder using the context, data from the encoded bitstream to obtain the element of the second group from the plurality of groups of elements.

Another aspect is a method for decoding video. The method includes partitioning a block of video data into a plurality of groups of elements; decoding, using an entropy decoder, data from an encoded bitstream to obtain elements of a first group from the plurality of groups of elements; determining a category based on the elements of the first group; based on the category, selecting a context for an element from a second group from the plurality of groups of elements; and decoding, using the entropy decoder using the context, data from the encoded bitstream to obtain the element of the second group from the plurality of groups of elements.

Another aspect is a system for encoding video. The system includes a memory and a processor. The memory stores instructions executable by the processor to cause the system to: partition a block of video data into a plurality of groups of elements; encode, using an entropy encoder, elements of a first group from the plurality of groups of elements; determine a category based on the elements of the first group; based on the category, select a context for an element from a second group from the plurality of groups of elements; and encode, using the entropy encoder using the context, the element of the second group from the plurality of groups of elements.

Another aspect of the disclosed implementations is a system for decoding video. The system includes a memory and a processor. The memory stores instructions executable by the processor to cause the system to: partition a block of video data into a plurality of groups of elements; decode, using an entropy decoder, data from an encoded bitstream to obtain, using a first scan order, elements of a first group from the plurality of groups of elements, wherein the first group includes elements forming a triangle in a corner of the block, and wherein the triangle includes elements of a first row of the block and elements of a first column of the block; determine, based on the elements of the first group, a second scan order for a second group from the plurality of groups of elements; and decode, using the entropy decoder, data from the encoded bitstream to obtain, using the second scan order, elements of the second group from the plurality of groups of elements.

Another aspect is a method for decoding video. The method includes partitioning a block of video data into a plurality of groups of elements; decoding, using an entropy decoder, data from an encoded bitstream to obtain, using a first scan order, elements of a first group from the plurality of groups of elements, wherein the first group includes elements forming a triangle in a corner of the block, and wherein the triangle includes elements of a first row of the block and elements of a first column of the block; determining, based on the elements of the first group, a second scan order for a second group from the plurality of groups of elements; and decoding, using the entropy decoder, data from the encoded bitstream to obtain, using the second scan order, elements of the second group from the plurality of groups of elements.

Another aspect is a system for encoding video. The system includes a memory and a processor. The memory stores instructions executable by the processor to cause the system to: partition a block of video data into a plurality of groups of elements; encode, using an entropy encoder using a first scan order, elements of a first group from the plurality of groups of elements, wherein the first group includes elements forming a triangle in a corner of the block, and wherein the triangle includes elements of a first row of the block and elements of a first column of the block; determine, based on the elements of the first group, a second scan order for a second group from the plurality of groups of elements; and encode, using the entropy encoder using the second scan order, elements of the second group from the plurality of groups of elements.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 7A is a block diagram of an encoder that separately encodes quantized coefficients and an intra-prediction mode.

FIG. 7B is a block diagram of a decoder that separately decodes quantized coefficients and an intra-prediction mode.

FIG. 14A is a diagram of an intra-prediction mode having a 90 degree prediction angle according to implementations of this disclosure.

FIG. 14B is a diagram of an intra-prediction mode having a 135 degree prediction angle according to implementations of this disclosure.

Figures 22A, 22B:
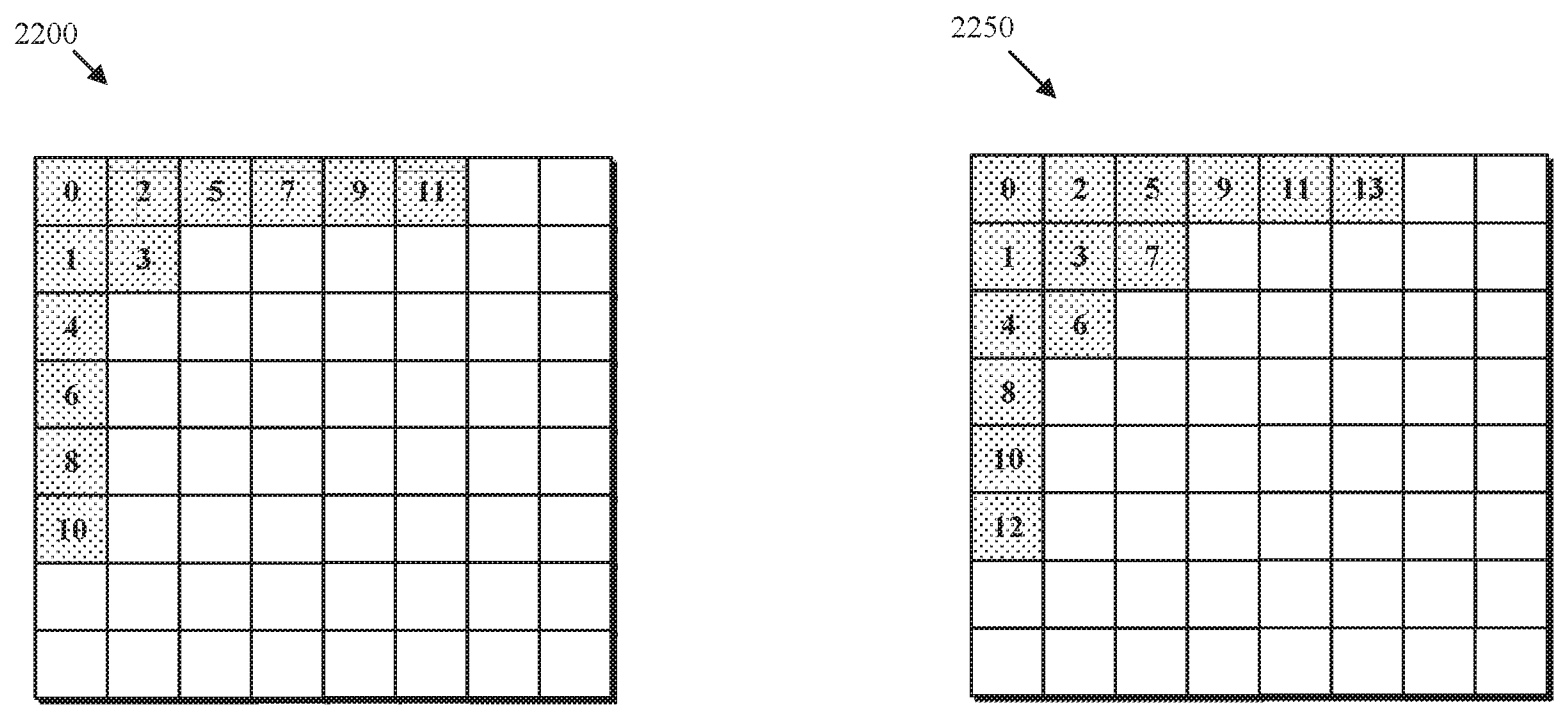

FIG. 22A is a diagram of an example of a scan order for a first group of elements of a block of image data.

FIG. 22B is a diagram of an example of a scan order for a first group of elements of a block of image data.

DETAILED DESCRIPTION

Figure 1:
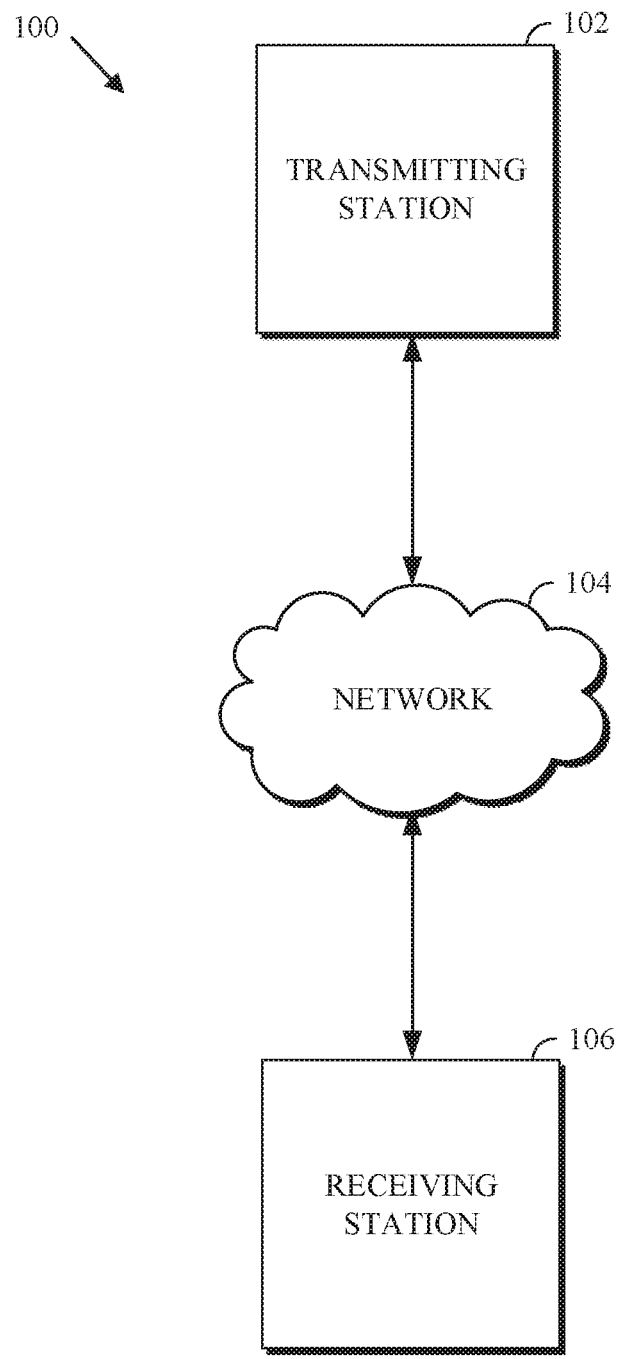
FIG. 1 is a schematic of a video encoding and decoding system.

Compression schemes related to coding video streams may include breaking images into blocks and generating a digital video output bitstream (i.e., an encoded bitstream) using one or more techniques to reduce the data rate of the output bitstream. A received bitstream can be decoded to re-construct the blocks and the source images from the compressed information. Techniques used to encode and decode video streams can include entropy coding of components of a video signal (e.g., a prediction residual for a block from a frame of video).

A hybrid video coding framework may make use of prediction, transform, quantization, and/or entropy coding to compress a block of video data. Depending upon a pattern occurring in a block of quantized transform coefficients after prediction, transform, and quantization, compression performance of entropy coding may be improved by adaptively selecting a scan order instead of using a fixed scan order. For example, if a significant number of zero valued coefficients occur at the end of the scan order for the block, then the ending run of zeros can be very efficiently coded (e.g., using an entropy encoder or an entropy decoder) explicitly or implicitly (e.g., by an end of block indication).

A block may be partitioned for entropy coding into a plurality of groups of elements (e.g., quantized transform coefficients of a residual block), and information in the a first group of elements that are coded using a default scan order, which is available at both the encoder and compatible decoder, may be used to determine a scan order for a next group. For example, based on a distribution of non-zero valued elements in prior coded groups of elements, a scan order for the last group(s) of elements of the block may be selected to increase the probability of zero valued elements occurring at the end of the resulting scan order for the block. In some implementations, scan order adaptation is based only on information available in the current block of elements (e.g., quantized transform coefficients of a residual block). Such a scheme may offer the advantage of avoiding dependency of the entropy coding of the block on other parameters, such as an intra-prediction mode for the block or coefficient statistics for other blocks of the video that may be used by a constrained adaptive scan order scheme.

Information in the first group of elements may also be leveraged to improve coding efficiency of an entropy coding scheme by adapting one or more contexts that are used to code subsequent groups of elements in the block (e.g., a second group of elements including all remaining elements). For example, a category may be determined based on elements of the first group and a context used for coding an element of a second group of elements of the block may be selected based in part on the category. In some implementations, a scan order for the second group of elements may also be determined based on the category.

The first group of elements, which are used to adapt a context and/or a scan order used for coding a second group of elements of the block, may be designed to reduce the size of the first group while still providing enough information to robustly inform adaptation. By reducing the size of the first group improved adapted coding parameters (e.g., contexts or scan orders) may be applied to a larger percentage of the elements of a block to improve overall coding efficiency. Coding efficiency can also be improved by designing the first group to include the elements of the block most likely to be non-zero (e.g., by using an upper-left triangular shape for the first group), to avoid constraining these likely non-zero coefficients to be coded after the first group. In some implementations, the shape and size of a first group of elements may be selected based on a size of the block.

By adaptively determining the coding context(s) and/or the ending scan order for a block based on information in a partitioned group of elements of the block that start the scan order, a number of advantages may be achieved over other coding schemes. For example, the advantages may include (1) increasing the coding efficiency of the an entropy encoder/decoder by using a scan order and/or a context that is adapted to the distribution of non-zero coefficients in the current block; (2) allowing the processing of blocks of a frame in different orders by avoiding a parsing dependency on information outside of the current block; and/or (3) enabling the improvement of intra-prediction mode coding efficiency by enabling intra-prediction modes to be decoded after the elements of a residual block and leveraging correlation between the elements of the block and the intra-prediction mode used to generate the block.

The scan order for a block based on a residual block resulting from inter-prediction may be adapted based on information in a partitioned group of elements of the block that start the scan order. For example, inter-prediction may use a motion vector that represents the spatial displacement of a previously coded block relative to the current block. The motion vector can be identified using a method of motion estimation, such as a motion search. In the motion search, a portion of a reference frame can be translated to a succession of locations to form a prediction block that can be subtracted from a portion of a current frame to form a series of residuals. The horizontal and/or vertical translations corresponding to the location having, e.g., the smallest, residual can be selected as the motion vector. The motion vector can be encoded in the encoded bitstream along with an indication of the reference frame. A resulting inter-prediction residual may exhibit spatial patterns that can be recognized and exploited to improve entropy coding efficiency for the residual by adapting the scan order for a block based on the residual.

Encoding a video stream, or a portion thereof, such as a frame or a block, can include using spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a current block of a frame of a video stream using pixels peripheral to the current block; that is, using pixels that are in the same frame as the current block but that are outside of the current block. Intra prediction can be performed along a direction of prediction, referred to herein as prediction angle, where directions can correspond to respective intra-prediction modes. An intra-prediction mode uses pixels peripheral to the current block being predicted. Pixels peripheral to the current block are pixels outside the current block.

Many different intra-prediction modes can be supported. Some intra-prediction modes may be referred to as directional intra-prediction modes, which may have corresponding prediction angles. Directional intra-prediction modes can include, for example, horizontal intra-prediction modes, vertical intra-prediction modes, and diagonal intra-prediction modes. A horizontal intra-prediction mode corresponds to an intra-prediction having a prediction angle that is generally horizontal. A vertical intra-prediction mode corresponds to an intra-prediction having a prediction angle that is generally vertical. A diagonal intra-prediction mode corresponds to a directional intra-prediction having a prediction angle that is neither generally horizontal nor generally vertical. The prediction angle of a directional intra-prediction mode can be a prediction angle between 0 and 360 degrees. In some implementations, the prediction angle can be a prediction angle between 0 and 270 degrees. Available prediction angles can also be a subset of all possible prediction angles. For example, a codec can have available prediction modes corresponding to 50-60 discrete prediction angles of the 0 to 360 prediction angles. Non directional intra-prediction modes can also be supported, including, for example, a planar intra-prediction mode and a DC intra-prediction mode.

Directional intra-prediction modes can be used to propagate pixel values from previously coded blocks along an angular line to predict a block. For example, pixel values being propagated can include peripheral pixels above and/or to the left of the block in the same frame (e.g., when raster scan order is used in encoding). FIGS. 14A and 14B illustrate two example of intra prediction.

FIG. 14A is a diagram of an intra-prediction mode 1401 having a 90 degree prediction angle according to implementations of this disclosure. FIG. 14A illustrates generating a prediction block for a 4×4 block to be predicted (also called a current block) using a vertical intra-prediction mode. The intra-prediction mode of FIG. 14A propagates peripheral pixels A through D down the columns of the prediction block such that each pixel in a column has its value set equal to that of the adjacent peripheral pixel A through D in the direction of the arrows.

FIG. 14B is a diagram of an intra-prediction mode 1402 having a 135 degree prediction angle according to implementations of this disclosure. FIG. 14B illustrates generating a prediction block for a 4×4 current block using a diagonal intra-prediction mode. The intra-prediction mode of FIG. 14B propagates peripheral pixel values along a 135 degree line (i.e., lines 1406) to the right and down to form the prediction block. The peripheral pixel values can include, for example, some of peripheral pixels 1408 (i.e., pixels A through R) from blocks adjacent to the 4×4 current block of a frame 1410, to form the prediction block 1403 for the current block. Although the 135 degree intra-prediction mode in FIG. 14B is illustrated using the pixel values of the peripheral pixels 1408 to generate the prediction block 1403 for example, a linear combination (e.g., weighted average) of some (e.g., two, three, or more) of the peripheral pixels can be used to predict pixel values of the prediction block along lines extending through the block. For example, the pixel value 1404 to be propagated along line 1406 can be formed from a weighted average of pixel values K, L, and M.

As further described below, a residual block of residual errors can result from the intra prediction of a block of a video stream. The residual block can be in the pixel domain. The residual block can be transformed into the frequency domain resulting in a transform block of transform coefficients. The transform coefficients can be quantized resulting into a quantized transform block of quantized transform coefficients (also referred to herein as quantized coefficients). A quantized transform block of quantized transform coefficients is also referred to herein as a block of quantized transform coefficients. The quantized coefficients can be entropy encoded and added to an encoded bitstream. The intra-prediction mode can also be entropy encoded and added to the encoded bitstream. A decoder can receive the encoded bitstream, entropy decode the quantized transform coefficients and/or the intra-prediction mode to reconstruct the original video frame.

The number of bits used to encode the intra-prediction mode can depend on the number of available intra-prediction modes. In a video coding system where N intra-prediction modes are available, $\log_2 N$ bits may be required to indicate the prediction mode. For example, in a system where nine (9) or ten (10) intra-prediction modes are available for a 4×4 luminance block, four (4) bits may be required to indicate an intra-prediction mode. In a system where 35 intra-prediction modes are available for a 4×4 luminance block, six (6) bits may be required to indicate an intra-prediction mode. Coding systems that use more intra-prediction modes require more bits to encode an intra-prediction mode.

As the number of available intra-prediction modes increases, the cost (in bits) of encoding an intra-prediction mode increases. In some situations, the number of bits required to encode an intra-prediction mode can be greater than the number of bits required to encode the pixel values of the current block being encoded. For example, to encode a 4×4 block (which contains 16 pixels) in a coding system that uses more than 16 intra-prediction modes, the number of distinct prediction modes is higher than the number of pixels to be predicted. This results in a problem of over saturation.

Implementations of this disclosure can improve video compression using improved coding of intra-prediction modes. Implementations according to this disclosure can use information in residual blocks to improve the compression performance of intra-prediction modes. For example, information in the quantized transform block can be used by an entropy encoder to encode the intra-prediction mode thereby improving compression performance. By using information in the quantized transform block, the bit rates resulting from encoding an intra-prediction mode can be reduced. Encoders and decoders according to implementations of this disclosure can improve the entropy coding without increasing the complexity of the encoding and decoding.

Details are described herein after first describing an environment in which the improved coding of intra-prediction modes disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
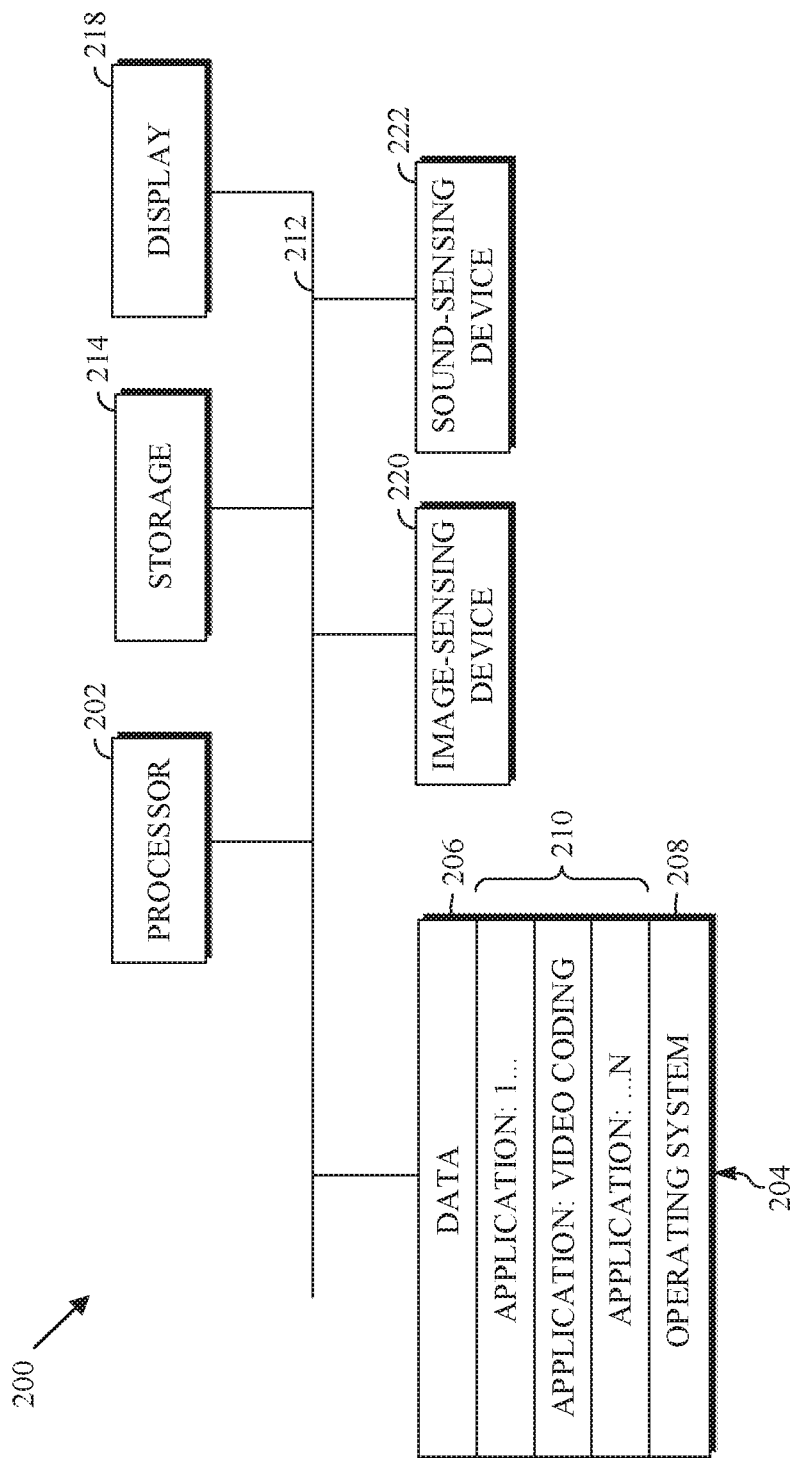
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
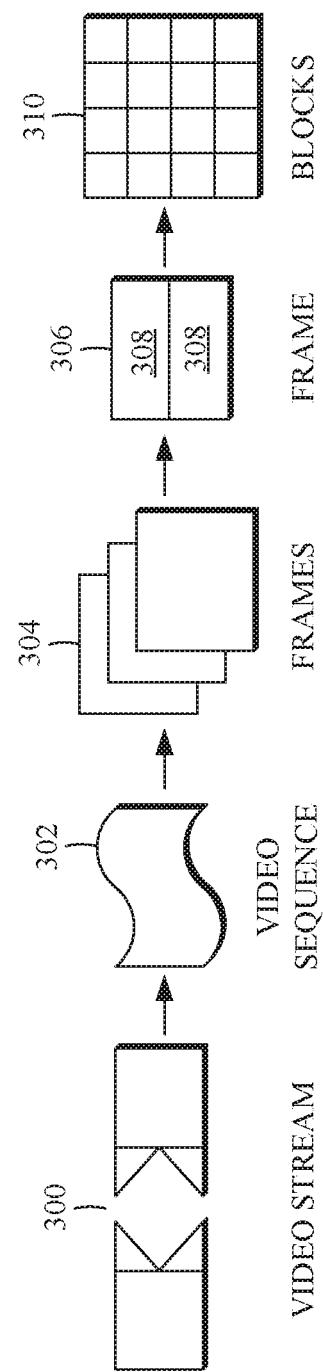
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. In some cases, a frame may be referred to as a picture. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, 4×32 pixels, 8×32 pixels, 16×32 pixels, 32×4 pixels, 32×8 pixels, 32×16 pixels, 32×32 pixels, 64×64 pixels, or in general N×M pixels, where N, M may be an integer power of 2 like 2, 4, 8, 16, 32, 64, 128, 256, or larger.

Figure 4:
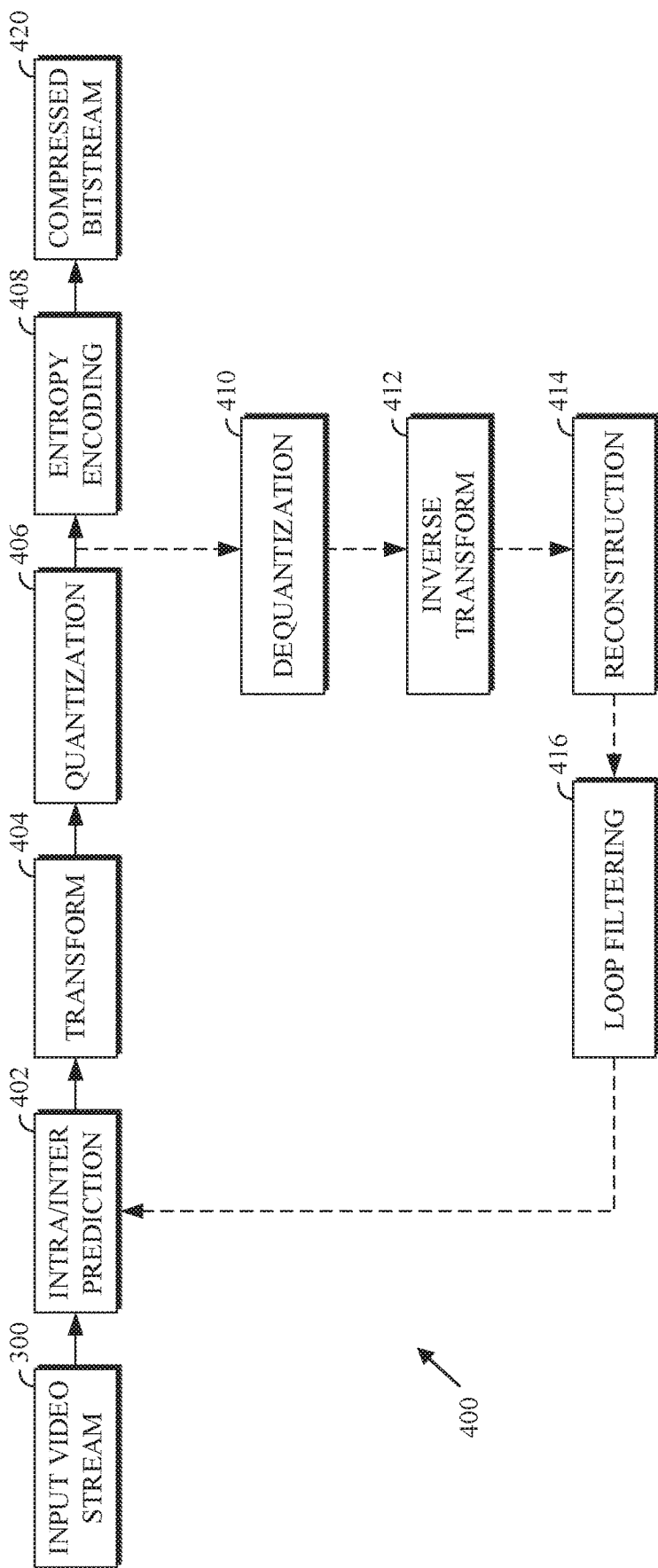
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms (e.g., identity transform, transpose, rotation, and Karhunen-Loève transform (KLT)) are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames.

In another implementation, an encoder 400 can have the quantization stage 406 and the dequantization stage 410 combined into a single stage.

Figure 5:
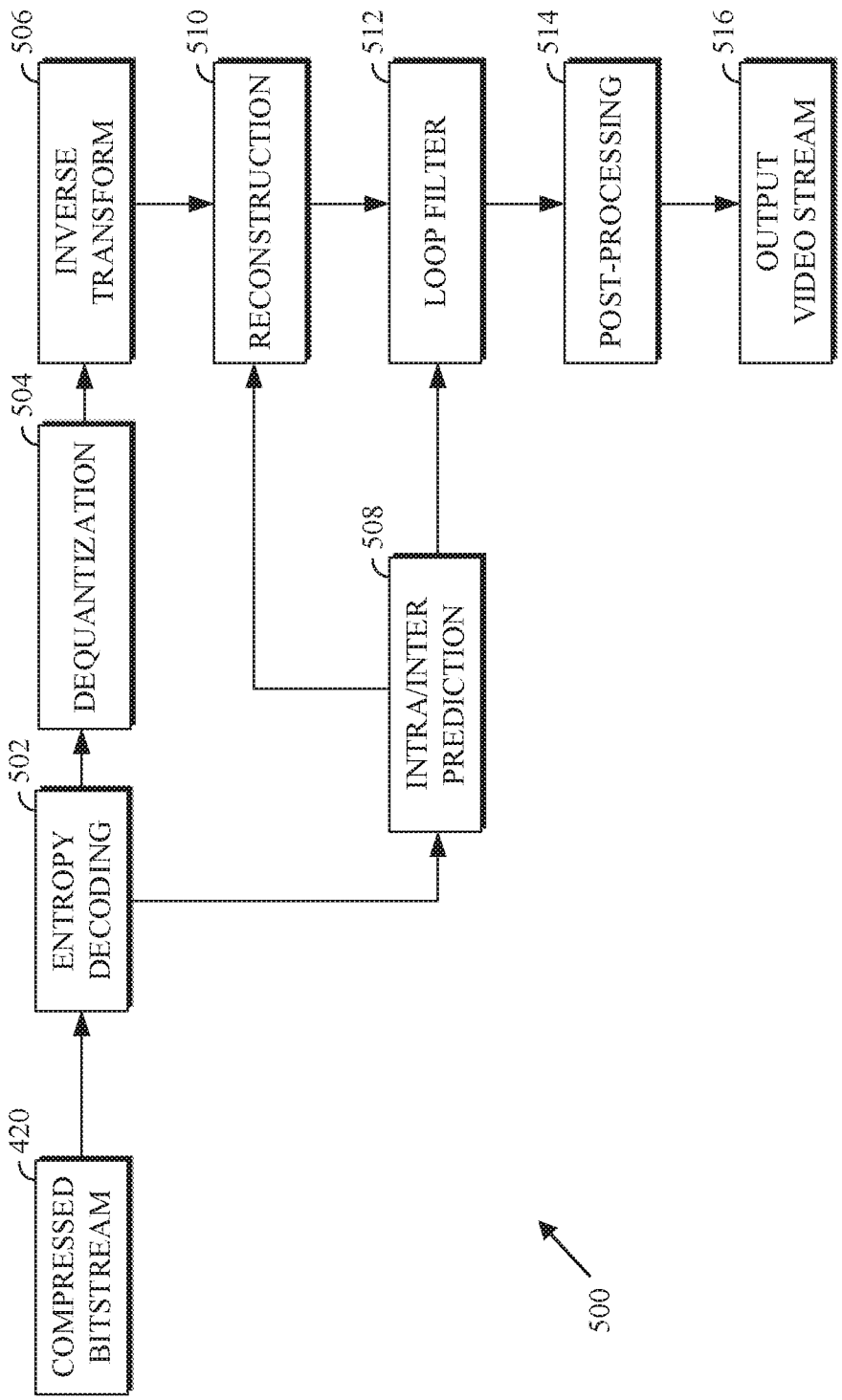
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post-processing stage 514 (e.g., including deblocking filtering). Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering is applied by the post-processing stage 514 to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post-processing stage 514. In some implementations of the decoder 500, the post-processing stage 514 (e.g., including deblocking filtering) is applied before the loop filtering stage 512. Additionally, or alternatively, the encoder 400 includes a deblocking filtering stage in addition to the loop filtering stage 416.

Figure 6:
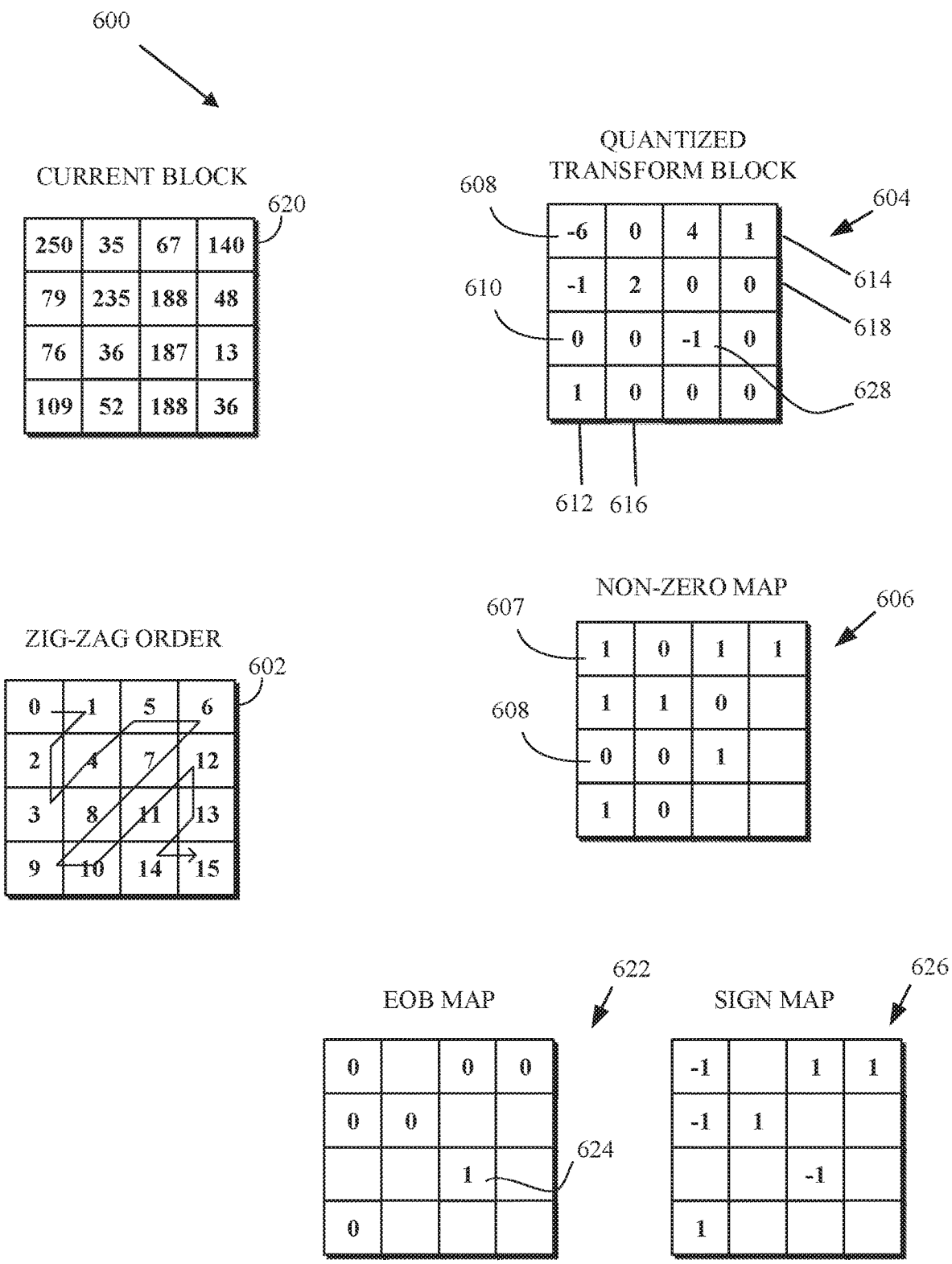
FIG. 6 is a diagram illustrating quantized transform coefficients in accordance with implementations of this disclosure.

FIG. 6 is a diagram 600 illustrating quantized transform coefficients in accordance with implementations of this disclosure. The diagram 600 depicts a current block 620, a scan order 602, a quantized transform block 604, a non-zero map 606, an end-of-block map 622, and a sign map 626. The current block 620 is illustrated as a 4×4 block. However, any block size is possible. For example, the current block can have a size (i.e., dimensions) of 4×4, 8×8, 16×16, 32×32, or any other square or rectangular block size. The current block 620 can be a block of a current frame. In another example, the current frame may be partitioned into segments (such as the segments 308 of FIG. 3), tiles, or the like, each including a collection of blocks, where the current block is a block of the partition.

The quantized transform block 604 can be a block of size similar to the size of the current block 620. The quantized transform block 604 includes non-zero coefficients (e.g., a coefficient 608) and zero coefficients (e.g., a coefficient 610). As described above, the quantized transform block 604 contains quantized transform coefficients for the residual block corresponding to the current block 620. Also as described above, the quantized transform coefficients are entropy coded by an entropy coding phase, such as the entropy coding stage 408 of FIG. 4.

Entropy coding a quantized transform coefficient can involve the selection of a context model (also referred to as probability context model, probability model, and context) which provides estimates of conditional probabilities for coding the binary symbols of a binarized transform coefficient. When entropy coding a quantized transform coefficient, additional information may be used as the context for selecting a context model. For example, the magnitudes of the previously coded transform coefficients can be used, at least partially, for determining a probability model.

To encode a transform block, a video coding system may traverse the transform block in a scan order and encode (e.g., entropy encode) the quantized transform coefficients as the quantized transform coefficients are respectively traversed (i.e., visited). In a zig-zag scan order, such as the scan order 602, the top left corner of the transform block (also known as the DC coefficient) is first traversed and encoded, the next coefficient in the scan order (i.e., the transform coefficient corresponding to the location labeled "1") is traversed and encoded, and so on. In the zig-zag scan order (i.e., scan order 602), some quantized transform coefficients above and to the left of a current quantized transform coefficient (e.g., a to-be-encoded transform coefficient) are traversed first. Other scan orders are possible. A one-dimensional structure (e.g., an array) of quantized transform coefficients can result from the traversal of the two-dimensional quantized transform block using the scan order.

In some examples, encoding the quantized transform block 604 can include determining the non-zero map 606, which indicates which quantized transform coefficients of the quantized transform block 604 are zero and which are non-zero. A non-zero coefficient and a zero coefficient can be indicated with values one (1) and zero (0), respectively, in the non-zero map. For example, the non-zero map 606 includes a non-zero 607 at Cartesian location (0, 0) corresponding to the coefficient 608 and a zero 608 at Cartesian location (2, 0) corresponding to the coefficient 610. In some cases, the non-zero map may be referred to as the significance map.

In some examples, encoding the quantized transform block 604 can include generating the end-of-block map 622. The end-of-block map indicates whether a non-zero quantized transform coefficient of the quantized transform block 604 is the last non-zero coefficient with respect to a given scan order. If a non-zero coefficient is not the last non-zero coefficient in the transform block, then it can be indicated with the binary value 0 (zero) in the end-of-block map. If, on the other hand, a non-zero coefficient is the last non-zero coefficient in the transform block, then it can be indicated with the binary value 1 (one) in the end-of-block map. For example, as the quantized transform coefficient corresponding to the scan location 11 (i.e., the last non-zero quantized transform coefficient 628) is the last non-zero coefficient of the quantized transform block 604, it is indicated with the end-of-block value 624 of 1 (one); all other non-zero transform coefficients are indicated with a zero.

In some examples, encoding the quantized transform block 604 can include generating the sign map 626. The sign map 626 indicates which non-zero quantized transform coefficients of the quantized transform block 604 have positive values and which quantized transform coefficients have negative values. Transform coefficients that are zero need not be indicated in the sign map. The sign map 626 illustrates the sign map for the quantized transform block 604. In the sign map, negative quantized transform coefficients can be indicated with a −1 and positive quantized transform coefficients can be indicated with a 1.

FIG. 7A is a block diagram of an encoder 700 that separately encodes quantized coefficients and an intra-prediction mode. The encoder 700 can be an example of the encoder 400 of FIG. 4. The encoder 700 does not use information in residual blocks to improve the compression performance of intra-prediction modes. The encoder 700 can receive a block 701 of video and produces a bitstream 720. That is, the encoder 700 receives the block 701 and outputs to the bitstream 720 an encoding for the block 701. The encoder 700 includes a mode decision 702, an intra prediction 704, a transform/quantization 708, an inverse quantization/transform 722, an entropy encoder 712, an entropy encoder 716, and a multiplexer 718.

The block 701 can be a block of the input video stream 300 of FIG. 4. The bitstream 720 can be the compressed bitstream 420 of FIG. 4. The mode decision 702 and the intra prediction 704 can be, can be implemented by, or can be implemented similarly to, the intra/inter prediction stage 402 of FIG. 4. The transform/quantization 708 can be, can be implemented by, or can be implemented similarly to, the transform stage 404 and the quantization stage 406 of FIG. 4. The inverse quantization/transform 722 can be, can be implemented by, or can be implemented similarly to, the dequantization stage 410 and the inverse transform stage 412 of FIG. 4. The entropy encoder 712 can be, can be implemented by, or can be implemented similarly to, the entropy encoding stage 408 of FIG. 4. The entropy encoder 712 and the entropy encoder 716 can be the same entropy encoder. The entropy encoder 716 can be separate from, but functionally similar to, the entropy encoder 712.

An intra-prediction mode 714 for encoding the block 701 can be determined by the mode decision 702. The intra prediction 704 can predict the block 701 using the intra-prediction mode 714 determined by the mode decision 702. The encoder 700 generates a residual block 706, as described with respect to FIG. 4. The transform/quantization 708 transforms the residual block into a transform block and quantizes the transform block to produce a quantized transform block of quantized transform coefficients 710.

The intra-prediction mode 714, determined by the mode decision 702, is received by the entropy encoder 716. The entropy encoder 716 produces an entropy coded intra-prediction mode. The quantized transform coefficients 710 are received by the entropy encoder 712. The entropy encoder 712 produces entropy encoded quantized coefficients. The entropy coded intra-prediction mode and the entropy encoded quantized coefficients can be multiplexed (e.g., added) into the bitstream 720 by the multiplexer 718.

FIG. 7B is a block diagram of a decoder 750 that separately decodes quantized coefficients and an intra-prediction mode. The decoder 750 can be an example of the decoder 500 of FIG. 5. The decoder 750 does not use information in residual blocks (e.g., information in quantized transform blocks) encoded by an encoder to decode intra-prediction modes. The decoder 750 can receive a bitstream 720 of video and produces a reconstructed block 764 of video. The decoder 750 includes a de-multiplexer 752, an entropy decoder 756, an entropy decoder 754, an inverse quantization/transform 760, and an intra prediction 768.

The bitstream 720 can contain a current block of the input video to be reconstructed (i.e., decoded). The bitstream 720 can be the compressed bitstream 420 of FIG. 5. The reconstructed block 764 can be a block of the output video stream 516 of FIG. 5. The entropy decoder 754 can be, can be implemented by, or can be implemented similarly to, the entropy decoding stage 502 of FIG. 54. The entropy decoder 756 and the entropy decoder 754 can be the same entropy decoder. The entropy decoder 756 can be separate from, by functionally similar to, the entropy decoder 754. The inverse quantization/transform 760 can be, can be implemented by, or can be implemented similarly to, the dequantization stage 504 and the inverse transform stage 506 of FIG. 5. The intra prediction 768 can be, can be implemented by, or can be implemented similarly to, the intra/inter-prediction stage 508 of FIG. 5.

The de-multiplexer 752 receives and extracts from the bitstream 720 the entropy coded intra-prediction mode and the entropy coded quantized transform coefficients. The entropy decoder 756 decodes the entropy coded quantized transform coefficients to produce quantized transform coefficients 758. The inverse quantization/transform 760 uses the quantized transform coefficients 758 to produce residual block 762. In parallel (i.e., separately), the entropy decoder 754 decodes an intra-prediction mode 766 from the entropy coded intra-prediction mode. The intra-prediction mode 766 can be used by the intra prediction 768 to generate a prediction block. The decoder 750 uses the prediction block and the residual block 762 to generate the reconstructed block 764.

Figure 8A:
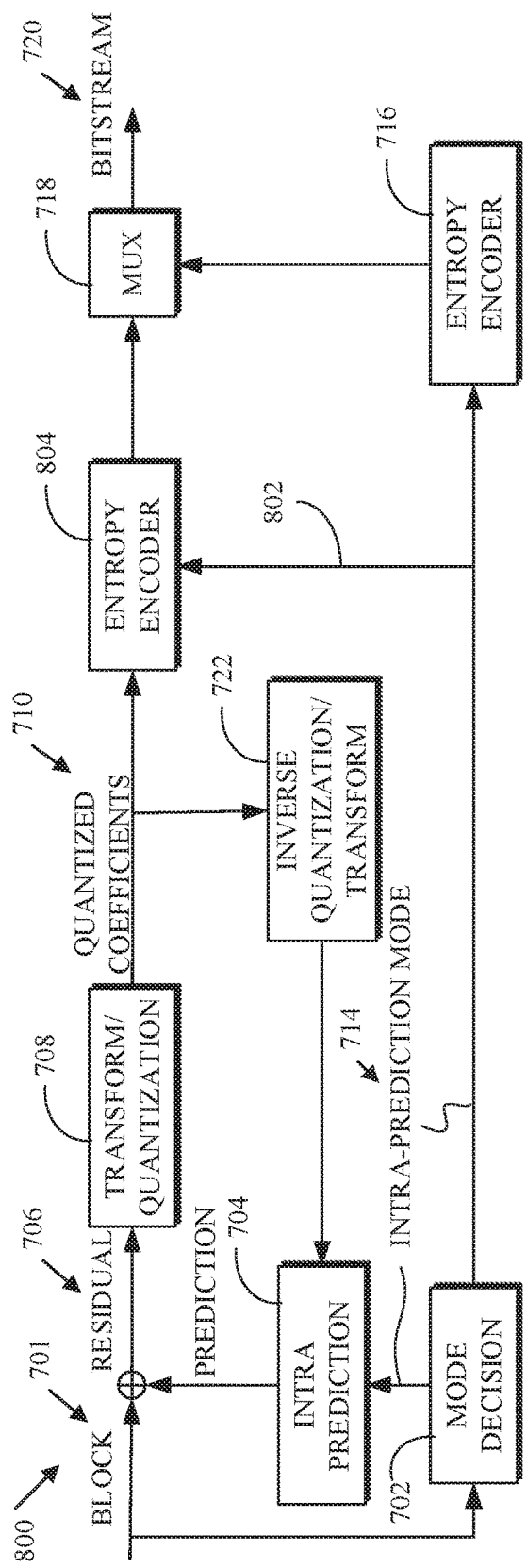
FIG. 8A is a block diagram of an encoder that uses the intra-prediction mode to encode the quantized coefficients.

FIG. 8A is a block diagram of an encoder 800 that uses the intra-prediction mode to encode the quantized coefficients. The encoder 800 can be an example of the encoder 400 of FIG. 4. The encoder 800 includes some of the same components as those of the encoder 700. Descriptions of components of the encoder 800 that are common with the encoder 700 are omitted. The encoder 800 includes an entropy encoder 804 in place of the entropy encoder 712 of FIG. 7. The entropy encoder 804 receives, along path 802, the intra-prediction mode 714 determined by the mode decision 702. As such, in coding the residual block 706 (i.e., after the intra prediction 704 and the transform/quantization 708), the encoder 800 can use the intra-prediction mode. For example, the encoder 800 selects a coding context for encoding the quantized transform coefficients of a transform block based on the intra-prediction mode 714.

The encoder 800 may include a number of intra-prediction modes. For example, the encoder 800 (and any other encoder according to implementations of this disclosure) can include 35 intra-prediction modes. For example, the intra-prediction modes can include a planar intra-prediction mode (also referred to as mode 0), a DC intra-prediction mode (also referred as mode 1), and angular prediction modes (e.g., mode 2 to mode 34).

The intra-prediction modes can be classified into classes. The classes can include: horizontal, vertical, and diagonal or other. Horizontal intra-prediction modes are directional prediction modes (e.g., modes 6-14) whose intra-prediction angles are close to the horizontal axis (i.e., are generally horizontal). Vertical intra-prediction modes are directional intra-prediction modes (e.g., modes 22-30) whose prediction angles are close to the vertical axis (i.e., are generally vertical). Diagonal or other intra-prediction modes are all the remaining directional (which are neither horizontal nor vertical) and non-directional intra-prediction modes. The diagonal or other intra-prediction modes are the intra-prediction modes 0-5, 15-21, and 31-34. "Diagonal or other" may be referred to herein, collectively, as "diagonal."

A description is now given as to how the encoder 800 can use the intra-prediction mode to encode the quantized coefficients. Let m denote the intra-prediction mode 714 used to generate the residual block 706, and let c(m) denote the class into which the intra-prediction mode m is classified. For example, m can have a value equal to, or corresponding to, one of the intra-prediction modes 0 to 34. Depending on the intra-prediction angle, the classification c(m) of the intra-prediction mode m can be one of horizontal, vertical, and diagonal or other. For example, if the prediction angle is more horizontal than vertical, then the intra-prediction mode can be classified as horizontal (i.e., c(m)=horizontal). If the prediction angle is more vertical than horizontal or diagonal, then the intra-prediction mode can be classified as vertical (i.e., c(m)=vertical). Otherwise, the intra-prediction mode can be classified as diagonal (i.e., c(m)=diagonal). A classification of "diagonal" includes diagonal and other.

The encoder 800 can use the classification c(m) to derive one or more context models to be used for encoding the non-zero map, such as the non-zero map 606 of FIG. 6, in a 4×4 or 8×8 luminance residual block. The encoder 800 can use the classification c(m) to determine a scan order to use in encoding (and by a corresponding decoder, such as decoder 850 described below, in decoding) the quantized transform coefficients. For example, the encoder 800 can select a vertical scan order when the classification c(m) is horizontal, can select a horizontal (raster) scan order when the classification c(m) is vertical, and can select a diagonal scan order when the classification c(m) is diagonal.

Figure 8B:
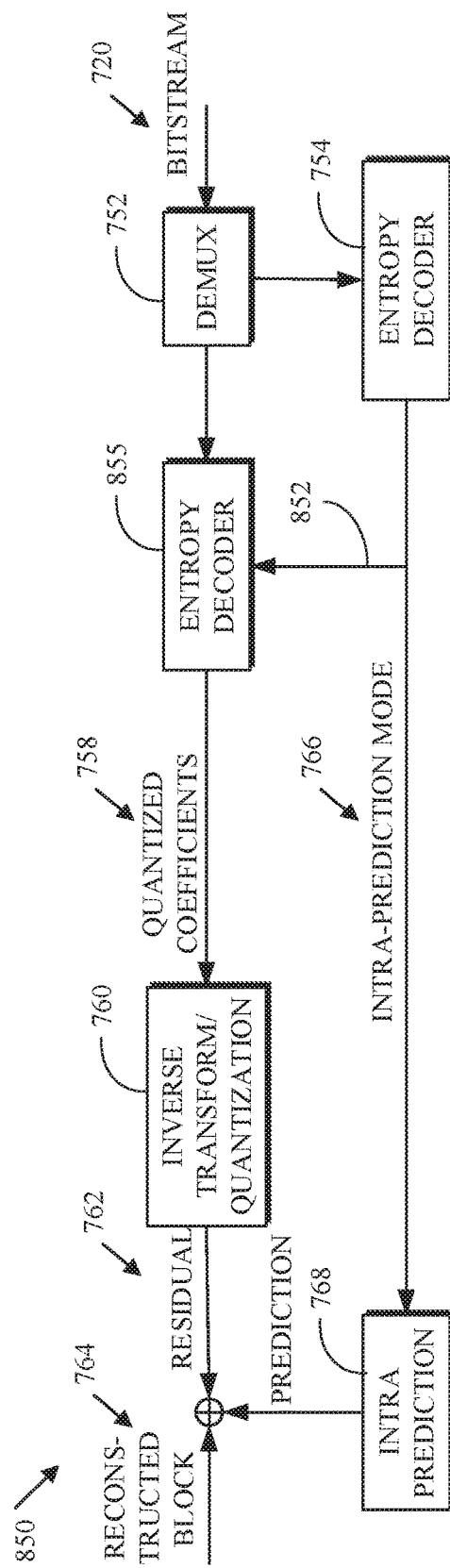
FIG. 8B is a block diagram of a decoder that uses the intra-prediction mode to decode the quantized coefficients.

FIG. 8B is a block diagram of a decoder 850 that uses the intra-prediction mode to decode the quantized coefficients. The decoder 850 uses information in residual blocks (e.g., information in the quantized transform coefficients) encoded by an encoder, such as the encoder 800 of FIG. 8A, to improve the compression performance of the quantized transform coefficients. The decoder 850 receives a bitstream 720 of video and produces a reconstructed block 764 of video. The decoder 850 includes the de-multiplexer 752, the entropy decoder 754, an entropy decoder 855, the inverse quantization/transform 760, and the intra prediction 768.

The bitstream 720 can contain a current block of the input video to be reconstructed (i.e., decoded). The bitstream 720 can be the compressed bitstream 420 of FIG. 5. The reconstructed block 764 can be a block of the output video stream 516 of FIG. 5. The entropy decoder 754 can be, can be implemented by, or can be implemented similarly to, the entropy decoding stage 502 of FIG. 54. The inverse quantization/transform 760 can be, can be implemented by, or can be implemented similarly to, the dequantization stage 504 and the inverse transform stage 506 of FIG. 5. The intra prediction stage 508 can be, can be implemented by, or can be implemented similarly to, the intra/inter-prediction stage 508 of FIG. 5.

The de-multiplexer 752 receives the bitstream 720. The de-multiplexer extracts, from the bitstream 720, the entropy coded intra-prediction mode and the entropy coded quantized transform coefficients. The entropy decoder 754 decodes the entropy coded intra-prediction mode to generate the intra-prediction mode 766. The entropy decoder 855 receives the intra-prediction mode 766, along path 852, and receives the entropy coded quantized transform coefficients to generate the quantized transform coefficients 758. That is, the entropy decoder 855 can use the intra-prediction mode to determine a context model for decoding the quantized coefficients of the transform block. The inverse quantization/transform 760 uses the quantized transform coefficients 758 to produce residual block 762. The intra-prediction mode 766 can be used by the intra prediction stage 508 to generate a prediction block. The decoder 750 uses the prediction block and the residual block 762 to generate the reconstructed block 764.

Figure 9:
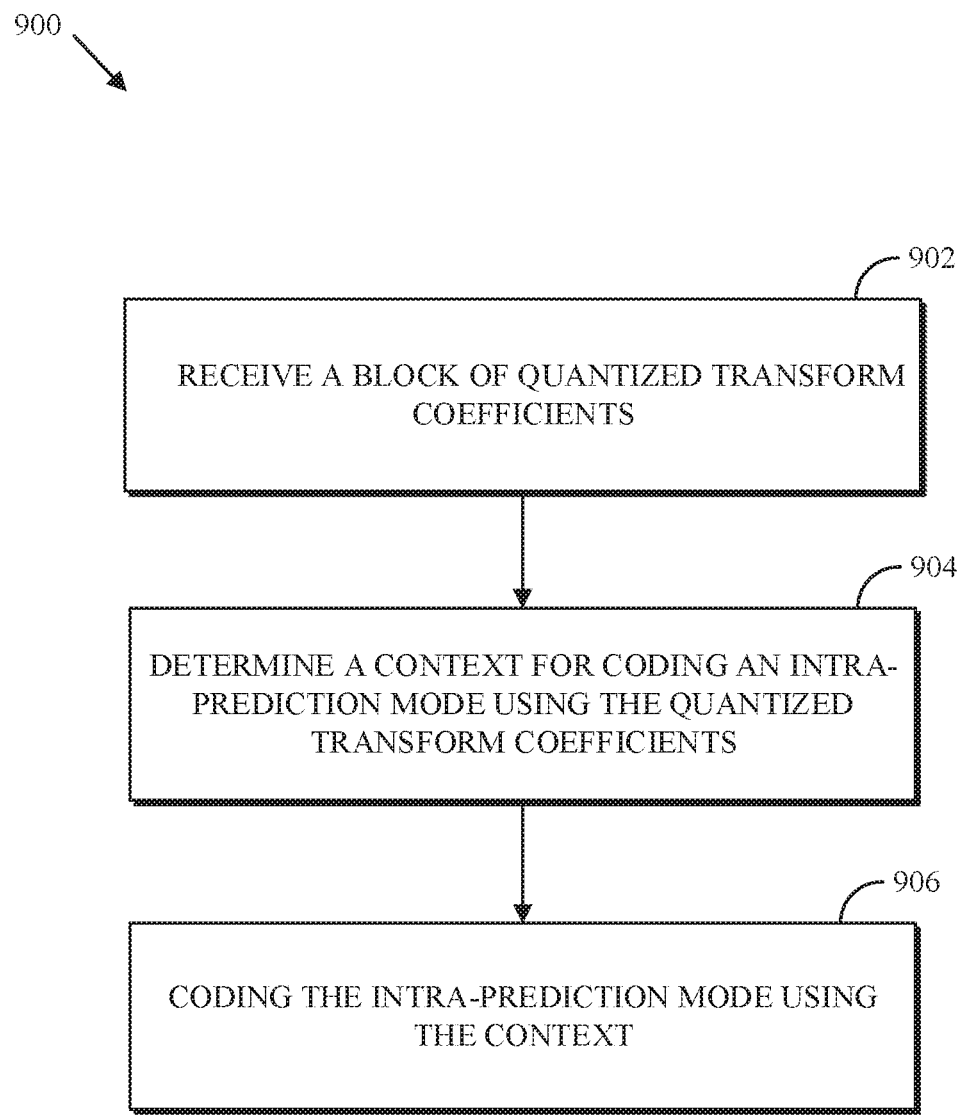
FIG. 9 is a flowchart diagram of a process for coding a current block using an intra-prediction mode according to an implementation of this disclosure.

FIG. 9 is a flowchart diagram of a process 900 for coding a current block using an intra-prediction mode according to an implementation of this disclosure. In some examples, coding means encoding, such as by an encoder. In other examples, coding means decoding, such as by a decoder. The process 900 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the process 900.

The process 900 can be implemented using specialized hardware or firmware. Some computing devices can have multiple memories, multiple processors, or both. The steps or operations of the process 900 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 900 can be implemented in an encoder such as the encoder 400 of FIG. 4. In at least some implementations, the process 900 can be performed at least in part by the entropy encoding stage 408 of the encoder 400 of FIG. 4. When implemented by an encoder, the process 900 can encode the current block using an intra-prediction mode. The process 900 can be implemented in a decoder such as the decoder 500 of FIG. 5. In at least some implementations, the process 900 can be performed at least in part by the entropy decoding stage 502 of the decoder 500 of FIG. 5. When implemented by a decoder, the process 900 can decode the current block using the intra-prediction mode.

At 902, the process 900 receives a block of quantized transform coefficients. When implemented in an encoder, the process 900 can receive the block of quantized transform coefficients generated as described above with respect to FIGS. 4 and 7A. For example, the process 900 can receive the block of quantized transform coefficients generated by quantization stage 406. When implemented in a decoder, the process 900 can receive the block of quantized transform coefficients in an encoded bitstream as described above with respect to FIGS. 5 and 7B.

At 904, the process 900 determines a context for coding the intra-prediction mode using the quantized transform coefficients. When implemented by an encoder, the process 900 determines the context (i.e., context model) for encoding the intra-prediction mode in the encoded bitstream. When implemented by a decoder, the process 900 determines the context for decoding the intra-prediction mode from the encoded bitstream.

Encoding the intra-prediction mode involves binarizing (i.e., converting to a binary code) the magnitude of a value corresponding to the intra-prediction before encoding the binarized value using the context model. The context model provides estimates of conditional probabilities for coding the binary symbols of a binarized intra-prediction mode. Improving the coding context can result in using less bits to encode (i.e., entropy encode) the possible values of intra-prediction modes.

Implementations according to this disclosure leverage principles of information theory to improve the coding of intra-prediction modes. Let X and Y denote two random variables with finite alphabets (i.e., possible values). Using the chain rule, the joint entropy $H(X,Y)$ of X and Y can be decomposed as given by equation (1):

$$H(X,Y)=X(X)+H(Y|X)=H(Y)+H(X|Y) \qquad (1)$$

In equation (1), $H(X)$ and $H(Y)$ denote the marginal entropy of X and Y, respectively, $H(Y|X)$ denotes the conditional entropy of Y given X, and $H(X|Y)$ denotes the conditional entropy of X given Y. If X denotes the residual block and Y denotes the intra-prediction mode associated with the residual block X, and in the case where the residual block Y and the intra-prediction mode X are correlated, then it follows from the chain rule that $H(Y|X)<H(Y)$. That is, encoding the intra-prediction mode (i.e., Y) using information in the residual block (i.e., $H(Y|X)$) results in more compression than directly encoding the intra-prediction mode (i.e., $H(Y)$). As such, compression performance can be improved by leveraging the information of the residual block (i.e., X) in coding the intra-prediction mode (i.e., Y).

Using information in the residual block includes using information in the residual block itself, using information in the corresponding transform block, or using information in the corresponding quantized transform block. If $I(X;Y)$ denotes the mutual information between X (i.e., the residual block) and Y (i.e., the intra-prediction mode), equation (1) results in $I(X;Y)=H(Y)-H(Y|X)>0$.

The process 900 can leverage the correlation between the residual block and the intra-prediction mode for encoding and decoding the intra-prediction mode. For example, the correlation can be expressed as: if the prediction angle is close to the horizontal axis (i.e., is generally horizontal), the non-zero quantized transform coefficients are more likely to appear in the first several columns of the quantized transform block; and if the prediction angle is close to the vertical axis (i.e., is generally vertical), the quantized transform coefficients are more likely to appear in the first several rows of the quantized transform block.

In an example, determining the coding context can include determining a category for the intra-prediction mode using the quantized transform coefficients of the quantized transform block. The category can have a value that is selected from a set that includes a first category value and a second category value. The set can include other values. In an example, determining the coding context can be based on a comparison of a first number of non-zero coefficients in a row of the quantized transform block to a second number of non-zero coefficient in a column of the quantized transform block. The determination can be made using a non-zero map, such as the non-zero map 606 of FIG. 6.

In an example, determining a category for the intra-prediction mode includes determining a difference between a first number of non-zero coefficients in a row of the quantized transform block and a second number of non-zero coefficient in a column of the quantized transform block. The row can be a first row (e.g., top-most row) of the quantized transform block and the column can be a first column (e.g., left-most column) of the quantized transform block. The first row can include more than the top-most row and the first column can include more than the left-most column. For example, the number of rows and columns can depend on the size of the block. For example, for an 8×8 block, the first row can include the two top-most rows and the first column can include the two left-most columns, and for a 32×32 block, the first row can include the four top-most rows and the first column can include the four left-most columns.

Determining the category for the intra-prediction mode can also include, on condition that the difference is greater than a first threshold, setting the category to a first category value and, on condition that the difference is less than a second threshold, setting the category to a second category value. That is, the category can be set to one or a first category value and a second category value based on the comparison. Determining the category for the intra-prediction mode can also include, on condition that the difference is not greater than the first threshold and is not less than the second threshold, setting the category to a third category. The first category, the second category, and the third category can indicate, respectively, that the intra-prediction mode is generally horizontal, generally vertical, and neither horizontal nor vertical (i.e., diagonal).

For example, let $r[i]$ denote the number of non-zero coefficients in the i-th row of the quantized transform block, and let $c[j]$ denote the number of non-zero coefficients in the j-th column of the quantized transform block, where $i=0, 1, \ldots, N-1$ and $j=0, 1, \ldots, N-1$ for a N×N block. In FIG. 6, for example, N is equal to 4 corresponding to the size of the block 604. The number of non-zero coefficients in the 0-th row (i.e., row 614) is $r[0]=3$; the number of non-zero coefficients in the 1-st row (i.e., row 618) is $r[1]=2$; the number of non-zero coefficients in the 0-th column (i.e., column 612) is $c[0]=3$; and the number of non-zero coefficients in the 1-st column (i.e., column 616) is $c[1]=1$. The number of non-zero quantized transform coefficients in a row (i.e., $r[i]$) or a column (i.e., $c[i]$) can be determined using the non-zero map 606.

The process 900 can compare the number of non-zero coefficients in the first row (i.e., $r[0]=3$) to the number of non-zero coefficients in the first column (i.e., $c[0]=3$). The number of non-zero coefficients can be compared to determine a category t of the intra-prediction mode. In an example, the category t can have the values 1, 2, and 0 corresponding, respectively, to a horizontal intra-prediction mode, a vertical intra-prediction mode, and neither horizontal nor vertical intra-prediction mode (i.e., diagonal). The compression gain of an encoder can be related to the number of possible values of the category t. If the category t can have three (3) values (e.g., 0, 1, 2), then the compression gain in encoding the intra-prediction mode can be $\log_2(3)$ (i.e., 2) bits for each block that is encoded using intra prediction.

In one example, the process 900 can determine the category t using algorithm (2):

$$\begin{cases} \text{if } c[0] - r[0] > \text{first threshold, then set } t = 1 \\ \text{if } r[0] - c[0] > \text{second threshold, then set } t = 2 \\ \text{otherwise, set } t = 0 \end{cases} \quad (2)$$

That is, if the number of non-zero quantized transform coefficients in the first column (i.e., $c[0]$) is greater than the number of non-zero quantized transform coefficients in the first row (i.e., $r[0]$) by at least a first threshold, then the intra-prediction mode can be categorized as a horizontal intra-prediction mode (i.e., t=1). If the number of non-zero quantized transform coefficients in the first row (i.e., $r[0]$) is greater than the number of non-zero quantized transform coefficients in the first column (i.e., $c[0]$) by at least the second threshold, then the intra-prediction mode can be categorized as a vertical intra-prediction mode (i.e., t=2). Otherwise, the intra-prediction mode can be categorized as diagonal. As described above, the planar intra-prediction mode and the DC intra-prediction mode can be categorized as "diagonal." A category of t=0 (i.e., diagonal) can indicate that the non-zero quantized coefficients are spread throughout the quantized transform block (i.e., not concentrated enough in rows or columns) and, as such, the intra-prediction mode cannot be determined to be horizontal or vertical.

In an example, the first threshold and/or the second threshold can relate to the size of the block of quantized transform coefficients. For example, for a quantized transform block of size N×N, the first threshold can be set to N/4 and the second threshold can be set to N/4. The first threshold and the second threshold can have other values that may, but need not, be related to the quantized transform block size.

Applying the algorithm (2) to the quantized transform block 604 of FIG. 6 results in the category t=0. As described above, $r[0]=3$ and $c[0]=3$. As $r[0]-c[0]$ (i.e., 3−3=0) is not greater than N/4 (i.e., 4/4=1) and $c[0]-r[0]$ (i.e., 0) is also not greater than N/4, the category t is set to 0.

In an example, if the category of intra-prediction mode cannot be determined to be either horizontal or vertical based on a comparison of the number of non-zero quantized transform coefficients in a first row (e.g., the top-most row) of the quantized transform block to the number of non-zero quantized transform coefficients of a first column (e.g., left most column) of the quantized transform block, then a comparison can be made for additional rows and columns. For example, on condition that the difference is not greater than the first threshold and is not less than the second threshold, determining the category based on a comparison of a third number of non-zero coefficients in a second row of the quantized transform block to a fourth number of non-zero coefficient in a second column of the quantized transform block. The first row and the second row are different rows of the quantized transform block. The first column and the second column are different columns of the quantized transform block.

In an example, determining the coding context for the intra-prediction mode can include determining a first coding context using previously coded intra-prediction modes and determining the coding context using the first coding context and the category. The first coding context can be a coding context that is derived based on previously decoded intra-prediction modes and/or previously decoded blocks. The category t can be used to refine the first coding context to determine the coding contest that can provide better compression than the first coding context. For example, if the first coding context has one value (e.g., an index of a coding context), the category t can be used to split the value into three (e.g., each value corresponding to a possible value of t) different context index values.

The process 900 can determine a first coding context, intra_mode_ctx, as described with respect to the entropy encoder 716 of FIG. 7A. The first coding context, intra_mode_ctx, can be selected from a first set of coding contexts for the intra-prediction mode. The first coding context intra_mode_ctx can be the index of selected context of the set of coding contexts for the intra-prediction mode. The coding context, new_intra_mode_ctx, can be determined as a function of the first coding context, intra_mode_ctx and the category t as $$\text{new\_intra\_mode\_ctx} = f(\text{intra\_mode\_ctx}, t) \quad (3)$$

The function $f$ of equation (3) can be a function that maps (intra_mode_ctx, t) into an index in an allowable range of available coding contexts. Any number of mapping functions can be available as long as there exists at least one intra_mode_ctx such that (intra_mode_ctx, t) is mapped to at least two distinct indices. In other words, for the at least one intra_mode_ctx, there exist two values of t, $t_a$ and $t_b$, such that $t_a \neq t_b$ and (intra_mode_ctx, $t_a$)≠(intra_mode_ctx, $t_b$). An example of a mapping function f can be given by equation (4) below. Another example can be given by equation (5)

$$f(\text{intra\_mode\_ctx}, t) = t * \text{NUM\_CONTEXTS} + \text{intra\_mode\_ctx} \quad (4)$$

$$f(\text{intra\_mode\_ctx}, t) = \text{intra\_mode\_ctx} * 3 + t. \quad (5)$$

In equation (4), NUM_CONTEXTS can be the number of distinct values of intra_mode_ctx (i.e., the number of context models in the set of coding contexts for the intra-prediction mode). The process 900 can have available more context models to select the coding context (i.e., new_intra_mode_ctx) than are available for selecting intra_mode_ctx. As such, an encoder that implements the process 900, such as the encoder 1000 of FIG. 10 (described below), can have available to an intra-prediction entropy encoder, such as the entropy encoder 1002, additional coding contexts than the entropy encoder 716 of the encoder 700 of FIG. 7. The coding contexts available to the entropy encoder 1002 of FIG. 10 can include the coding contexts available to the entropy encoder 716.

At 906, the process 900 codes the intra-prediction mode using the coding context. When implemented by an encoder, coding the intra-prediction mode using the coding context includes encoding, in an encoded bitstream, the intra-prediction mode using the context. When implemented by a decoder, coding the intra-prediction mode using the coding context includes decoding, from an encoded bitstream, the intra-prediction mode using the context.

In some implementations, the process 900, at 904, can use a portion of a row and a portion of a column of the quantized transform block to determine the category t. The portion can be any contiguous or non-contiguous portion. In an example, the portion of the row (column) can be the second half of the row (column). That is, for a quantized transform block of size N×N where a row Row(i) (Column(i)) includes the quantized transform coefficients Row(i, x) (Column(x, i)), where x=0, 1, ..., N−1, the second half of the row (column) includes the quantized transform coefficients Row(i, m) (Column(m, i)), where m=N/2, ..., N−1. If r[i] denotes the number of non-zero coefficients in the second half of the i-th row and let c[j] denote the number of non-zero coefficients in the second half of the j-th column, then the category t can be determined using algorithm (6):

$$\begin{cases} \text{if } c[0] > 0 \text{ and } r[0] == 0, \text{ set } t = 1 \\ \text{if } r[0] > 0 \text{ and } c[0] == 0, \text{ set } t = 2 \\ \text{otherwise, set } t = 0 \end{cases} \quad (6)$$

In algorithm (6), if the first column of the quantized transform block includes non-zero quantized transform coefficients in the second portion of the first column (i.e., c[0]>0) and there are no non-zero quantized transform coefficients in the second portion of the first row (i.e., r[0]==0), then the category t is set to 1 indicating, for example, a generally horizontal intra-prediction mode. If the first row of the quantized transform block includes non-zero quantized transform coefficients in the second portion of the first row (i.e., r[0]>0) and there are no non-zero quantized transform coefficients in the second portion of the first column (i.e., c[0]==0), then the category t is set to 2 indicating, for example, a generally vertical intra-prediction mode. Otherwise, the category t is to zero indicating, for example, neither horizontal nor vertical intra-prediction mode. In some examples, instead of setting the category t to 0 after evaluating the portions of the first row and column, the algorithm (6) can be applied to another row and column. The process 900 can be applied repeatedly up to a predetermined number of rows and columns until a category of 1 or 2 can be set for the category t. For example, the process 900 can stop after N/2 rows and columns are examined.

The algorithm (6) can use thresholds other than 0 to determine the category t. For example, the category can be determined using algorithm (7):

if $c[0]$>third threshold and $r[0]$≤fourth threshold,
   set $t=1$ if $r[0]$>third threshold and $c[0]$≤fourth threshold,
   set $t=2$ otherwise, set $t=0$ \quad (7)

In algorithm (7), the third threshold and the fourth threshold can be such that 0≤fourth threshold≤third threshold.

In yet another example, the process 900 can determine the category t using the values of the quantized transform coefficients. For example, the absolute values of the coefficients can be used. For example, let r[i] denote the sum of the absolute values of the quantized transform coefficients in the i-th row of the quantized transform block and let c[i] denote the sum of the absolute values of the quantized transform coefficients of the transform block in the j-th column. The value of category t can be determined using algorithm (8):

$$\begin{cases} \text{if } c[0] > 2 * r[0], \text{ set } t = 1 \\ \text{if } r[0] > 2 * c[0], \text{ set } t = 2 \\ \text{otherwise, set } t = 0 \end{cases} \quad (8)$$

In algorithm (8), if the total sum of the absolute values of the quantized transform coefficients in the first column is greater than twice the total sum of the absolute values of the quantized transform coefficients in the first row, then the category t is set to 1 indicating, for example, a generally horizontal intra-prediction mode. If the total sum of the absolute values of the quantized transform coefficients in the first row is greater than twice the total sum of the absolute values of the quantized transform coefficients in the first column, then the category t is set to 2 indicating, for example, a generally vertical intra-prediction mode. Otherwise, the category t is set to 0.

While the category t is described as having the values 0, 1, and 2, implementations according to this disclosure are no so limited. The category t can have any number of values. For example, additional values of the category t can be used to provide additional granularity regarding the angle of the horizontal and vertical intra-prediction modes.

In an implementation, the process 900 can include determining an intra-prediction mode predictor p using the quantized transform coefficients and encoding whether the intra-prediction mode predictor and the intra prediction mode are the same. The intra-prediction mode predictor p inversely predicts the intra-prediction mode based on the distribution of the decoded quantized transform coefficients. If, for example, the decoded non-zero quantized transform coefficients are skewed toward the first several columns of the quantized transform block, then a generally horizontal intra-prediction mode can be selected. If the decoded non-zero quantized transform coefficients are skewed toward the first several rows of the quantized transform block, then a generally vertical intra-prediction mode can be selected.

The intra-prediction mode predictor p can be determined using a significance map of the quantized transform coefficients. The significance map can be as described with respect to the non-zero map 606 of FIG. 6. In another example, the intra-prediction mode predictor p can be a function of the absolute values of the quantized transform coefficients or a function of the squared values of the quantized transform coefficients. The squared values of the quantized transform coefficients can be indicative of the distribution of energy in the block of quantized transform coefficients. For example, the intra-prediction mode predictor p can indicate a generally vertical intra-prediction mode when the energy is concentrated in, e.g., the first several rows of the block of quantized transform coefficients, and can indicate a generally horizontal intra-prediction mode when the energy is concentrated in, e.g., the first several columns of block of quantized transform coefficients. The intra-prediction mode predictor p can then be selected according to where the energy is concentrated.

The process 900 can determine the intra-prediction mode predictor p based on a comparison of a number of non-zero quantized coefficients in rows and columns of the quantized transform block as described above. The intra-prediction mode predictor p can be indicative of the prediction angle. In an example, the intra-prediction mode predictor p can have the value of an intra-prediction mode that is generally horizontal or generally vertical. For example, and using the intra-prediction modes described with respect to FIG. 8 as an illustration, the intra-prediction mode predictor p can have a value corresponding to one of the horizontal intra-prediction modes (e.g., modes 6-14) or one of the vertical intra-prediction modes (e.g., modes 22-30).

The process 900, when implemented by an encoder, can set a syntax element to a value (e.g., 0) when the intra-prediction mode predictor and the intra prediction mode are the same. If the indicators indicates that the intra-prediction mode m is equal to the intra-prediction mode predictor p (i.e., m=p), then a decoder can use the encoded intra-prediction mode to decode the current block. The syntax element can be set another value (e.g., 1), followed by an encoding of the intra-prediction mode, when the intra-prediction mode predictor and the intra prediction mode are not the same.

As another example, the intra prediction mode m can be encoded (and decoded by a decoder such as a decoder 1200 of FIG. 12) differentially by, for example, encoding the difference between the intra prediction mode m and the intra-prediction mode predictor p (i.e., m−p).

As the quantized transform coefficients are available at a decoder (e.g., in an encoded bitstream), the decoder can determine the category t and the intra prediction mode predictor p from the quantized transform coefficients as described above.

Figure 10:
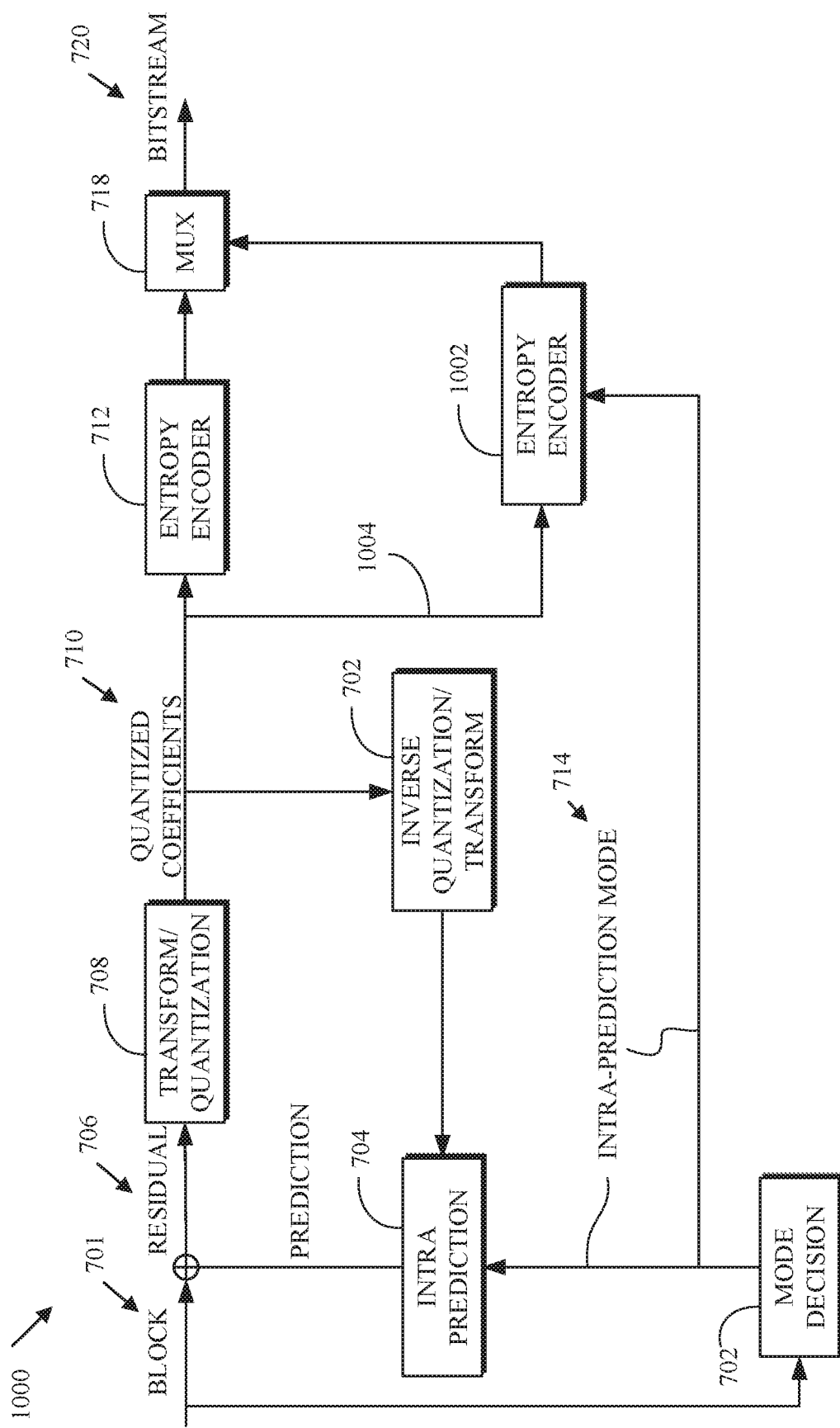
FIG. 10 is a block diagram of an encoder according to implementations of this disclosure.

FIG. 10 is an example of an encoder 1000 according to implementations of this disclosure. The encoder 1000 can implement the process 900 and depicts, in more detail, aspects of the encoder 400 of FIG. 4.

The encoder 1000 can use information in residual blocks to improve the compression performance of intra-prediction modes. The encoder 1000 includes some of the same components as those of the encoder 700. Descriptions of components of the encoder 1000 that are common with or similar to, the encoder 700 are omitted. The encoder 1000 includes the mode decision 702, the intra prediction 704, the transform/quantization 708, the inverse quantization/transform 722, an entropy encoder 1002, the entropy encoder 712, and the multiplexer 718. In an example, the encoder 1000 can provide improvements to the encoder 700 of FIG. 7. For example, the encoder 1000 can provide the entropy encoder 1002, in place of the entropy encoder 716 of the encoder 700 of FIG. 7, according to implementations of this disclosure.

The block 701 can be a block of the input video stream 300 of FIG. 4. The bitstream 720 can be the compressed bitstream 420 of FIG. 4. The mode decision 702 and the intra prediction 704 can be, can be implemented by, or can be implemented similarly to, the intra/inter prediction stage 402 of FIG. 4. The transform/quantization 708 can be, can be implemented by, or can be implemented similarly to, the transform stage 404 and the quantization stage 406 of FIG. 4. The inverse quantization/transform 722 can be, can be implemented by, or can be implemented similarly to, the dequantization stage 410 and the inverse transform stage 412 of FIG. 4. The entropy encoder 1002 can be, can be implemented by, or can be implemented similarly to, the entropy encoding stage 408 of FIG. 4. The entropy encoder 1002 and the entropy encoder 712 can be the same entropy encoder. The entropy encoder 1002 can be separate from, by functionally similar to, the entropy encoder 712.

An intra-prediction mode 714 for encoding the block 701 can be determined by the mode decision 702. The intra prediction 704 can encode the block 701 using the intra-prediction mode 714 determined by the mode decision 702. The encoder 700 generates a residual block 706, as described with respect to FIG. 4. The transform/quantization 708 transforms the residual block into a transform block and quantizes the transform block to produce a quantized transform block of quantized transform coefficients 710.

The entropy encoder 712 produces entropy encoded quantized coefficients. The entropy encoder 1002 receives the intra-prediction mode 714 determined by the mode decision 702 and receives, along path 1004, the quantized transform coefficients 710. The entropy encoder 1002 uses the quantized transform coefficients 710, as described with respect to FIG. 9, to encode the intra-prediction mode. Encoding the intra-prediction mode can include determining a context model for encoding the intra-prediction mode. The entropy encoded intra-prediction mode and the entropy encoded quantized coefficients can be multiplexed (e.g., added) into the bitstream 720 by the multiplexer 718.

Figure 11:
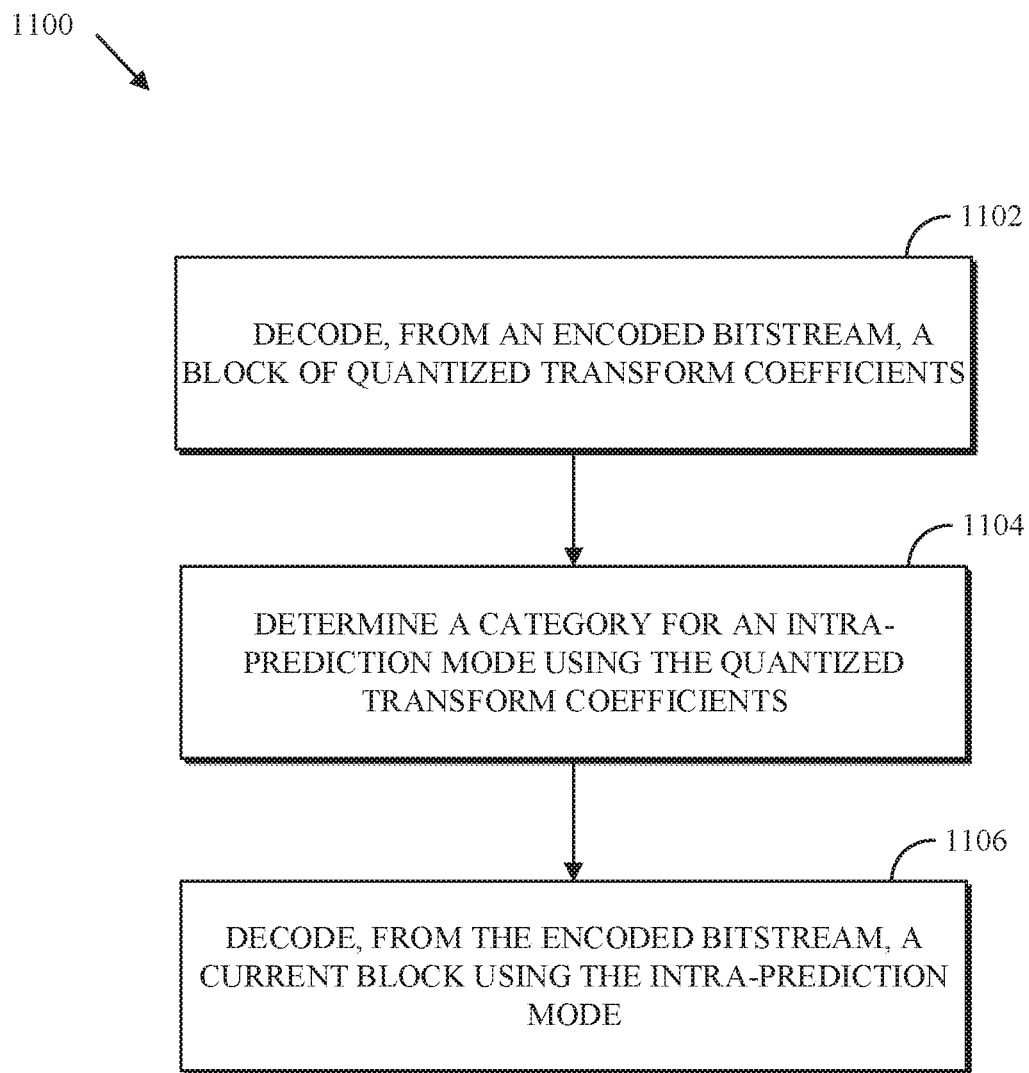
FIG. 11 is a flowchart diagram of a process for decoding a current block using an intra-prediction mode according to an implementation of this disclosure.

FIG. 11 is a flowchart diagram of a process 1100 for decoding a current block using an intra-prediction mode according to an implementation of this disclosure. The process 1100 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the process 1100.

The process 1100 can be implemented using specialized hardware or firmware. Some computing devices can have multiple memories, multiple processors, or both. The steps or operations of the process 1100 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 1100 can be implemented in a decoder such as the decoder 500 of FIG. 5. The process 1100 can be implemented in an encoder, such as in the reconstruction path of the encoder 400 of FIG. 4.

At 1102, the process 1100 decodes, from an encoded bitstream, quantized transform coefficients of a quantized transform block.

At 1104, the process 1100 determines a category for the intra-prediction mode using the quantized transform coefficients. The category can be one of horizontal, vertical, and other (i.e., not horizontal or vertical, e.g., diagonal). For example, the process 1100 can determine a distribution of the non-zero quantized transform coefficients, as described above with respect to the process 900, to determine the category of the intra-prediction mode. For example, if the non-zero coefficients of the quantized transform block are concentrated in the first several rows (e.g., the first row), then the intra-prediction mode is determined to be likely vertical; if the non-zero coefficients are concentrated in the first several columns (e.g., the first column), then the intra-prediction mode is determined to be likely horizontal. If the non-zero coefficients are not concentrated in rows or columns, then the intra-prediction mode is more likely to be diagonal (e.g., DC, planar, or a diagonal prediction mode). As such, depending on the distribution of the non-zero decoded quantized coefficients, the intra-prediction mode can be classified as described above with respect to the category t (e.g., into one three values).

In an example, decoding the current block using the category includes determining a first context for decoding the intra-prediction mode, determining a second context model using the category and the first context, and decoding the intra-prediction mode using the second context. The first context and the second context can be determined as described above with the respect to FIG. 9. The first context can be determined using the intra-prediction modes of previously decoded blocks, the size of the current block, the color component of the current block (e.g., luminance or chrominance), other criteria, or a combination thereof.

At 1106, the process 1100 decodes, from the encoded bitstream, the current block using the category.

In some implementations, the process 1100 can include decoding, from the encoded bitstream, whether an intra-prediction mode predictor is the same as the intra-prediction mode. The intra-prediction mode predictor can be a prediction of the intra-prediction mode and is determined by an encoder using the quantized transform coefficients as described with respect to FIG. 9.

Figure 12:
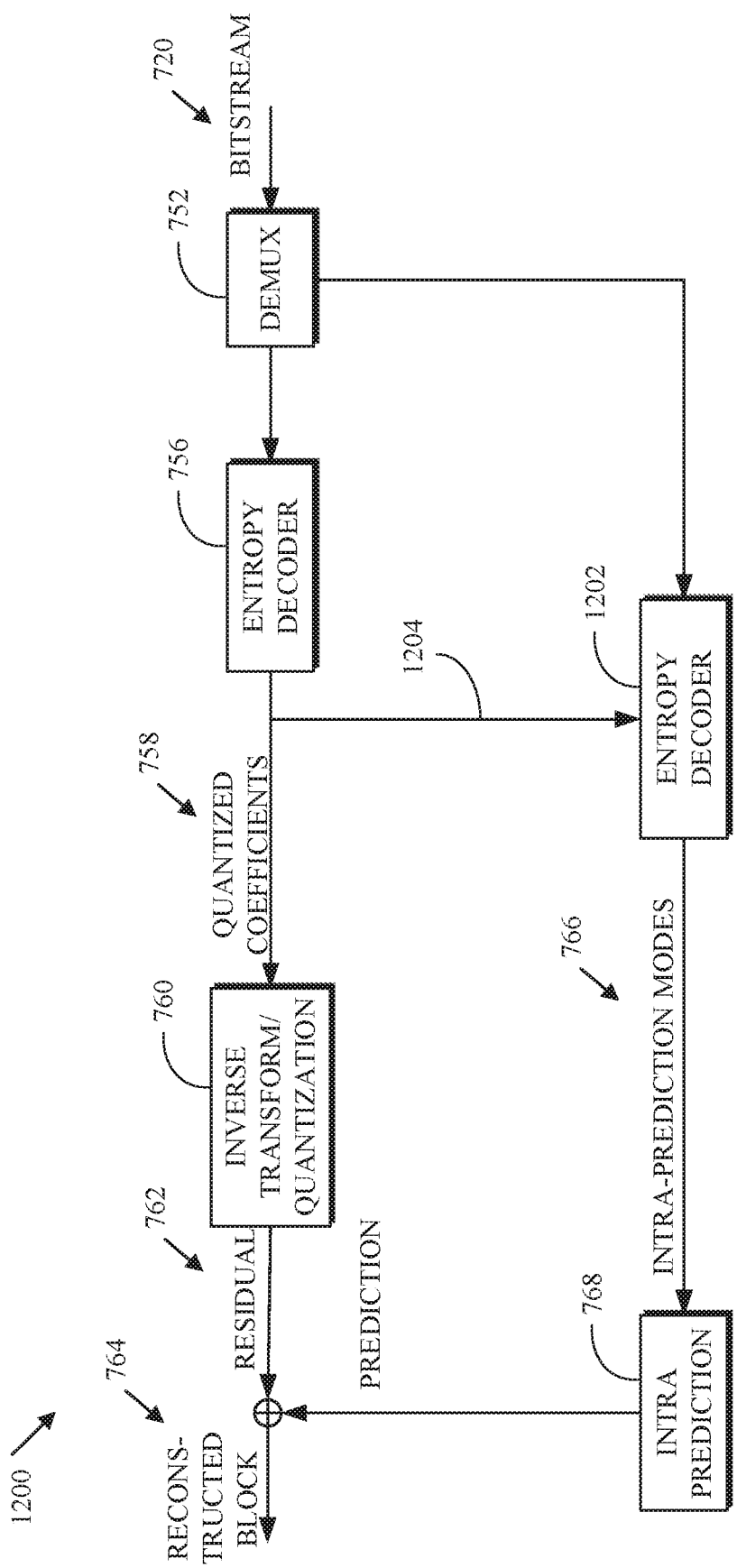
FIG. 12 is a block diagram of a decoder according to implementations of this disclosure.

FIG. 12 is an example of a decoder 1200 according to implementations of this disclosure. The decoder 1200 can implement the process 1100 and depicts, in more detail, aspects of the decoder 500 of FIG. 5. The decoder 1200 can also implement the process 900.

The decoder 1200 can use quantized transform coefficient information in an encoded bitstream to determine an intra prediction mode for decoding the current block. The encoded bitstream can be the bitstream 720 that is received from, generated by, or output by an encoder such as the encoder 1000 of FIG. 10. The decoder 1200 generates the reconstructed block 764.

The decoder 1200 includes some of the same components as those of the decoder 750 of FIG. 7B. Descriptions of components of the decoder 1200 that are common with, or similar to those of, the decoder 750 are omitted. The decoder 750 includes the de-multiplexer 752, the entropy decoder 756, an entropy decoder 1202, the inverse quantization/transform 760, and intra prediction 768.

The entropy decoder 1202 receives, along path 1204, the quantized transform coefficients 758, which are entropy decoded by the entropy decoder 756. The entropy decoder 1202 also receives an entropy encoded intra-prediction mode from the de-multiplexer 752. The entropy decoder 1202 can determine a category for the intra-prediction mode as described with respect to FIG. 1100. The entropy decoder 1202 uses the category of the intra-prediction mode and the quantized transform coefficients 758 to decode the intra-prediction mode.

Figure 13:
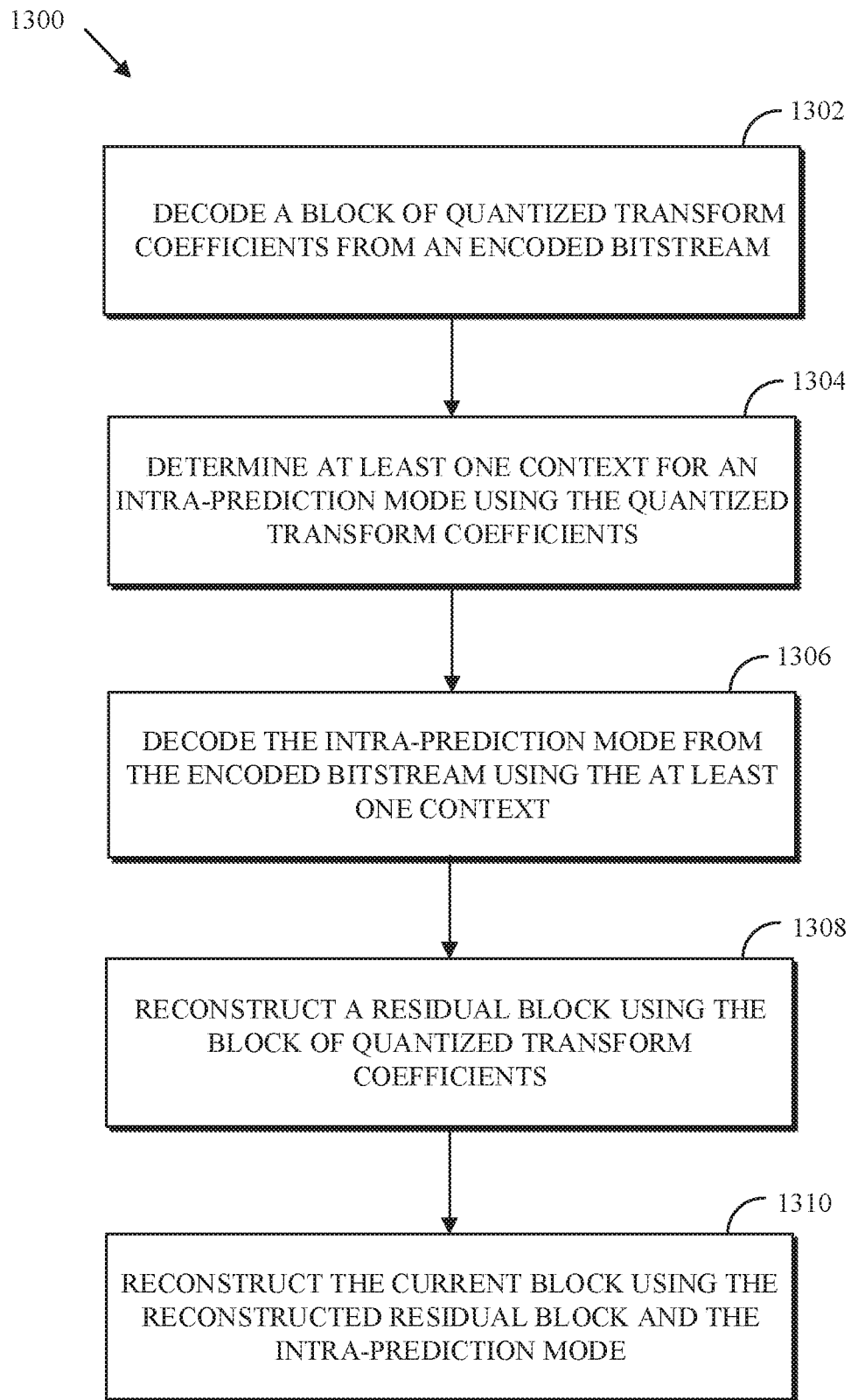
FIG. 13 is a flowchart diagram of a process for reconstructing a current block using an intra-prediction mode according to an implementation of this disclosure.

FIG. 13 is a flowchart diagram of a process 1300 for reconstructing a current block using an intra-prediction mode according to an implementation of this disclosure. The current block can be reconstructed from an encoded bitstream. The encoded bitstream can be the bitstream 420 of FIG. 5. The bitstream can be the bitstream received by the reconstruction stage 414 and/or the bitstream of the reconstruction path of FIG. 4.

At 1302, the process 1300 decodes a block of quantized transform coefficients from the encoded bitstream. Decoding the block of quantized transform coefficients can be as described with respect to the process 900 at 902. At 1304, the process 1300 determines at least one context for the intra-prediction mode using the quantized transform coefficients. Determining the context can be as described above with respect to the process 900 at 904. The encoded bitstream can include more than one intra-prediction modes for the current block. As such, at least one intra-prediction mode can be determined using the quantized transform coefficients.

At 1306, the process 1300 decodes the intra-prediction mode from the encoded bitstream using the at least one context. At 1308, the process 1300 reconstructs a residual block using the block of quantized transform coefficients. When the process 1300 is implemented in an encoder, reconstructing the residual block can be as described with respect to the intra prediction 704 of FIG. 10. When the process 1300 is implemented in a decoder, reconstructing the residual block can be as described with respect to generating of residual block 762 of FIG. 12.

At 1310, the process 1300 reconstructs the current block using the reconstructed residual block and the intra-prediction mode. When the process 1300 is implemented in an encoder, reconstructing the current block can be as described with respect to the reconstruction path of FIG. 4. When the process 1300 is implemented in a decoder, reconstructing the current block can be as described with respect to generating the reconstructed block 764 of FIG. 12.

Figure 15A:
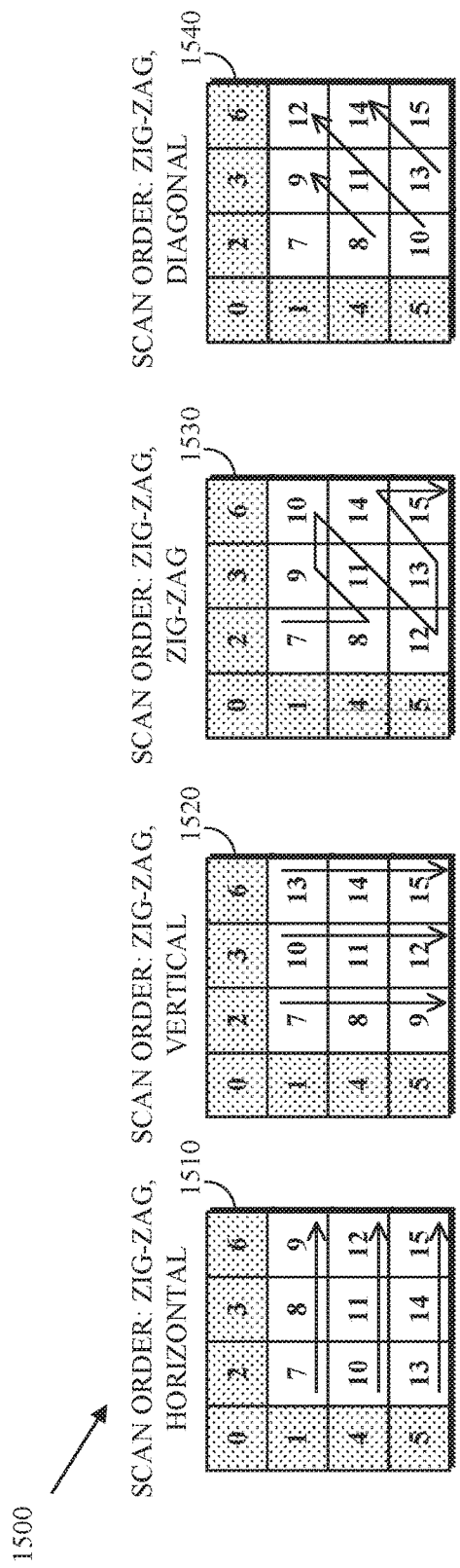
FIG. 15A is a diagram of an example of a set of scan orders for a block that are adapted based on data of a first group of elements of the block.

FIG. 15A is a diagram of an example of a set of scan orders 1500 for a block that are adapted based on data of a first group of elements of the block. The numbers shown in the cells of FIG. 15A are scan order sequence numbers for respective elements of the block at the corresponding locations within the block. The example set of scan orders 1500 includes four scan orders: zig-zag, horizontal scan order 1510; zig-zag, vertical scan order 1520; zig-zag, zig-zag scan order 1530; and zig-zag, diagonal scan order 1540. In the example of FIG. 15A, the block to be coded is partitioned into two groups of elements: a first group that is coded (e.g., encoded or decoded) first using a zig-zag scan order reflected in the scan order sequence numbers 0-6 in the shaded cells of the diagram of FIG. 15A; and a second group that is coded (e.g., encoded or decoded) next using a scan order that is selected or adapted based on the elements from the first group. For example, a horizontal scan order may be selected for the second group, resulting in the zig-zag, horizontal scan order 1510 for the block. For example, a vertical scan order may be selected for the second group, resulting in the zig-zag, vertical scan order 1520 for the block. For example, a zig-zag scan order may be selected for the second group, resulting in the zig-zag, zig-zag scan order 1530 for the block. For example, a diagonal scan order may be selected for the second group, resulting in the zig-zag, diagonal scan order 1540 for the block. In the example of FIG. 15A, the first group includes elements of a first row of the block and elements of a first column of the block. In the example of FIG. 15A, the second group includes all remaining elements of the block outside of the first group. For example, the elements of the block may be quantized transform coefficients. For example, the elements of the block may be quantized transform coefficients of a residual block (e.g., a residual block resulting from intra-frame prediction or a residual block resulting from inter-frame prediction).

Figure 15B:
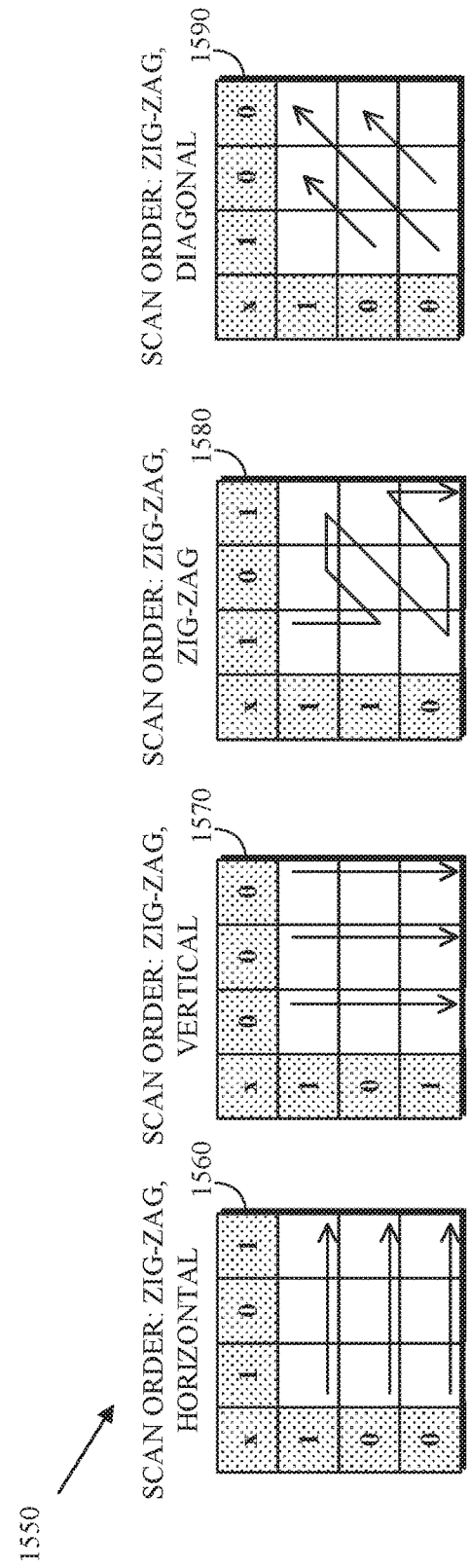
FIG. 15B is a diagram of an example of a set of scan orders for a block that are adapted based on a non-zero map for a first group of elements of the block.

FIG. 15B is a diagram of an example of a set of scan orders 1550 for a block that are adapted based on a non-zero map for a first group of elements of the block. The numbers shown in the cells of FIG. 15B are binary non-zero map values for respective elements of the block at the corresponding locations within the block. The example set of scan orders 1550 includes four scan orders: zig-zag, horizontal scan order 1560; zig-zag, vertical scan order 1570; zig-zag, zig-zag scan order 1580; and zig-zag, diagonal scan order 1590. In the example of FIG. 15B, the block to be coded is partitioned into two groups of elements: a first group that is coded (e.g., encoded or decoded) first using a zig-zag scan order; and a second group that is coded (e.g., encoded or decoded) next using a scan order that is selected or adapted based on a distribution (e.g., counts in certain portions of the first group) of non-zero elements from the first group. In the example of FIG. 15B, the first group includes elements of a first row of the block and elements of a first column of the block. In the example of FIG. 15B, the second group includes all remaining elements of the block outside of the first group. For example, a horizontal scan order may be selected for the second group, resulting in the zig-zag, horizontal scan order 1560 for the block, where a count of non-zero elements in the second half of the first row is positive and a count of non-zero elements in the second half of the first column is zero. For example, a vertical scan order may be selected for the second group, resulting in the zig-zag, vertical scan order 1570 for the block, where a count of non-zero elements in the second half of the first row is zero and a count of non-zero elements in the second half of the first column is positive. For example, a zig-zag scan order may be selected for the second group, resulting in the zig-zag, zig-zag scan order 1580 for the block otherwise (e.g., where a count of non-zero elements in the second half of the first row is positive and a count of non-zero elements in the second half of the first column is positive). For example, a diagonal scan order may be selected for the second group, resulting in the zig-zag, diagonal scan order 1590 for the block otherwise (e.g., where a count of non-zero elements in the second half of the first row is positive and a count of non-zero elements in the second half of the first column is positive). For example, the elements of the block may be quantized transform coefficients. For example, the elements of the block may be quantized transform coefficients of a residual block (e.g., a residual block resulting from intra-frame prediction or a residual block resulting from inter-frame prediction).

In some implementations (not shown), instead of using the zigzag scan order for the first group, other scan orders may be used. For example, an alternating scan order S1 as follows may be used to map a scan position k to a block position (e.g., Cartesian position).

$S1[k]=(0,k>>1)$ if $k$ is even $S1[k]=((k+1)>>1,0)$ if $k$ is odd where k=0, . . . , 2*N−2.

In some implementations (not shown in FIG. 15A), instead of using a zig-zag scan order for the second group as shown in scan order 1530 of FIG. 15A, other scan orders may be used, such as a transposed zig-zag scan order as shown in the table below:

| 7 | 8 | 12 |
| 9 | 11 | 13 |
| 10 | 14 | 15 |

For example, a decision of whether to use the zig-zag scan order for the second block of scan order 1530 or the transposed zig-zag scan order might depend upon the number of the non-zero coefficients in the first row and the first column. If the former is larger, the transposed zig-zag scan order is used for the second group; otherwise the zig-zag, zig-zag scan order 1530 may be used.

In some implementations (not shown), a 225-degree diagonal scan order (downward to the left) may be used for a group of elements from the block instead of the 45-degree diagonal scan order used for the second group in scan order 1540 of FIG. 15A. For example, in a case where the choice is to be made between the 45-degree diagonal scan order or the 225-degree diagonal scan order, the 225-degree diagonal scan order may be chosen if there are more non-zero coefficients in the first column than in the first row, and otherwise the 45-degree diagonal scan order may be chosen.

In some implementations, multi-level scan orders may be used. In these cases, each element in FIGS. 15A and 15B may represent a sub-block of quantized transform coefficients, and the scan order may be used to determine the order to code (e.g., encode with an entropy encoder or decode with an entropy decoder) these sub-blocks. For example, when an element represents a sub-block, a zero in FIG. 15B may indicate the corresponding sub-block consists of all zero coefficients, and one may indicate the corresponding sub-block includes at least one non-zero coefficient.

When multi-level scan orders are used, once the scan order is determined for sub-blocks, the scan order within a sub-block may be derived similarly according to the example above. In some implementations, the scan order within a sub-block may inherit the scan order determined at the sub-block level for the group including the element representing the sub-block. For example, each sub-block in 1560 may use the horizontal scan order, each sub-block in 1570 may use the vertical scan order, each sub-block in 1580 may use the zig-zag scan order, and each sub-block in 1590 may use the diagonal scan order.

Figure 16:
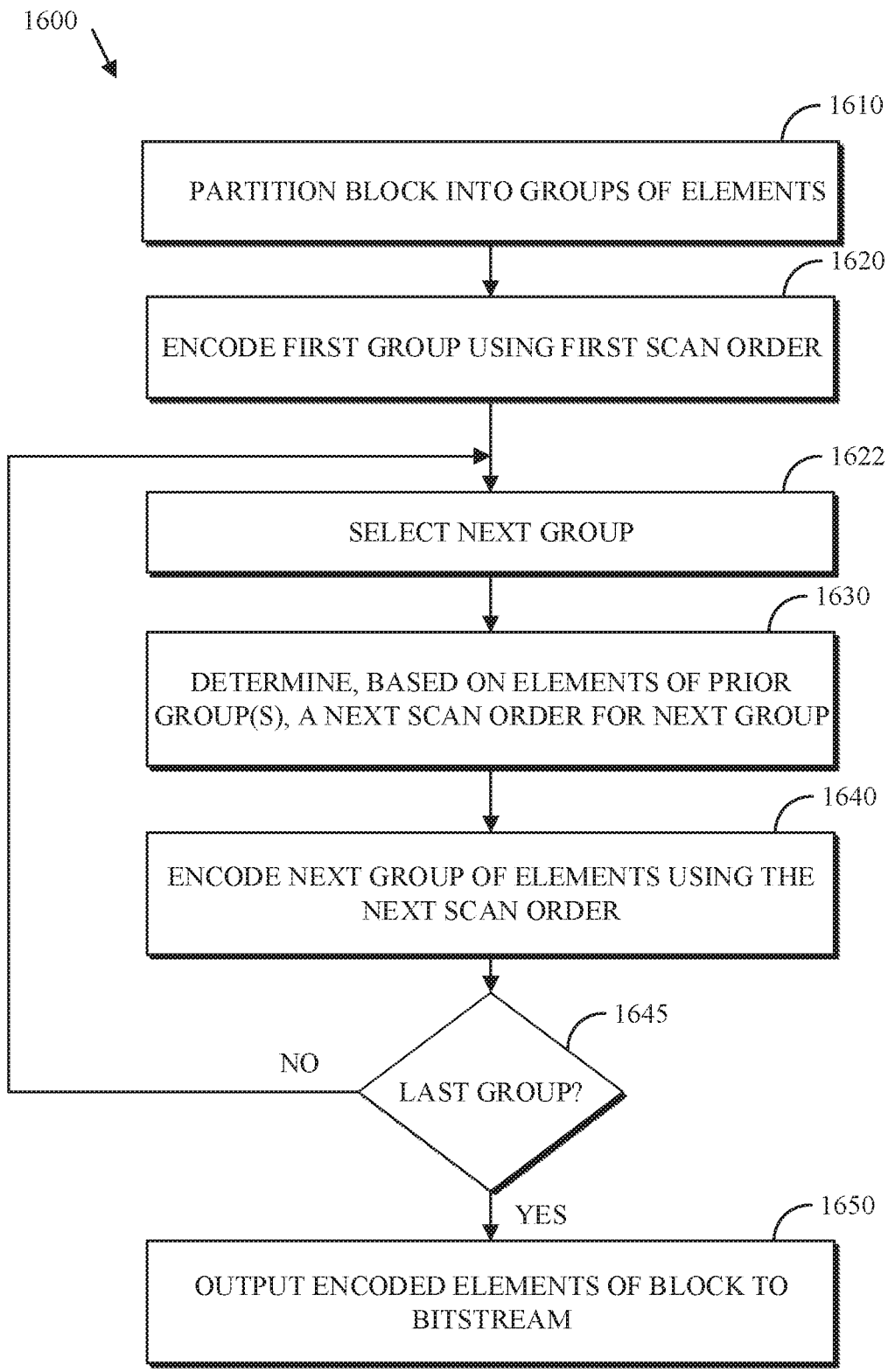
FIG. 16 is a flowchart of an example of a process for adapting scan order to encode a block of video data.

FIG. 16 is a flowchart of an example of a process 1600 for adapting scan order to encode a block of video data. The process 1600 includes partitioning 1610 a block of video data into a plurality of groups of elements; encoding 1620, using an entropy encoder using a first scan order, elements of a first group from the plurality of groups of elements; selecting 1622 a next group from the plurality of groups; determining 1630, based on the elements of the prior group(s), a next scan order for the next group; encoding 1640, using the entropy encoder, using the next scan order, elements of the next group; and continuing (at 1645) to process any remaining groups from the plurality of groups until all groups have been encoded 1640 and then outputting 1650 the encoded elements of the block to a bitstream. For example, the process 1600 may be implemented by the entropy encoder 712. For example, the process 1600 may be implemented by the transmitting station 102. For example, the process 1600 may be implemented by a computing device, such as the computing device 200. For example, the process 1600 may be implemented by a software program including machine-readable instructions that can be stored in a memory such as the memory 204 or the secondary storage 214, and that can be executed by a processor, such as CPU 202, to cause a computing device to perform the process 1600. For example, the process 1600 may be implemented by an encoder such as the encoder 400 of FIG. 4. For example, the process 1600 may be implemented by the entropy encoding stage 408 of the encoder 400 of FIG. 4.

The process 1600 includes partitioning 1610 a block of video data into a plurality of groups of elements. The groups may be disjoint. The block may include a two-dimensional array of elements (e.g., a 4×4, 8×8, 16×16, 32×32, or any other square or rectangular block size). A group from the plurality of groups of elements may be continuous or discontinuous within the structure of the block. For example, the elements of the block may be pixel values (e.g., luminosity values). For example, the elements of the block may be quantized transform coefficients. For example, the elements of the block may be quantized transform coefficients of a residual block (e.g., a residual block resulting from intra-frame prediction or a residual block resulting from inter-frame prediction). For example, the elements of the block may be based on a result of inter-frame prediction. For example, the block may be a residual block resulting from inter-frame prediction. For example, the elements of the block may be based on a result of intra-frame prediction. For example, the block may be a residual block resulting from intra-frame prediction. In some implementations, the plurality of groups includes two groups (e.g., as shown in the examples of FIGS. 15A-B, FIGS. 21A-B, FIG. 22A or FIG. 22B). For example, a first group may include elements of a first row of the block and elements of a first column of the block. In some implementations, the first group includes elements forming a triangle in a corner of the block, and wherein the triangle includes elements of a first row of the block and elements of a first column of the block (e.g., as shown in the examples of FIGS. 21A-B, FIG. 22A or FIG. 22B). In some implementations, the first group includes elements of a first row of the block that are outside of the triangle and elements of a first column of the block that are outside of the triangle (e.g., as shown in the examples of FIG. 22A or FIG. 22B). For example, a shape of the first group may be selected based on a size of the block (e.g., as described in relation to Table 2). For example, a second group may include elements of a first row and a first column of remaining elements of the block outside of the first group, and a third group may include all remaining elements of the block outside of the union of the first group and the second group.

The process 1600 includes encoding 1620, using an entropy encoder using a first scan order, elements of a first group from the plurality of groups of elements. The first scan order may be a default or initial scan order that a compatible entropy decoder is configured to use to decode elements of the first group for the block. For example, the first scan order may be a zig-zag order (e.g., as shown in FIG. 15A). For example, the entropy encoder may employ entropy encoding techniques such as, for example, variable length coding (VLC), context adaptive binary arithmetic coding (CABAC), or context adaptive (multi-symbol) arithmetic coding.

The process 1600 includes selecting 1622 a next group (e.g., a second group) from the plurality of groups of elements of the block.

Figure 21A:
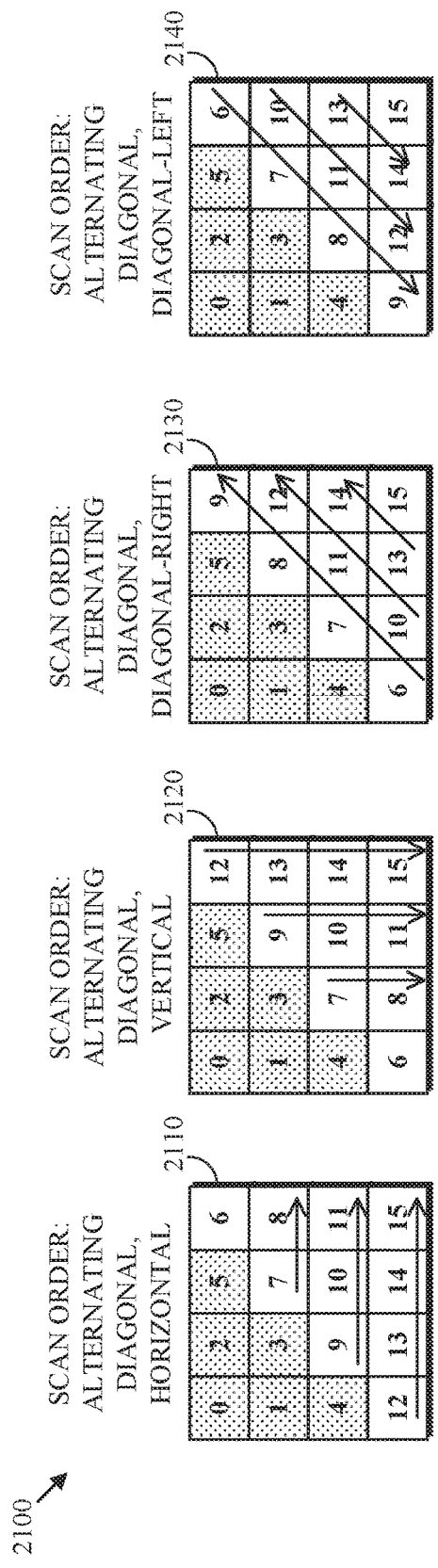
FIG. 21A is a diagram of an example of a set of scan orders for a block that are adapted based on data of a first group of elements of the block.

The process 1600 includes determining 1630, based on the elements of one or more prior groups (e.g., the first group), a next scan order (e.g., a second scan order) for the next group (e.g., the second group) from the plurality of groups of elements. In some implementations, the next scan order may be determined 1630 by selecting from among options including horizontal, vertical, diagonal-right, diagonal-left, zig-zag, etc. (e.g., as illustrated in FIG. 15A and FIG. 21A). For example, the next scan order may be determined 1630 based on a distribution of non-zero elements (e.g., quantized transform coefficients of a residual block) within the first group. For example, the next scan order may be determined 1630 based on a distribution of non-zero elements within a union of prior groups). For example, the process 1800 of FIG. 18A may be implemented to determine 1630 the next scan order. For example, the process 1840 of FIG. 18B may be implemented to determine 1630 the next scan order. In some implementations, the determined 1630 scan order may increase the probability that non-zero elements will be front loaded within the next group or remaining groups and that a sequence of elements at the end of the resulting scan order for the block will be zeros that may be efficiently encoded, implicitly or explicitly, using the entropy encoder.

Figure 25A:
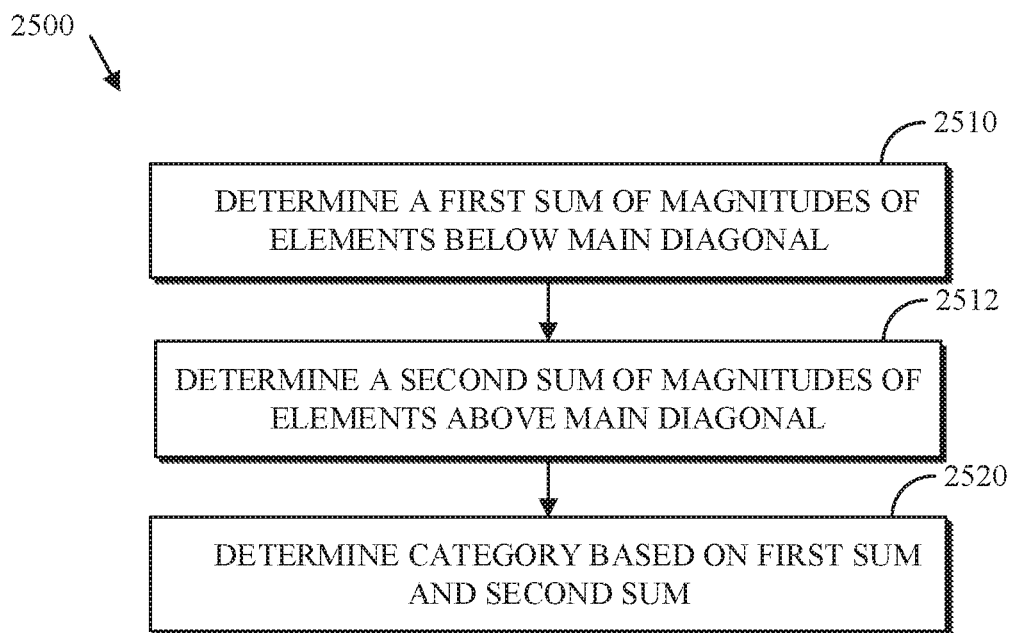
FIG. 25A is a flowchart of an example of a process for determining a category for a block based on a subset of elements of the block of image data.

In some implementations, a process similar to the process 2500 of FIG. 25A may be used to determine 1630 the next scan order (e.g., a second scan order). For example, determining 1630 the second scan order may include determining a first sum of magnitudes of elements in a portion of the first group below a main diagonal of the block and at or above an anti-diagonal of the block; determining a second sum of magnitudes of elements in a portion of the first group above the main diagonal of the block and at or above the anti-diagonal of the block; and determining the second scan order based on the first sum and the second sum. In some implementations, a process similar to the process 2550 of FIG. 25B may be used to determine 1630 the next scan order (e.g., a second scan order). For example, determining 1630 the second scan order may include determining a first count of non-zero elements in a portion of the first group below a main diagonal of the block and at or above an anti-diagonal of the block; determining a second count of non-zero elements in a portion of the first group above the main diagonal of the block and at or above the anti-diagonal of the block; and determining the second scan order based on the first count and the second count.

The process 1600 includes encoding 1640, using the entropy encoder using the next scan order (e.g., the second scan order), elements of the next group (e.g., the second group) from the plurality of groups of elements of the block. For example, the next scan order may be a horizontal scan order, a vertical scan order, a diagonal-right scan order, a diagonal-left scan order, a zig-zag scan order, etc. (e.g., as shown in FIG. 15A and FIG. 21A). For example, the entropy encoder may employ entropy encoding techniques such as, for example, variable length coding (VLC), context adaptive binary arithmetic coding (CABAC), or context adaptive (multi-symbol) arithmetic coding. In some implementations, by adapting the scan order for the next group, the coding efficiency of the entropy encoder may be improved.

If (at 1645) the last group from the plurality of groups of elements of the block has not yet been encoded, then the next group is selected 1622 and the processing of groups continues to encode remaining elements of the block.

When (at 1645) the last group from the plurality of groups of elements of the block has been encoded, the encoded elements of the block are output 1650 to an encoded bitstream. For example, the encoded elements may be output from the entropy encoder 712 through the multiplexer 718 to be included in the bitstream 720 that bears a video signal including the block. In some implementations, the bitstream may be stored (e.g., in memory or on a disk) or transmitted (e.g., via network communication link). In some implementations (not shown), encoded elements may be output to an encoded bitstream as they become available.

In some implementations, the process 1600 adjusts the scan order for the next stage on the fly based on information collected at a current stage. For example, let X denote an N×M block that has N>0 rows and M>0 columns. The process 1600 may be implemented by specialized hardware and/or software that performs operations corresponding to the following pseudocode:

1. Partition X into K non-overlapping groups, denoted by X[1], X[2], . . . , X[K], respectively.
2. Use a default scan order (e.g., zigzag, diagonal, etc.) to encode X[1].
3. Set k=2.
4. Determine the scan order to encode X[k] based on X[1], . . . , X[k−1].
5. Encode X[k] by using the determined scan order.
6. Increase k by 1.
7. Repeat Steps 4-6 until k=K+1.

Figure 17:
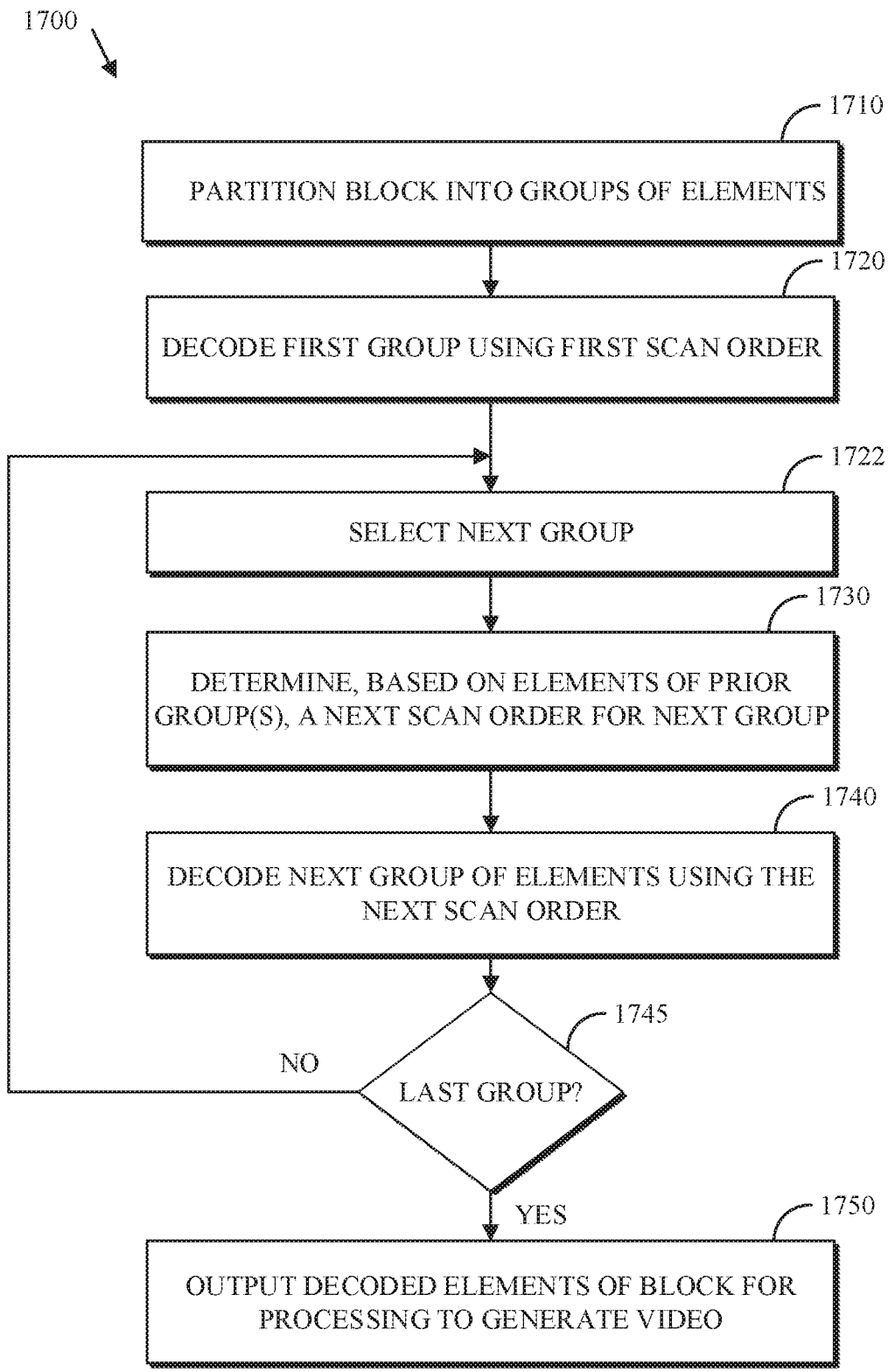
FIG. 17 is a flowchart of an example of a process for adapting scan order to decode a block of video data.

FIG. 17 is a flowchart of an example of a process 1700 for adapting scan order to decode a block of video data. The process 1700 includes partitioning 1710 a block of video data into a plurality of groups of elements; decoding 1720, using an entropy decoder, data from an encoded bitstream to obtain, using a first scan order, elements of a first group from the plurality of groups of elements; selecting 1722 a next group from the plurality of groups; determining 1730, based on the elements of the prior group(s), a next scan order for the next group; decoding 1740, using the entropy decoder, data from the encoded bitstream to obtain, using the next scan order, elements of the next group; and continuing (at 1745) to process any remaining groups from the plurality of groups until all groups have been decoded 1740 and then outputting 1750 the decoded elements of the block for processing to generate video. For example, the process 1700 may be implemented by the entropy decoder 756. For example, the process 1700 may be implemented by the receiving station 106. For example, the process 1700 may be implemented by a computing device, such as the computing device 200. For example, the process 1700 may be implemented by a software program including machine-readable instructions that can be stored in a memory such as the memory 204 or the secondary storage 214, and that can be executed by a processor, such as CPU 202, to cause a computing device to perform the process 1700. For example, the process 1700 may be implemented by a decoder such as the decoder 500 of FIG. 5. For example, the process 1700 may be implemented by the entropy decoding stage 502 of the decoder 500 of FIG. 5.

The process 1700 includes partitioning 1710 a block of video data into a plurality of groups of elements. The groups may be disjoint. The block may include a two-dimensional array of elements (e.g., a 4×4, 8×8, 16×16, 32×32, or any other square or rectangular block size). A group from the plurality of groups of elements may be continuous or discontinuous within the structure of the block. For example, the elements of the block may be pixel values (e.g., luminosity values). For example, the elements of the block may be quantized transform coefficients. For example, the elements of the block may be quantized transform coefficients of a residual block (e.g., a residual block resulting from intra-frame prediction or a residual block resulting from inter-frame prediction). For example, the elements of the block may be based on a result of inter-frame prediction. For example, the block may be a residual block resulting from inter-frame prediction. For example, the elements of the block may be based on a result of intra-frame prediction. For example, the block may be a residual block resulting from intra-frame prediction. In some implementations, the plurality of groups includes two groups (e.g., as shown in the examples of FIGS. 15A-B, FIGS. 21A-B, FIG. 22A or FIG. 22B). For example, a first group may include elements of a first row of the block and elements of a first column of the block. In some implementations, the first group includes elements forming a triangle in a corner of the block, and wherein the triangle includes elements of a first row of the block and elements of a first column of the block (e.g., as shown in the examples of FIGS. 21A-B, FIG. 22A or FIG. 22B). In some implementations, the first group includes elements of a first row of the block that are outside of the triangle and elements of a first column of the block that are outside of the triangle (e.g., as shown in the examples of FIG. 22A or FIG. 22B). For example, a shape of the first group may be selected based on a size of the block (e.g., as described in relation to Table 2). For example, a second group may include all remaining elements of the block outside of the first group. In some implementations, the plurality of groups includes more than two groups of elements. For example, a second group may include elements of a first row and a first column of remaining elements of the block outside of the first group, and a third group may include all remaining elements of the block outside of the union of the first group and the second group.

The process 1700 includes decoding 1720, using an entropy decoder, data from an encoded bitstream to obtain, using a first scan order, elements of a first group from the plurality of groups of elements. The first scan order may be a default or initial scan order that a compatible entropy encoder is configured to use to encode elements of the first group for the block. For example, the first scan order may be a zig-zag order (e.g., as shown in FIG. 15A). For example, the entropy decoder may employ entropy decoding techniques such as, for example, variable length coding (VLC), context adaptive binary arithmetic coding (CABAC), or context adaptive (multi-symbol) arithmetic coding.

The process 1700 includes selecting 1722 a next group (e.g., a second group) from the plurality of groups of elements of the block.

The process 1700 includes determining 1730, based on the elements of one or more prior groups (e.g., the first group), a next scan order (e.g., a second scan order) for the next group (e.g., the second group) from the plurality of groups of elements. In some implementations, the next scan order may be determined 1730 by selecting from among options including horizontal, vertical, diagonal-right, diagonal-left, zig-zag, etc. (e.g., as illustrated in FIG. 15A and FIG. 21A). For example, the next scan order may be determined 1730 based on a distribution of non-zero elements (e.g., quantized transform coefficients of a residual block) within the first group. For example, the next scan order may be determined 1730 based on a distribution of non-zero elements within a union of prior groups). For example, the process 1800 of FIG. 18A may be implemented to determine 1730 the next scan order. For example, the process 1840 of FIG. 18B may be implemented to determine 1730 the next scan order. In some implementations, the determined 1730 scan order may increase the probability that non-zero elements will be front loaded within the next group or remaining groups and that a sequence of elements at the end of the resulting scan order for the block will be zeros that may be efficiently decoded, implicitly or explicitly, using the entropy decoder.

In some implementations, a process similar to the process 2500 of FIG. 25A may be used to determine 1730 the next scan order (e.g., a second scan order). For example, determining 1730 the second scan order may include determining a first sum of magnitudes of elements in a portion of the first group below a main diagonal of the block and at or above an anti-diagonal of the block; determining a second sum of magnitudes of elements in a portion of the first group above the main diagonal of the block and at or above the anti-diagonal of the block; and determining the second scan order based on the first sum and the second sum. In some implementations, a process similar to the process 2550 of FIG. 25B may be used to determine 1730 the next scan order (e.g., a second scan order). For example, determining 1730 the second scan order may include determining a first count of non-zero elements in a portion of the first group below a main diagonal of the block and at or above an anti-diagonal of the block; determining a second count of non-zero elements in a portion of the first group above the main diagonal of the block and at or above the anti-diagonal of the block; and determining the second scan order based on the first count and the second count.

The process 1700 includes decoding 1740, using the entropy decoder, data from the encoded bitstream to obtain, using the next scan order (e.g., the second scan order), elements of next group (e.g., the second group) from the plurality of groups of elements of the block. For example, the next scan order may be a horizontal scan order, a vertical scan order, a diagonal-right scan order, a diagonal-left scan order, a zig-zag scan order, etc. (e.g., as shown in FIG. 15A and FIG. 21A). For example, the entropy decoder may employ entropy decoding techniques such as, for example, variable length coding (VLC), context adaptive binary arithmetic coding (CABAC), or context adaptive (multi-symbol) arithmetic coding. In some implementations, by adapting the scan order for the next group, the coding efficiency of the entropy decoder may be improved.

If (at 1745) the last group from the plurality of groups of elements of the block has not yet been decoded, then the next group is selected 1722 and the processing of groups continues to decode remaining elements of the block.

When (at 1745) the last group from the plurality of groups of elements of the block has been decoded, the decoded elements of the block are output 1750 for processing to generate video. For example, the decoded elements may be output 1750 from the entropy decoder 756 through the inverse quantization/transform 760 and used to generate the reconstructed block 764 that forms part of a video. In some implementations, the resulting video may be stored (e.g., in the memory 204 or the secondary storage 214), transmitted (e.g., via a network communication link), or displayed (e.g., in a user interface, such as on screen or a projection). For example, the process 1700 may include displaying video that is generated based in part on the decoded elements of the block (e.g., where the elements of the block are quantized transform coefficients of a residual block).

In some implementations, the process 1700 adjusts the scan order for the next stage on the fly based on information collected at a current stage. For example, let X denote an N×M block that has N>0 rows and M>0 columns. The process 1700 may be implemented by specialized hardware and/or software that performs operations corresponding to the following pseudocode:

1. Partition X into K non-overlapping groups, denoted by X[1], X[2], ..., X[K], respectively.
2. Use a default scan order (e.g., zigzag, diagonal, etc.) to decode X[1].
3. Set k=2.
4. Determine the scan order to decode X[k] based on X[1], ..., X[k−1].
5. Decode X[k] by using the determined scan order.
6. Increase k by 1.
7. Repeat Steps 4-6 until k=K+1.

Figure 18A:
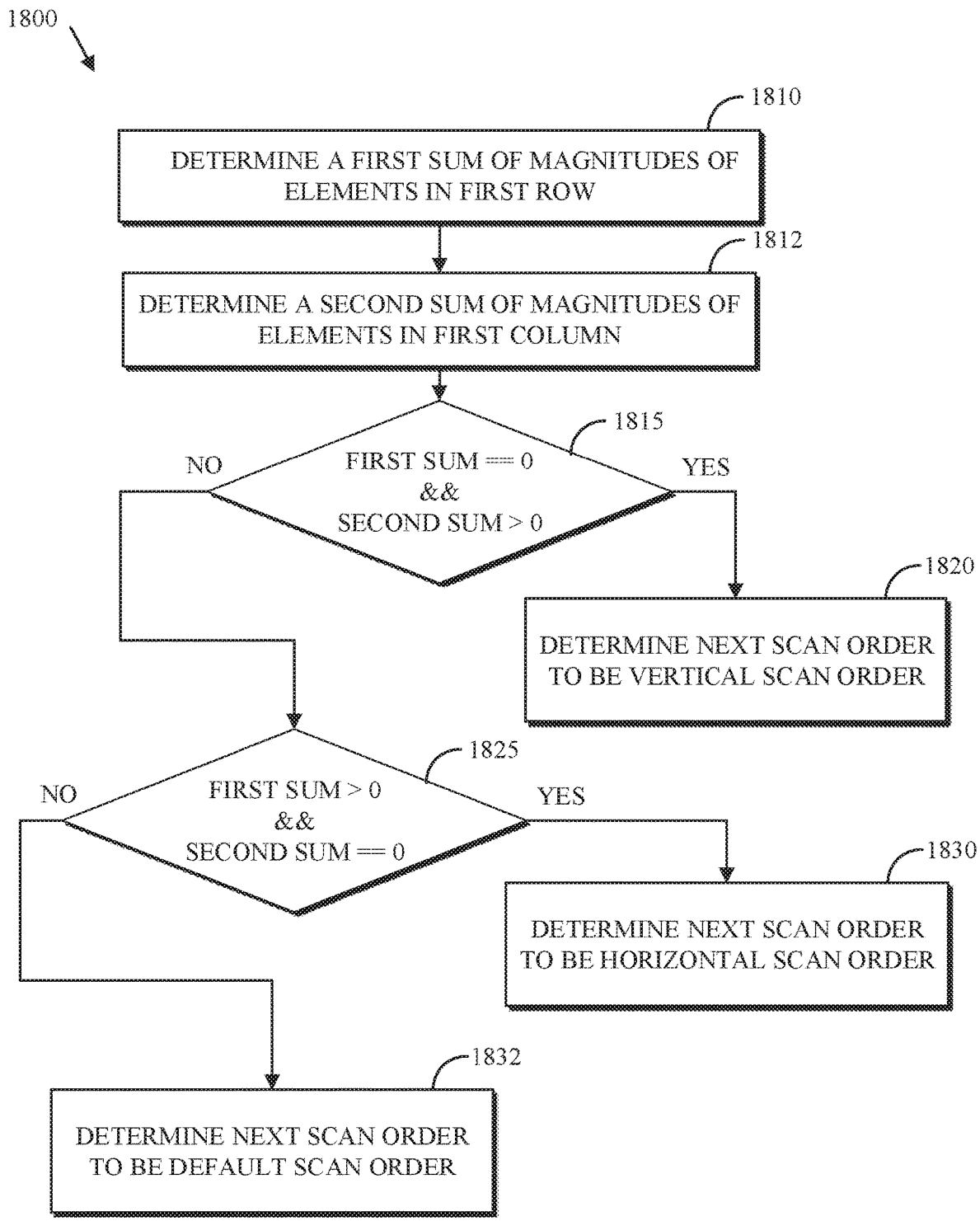
FIG. 18A is a flowchart of an example of a process for determining a scan order for a next group of elements of a block of video data.

FIG. 18A is a flowchart of an example of a process 1800 for determining a scan order for a next group of elements of a block of video data. In the example of process 1800, the prior group(s) (e.g., the first group) of elements, which are available in the encoder and decoder for consideration in determining the scan order for the next group of elements, include a first row of the elements in the block and a first column of elements in the block. The process 1800 includes determining 1810 a first sum of magnitudes of elements in a portion of the first row of the block; determining 1812 a second sum of magnitudes of elements in a portion of the first column of the block; if (at 1815) the first sum is zero and the second sum is positive, determining 1820 the next scan order to be a vertical scan order; if (at 1825) the first sum is positive and the second sum is zero, determining 1830 the next scan order to be a horizontal scan order; otherwise, if (at 1825) the first sum and the second sum are both positive or both zero, determining 1832 the next scan order to be a default scan order. The same process 1800 may be used for determining a next scan order in both an encoder and a compatible decoder. For example, the process 1800 may be implemented by the entropy encoder 712 or the entropy decoder 756. For example, the process 1800 may be implemented by the transmitting station 102 or the receiving station 106. For example, the process 1800 may be implemented by a computing device, such as the computing device 200. For example, the process 1800 may be implemented by a software program including machine-readable instructions that can be stored in a memory such as the memory 204 or the secondary storage 214, and that can be executed by a processor, such as CPU 202, to cause a computing device to perform the process 1800. For example, the process 1800 may be implemented by a decoder such as the decoder 500 of FIG. 5. For example, the process 1800 may be implemented by an encoder such as the encoder 400 of FIG. 4. For example, the process 1800 may be implemented by the entropy encoding stage 408 of the encoder 400 of FIG. 4. For example, the process 1800 may be implemented by the entropy decoding stage 502 of the decoder 500 of FIG. 5.

The process 1800 includes determining 1810 a first sum of magnitudes of elements in a portion of the first row of the block. For example, the portion of the first row may be a right half of the first row. In some implementations, the portion of the first row may be the whole first row. In some implementations, the elements may be constrained to take integer values (e.g., as a result of quantization). For example, the magnitude of an element may be the absolute value of the element. In some implementations, the magnitude of an element may be represented as the square of the value of the element or another quantity that varies monotonically with the absolute value of the element. For example, the first sum may be determined 1810 as:

$$SR=|r[\text{ceil}(M/2)]|+|r[\text{ceil}(M/2)+1]|+ \ldots +|r[M-1]| \qquad (9)$$

where SR is the first sum; M is the number of columns in the block (e.g., an N×M block); r[i] is the ith element of the first row of the block for i=0 to M−1; and ceil( ) denotes the ceiling function, i.e., for any real number a, ceil(a) returns the smallest integer that is greater than or equal to a. M may be greater than or equal to two. For example, the elements of the block may be quantized transform coefficients of a residual block (e.g., a residual block resulting from intra-frame prediction or a residual block resulting from inter-frame prediction).

The process 1800 includes determining 1812 a second sum of magnitudes of elements in a portion of the first column of the block. For example, the portion of the first column may be a bottom half of the first column. In some implementations, the portion of the first row may be the whole first column. In some implementations, the elements may be constrained to take integer values (e.g., as a result of quantization). For example, the magnitude of an element may be the absolute value of the element. In some implementations, the magnitude of an element may be represented as the square of the value of the element or another quantity that varies monotonically with the absolute value of the element. For example, the second sum may be determined 1812 as:

$$SC=|c[\text{ceil}(N/2)]|+|c[\text{ceil}(N/2)+1]|+ \ldots |c[N-1]| \qquad (10)$$

where SC is the second sum; N is the number of rows in the block (e.g., an N×M block); and c[i] is the ith element of the first column of the block for i=0 to N−1. N may be greater than or equal to two.

The process 1800 may include, responsive to the first sum (e.g., SR of equation 9) being zero and the second sum (e.g., SC of equation 10) being positive (at 1815), determining 1820 the next scan order (e.g., a second scan order) to be a vertical scan order (e.g., as illustrated by the scan order 1520 of FIG. 15A).

The process 1800 may include, responsive to the first sum (e.g., SR of equation 9) being positive and the second sum (e.g., SC of equation 10) being zero (at 1825), determining 1830 the next scan order (e.g., the second scan order) to be a horizontal scan order (e.g., as illustrated by the scan order 1510 of FIG. 15A).

Otherwise, the process 1800 may include, responsive to the first sum (e.g., SR of equation 9) and the second sum (e.g., SC of equation 10) both being positive or both being zero, determining 1832 the next scan order (e.g., the second scan order) to be a default scan order (e.g., zig-zag, diagonal, etc.).

In some embodiments (not shown), SR==0 at 1815 may be replaced by SR<=fifth threshold and SC>0 may be replaced by SC>=sixth threshold. Similarly, SR>0 at 1825 may be replaced by SR>=sixth threshold and SC==0 at 1825 may be replaced by SC<=fifth threshold.

Figure 18B:
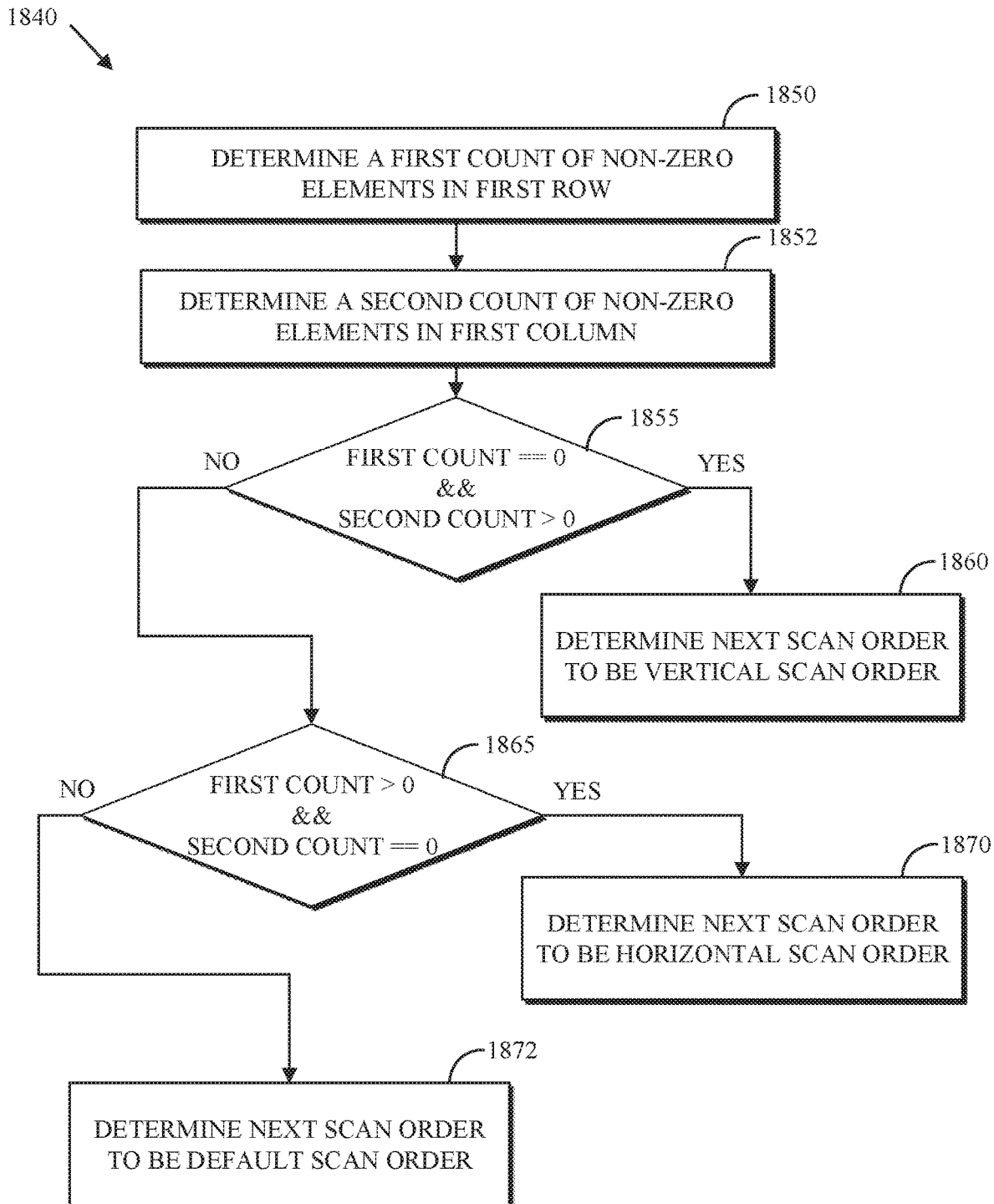
FIG. 18B is a flowchart of an example of a process for determining a scan order for a next group of elements of a block of video data.

FIG. 18B is a flowchart of an example of a process 1840 for determining a scan order for a next group of elements of a block of video data. In the example of process 1840, the prior group(s) (e.g., the first group) of elements, which are available in the encoder and decoder for consideration in determining the scan order for the next group of elements, include a first row of the elements in the block and a first column of elements in the block. The process 1840 includes determining 1850 a first count of non-zero elements in a portion of the first row of the block; determining 1852 a second count of non-zero elements in a portion of the first column of the block; if (at 1855) the first count is zero and the second count is positive, determining 1860 the next scan order to be a vertical scan order; if (at 1865) the first count is positive and the second count is zero, determining 1870 the next scan order to be a horizontal scan order; otherwise, if (at 1865) the first count and the second count are both positive or both zero, determining 1872 the next scan order to be a default scan order. The same process 1840 may be used for determining a next scan order in both an encoder and a compatible decoder. For example, the process 1840 may be implemented by the entropy encoder 712 or the entropy decoder 756. For example, the process 1840 may be implemented by the transmitting station 102 or the receiving station 106. For example, the process 1840 may be implemented by a computing device, such as the computing device 200. For example, the process 1840 may be implemented by a software program including machine-readable instructions that can be stored in a memory such as the memory 204 or the secondary storage 214, and that can be executed by a processor, such as CPU 202, to cause a computing device to perform the process 1840. For example, the process 1840 may be implemented by a decoder such as the decoder 500 of FIG. 5. For example, the process 1840 may be implemented by an encoder such as the encoder 400 of FIG. 4. For example, the process 1840 may be implemented by the entropy encoding stage 408 of the encoder 400 of FIG. 4. For example, the process 1840 may be implemented by the entropy decoding stage 502 of the decoder 500 of FIG. 5.

The process 1840 includes determining 1850 a first count of non-zero elements in a portion of the first row of the block. For example, the portion of the first row may be a right half of the first row. In some implementations, the portion of the first row may be the whole first row. In some implementations, the first count may be determined 1850 based on a non-zero map (e.g., similar to the non-zero map 606) for available group(s) of the block. For example, the first count may be determined 1850 as a sum of the binary values from a non-zero map corresponding to the portion of the first row of the block. For example, the first count may be determined 1850 as:

$$CR=nz(r[\text{ceil}(M/2)])+ \\ nz(r[\text{ceil}(M/2)+1])+ \ldots nz(r[M-1]) \qquad (11)$$

where CR is the first count; M is the number of columns in the block (e.g., an N×M block); r[i] is the ith element of the first row of the block for i=0 to M−1; nz( ) denotes a non-zero function that returns one if the argument is non-zero and zero if the argument is zero; and ceil( ) denotes the ceiling function, i.e., for any real number a, ceil(a) returns the smallest integer that is greater than or equal to a. M may be greater than or equal to two. For example, the elements of the block may be quantized transform coefficients of a residual block (e.g., a residual block resulting from intra-frame prediction or a residual block resulting from inter-frame prediction).

The process 1840 includes determining 1852 a second count of non-zero elements in a portion of the first column of the block. For example, the portion of the first column may be a bottom half of the first column. In some implementations, the portion of the first column may be the whole first column. In some implementations, the second count may be determined 1852 based on a non-zero map (e.g., similar to the non-zero map 606) for available group(s) of the block. For example, the second count may be determined 1850 as a sum of the binary values from a non-zero map corresponding to the portion of the first column of the block. For example, the second count may be determined 1852 as:

$$CC = nz(c[\text{ceil}(N/2)]) + nz(c[\text{ceil}(N/2)+1]) + \ldots nz(c[N-1]) \quad (12)$$

where CC is the second count; N is the number of rows in the block (e.g., an N×M block); and c[i] is the ith element of the first column of the block for i=0 to N−1. N may be greater than or equal to two. For example, the elements of the block may be quantized transform coefficients of a residual block (e.g., a residual block resulting from intra-frame prediction or a residual block resulting from inter-frame prediction).

The process 1840 may include, responsive to the first count (e.g., CR of equation 11) being zero and the second count (e.g., CC of equation 12) being positive (at 1855), determining 1860 the next scan order (e.g., a second scan order) to be a vertical scan order (e.g., as illustrated by the scan order 1520 of FIG. 15A).

The process 1840 may include, responsive to the first count (e.g., CR of equation 11) being positive and the second count (e.g., CC of equation 12) being zero (at 1865), determining 1870 the next scan order (e.g., the second scan order) to be a horizontal scan order (e.g., as illustrated by the scan order 1510 of FIG. 15A).

Otherwise, the process 1840 may include, responsive to the first count (e.g., CR of equation 11) and the second count (e.g., CC of equation 12) both being positive or both being zero, determining 1872 the next scan order (e.g., the second scan order) to be a default scan order (e.g., zig-zag, diagonal, etc.).

In some implementations, CR==0 at 1855 may be replaced by CR<=seventh threshold and CC>0 may be replaced by CC>=eighth threshold. Similarly, CR>0 at 1865 may be replaced by CR>=eighth threshold and CC==0 at 1865 may be replaced by CC<=seventh threshold.

In some implementations, CR and CC may be further used to determine the direction of the default scan order. For example, if the default scan order is the zig-zag scan order (downward first), then a transposed zig-zag scan order (to the right first) is to be used if CR is greater than CC; otherwise the (downward first) zig-zag scan order is to be used. If the default scan order is the 45-degree diagonal scan order (upward to the right), then the 225-degree diagonal scan order (downward to the left) may be used if CR is greater than CC; otherwise the 45-degree diagonal scan order may be used. SR and SC of equation 9 and equation 10 above may be used to determine the direction of the default scan order in a similar fashion.

In some implementations, an encoder may manipulate CR and CC so that the desired scan order is chosen. For example, if the horizontal scan order is desired, the encoder can select quantized coefficients in the first row and the first column such that CR is non-zero and CC is zero (or they satisfy appropriate threshold constraints). The selection of quantized coefficients can be based on rate distortion cost.

Similarly, the encoder may manipulate SR and SC to make sure the desired scan order is chosen.

The process 1600 may impact context derivation in coding quantized transform coefficients. For example, depending upon the scan order selected, the available neighboring coefficients available for deriving contexts to code the current coefficient may be different. For example some entropy coding schemes may use two previously coded neighbors to derive a context for coding (encoding and decoding) a current coefficient represented by a token. Suppose that the first group in the process 1600 consists of the first row and the first column of the current block. Then the block positions of the two neighbors used for context derivation in coding a token at block position [r, c] may be given in the table below.

TABLE 1

Neighbors for context derivation in coefficient coding

|  | Neighbor A | Neighbor B |
| --- | --- | --- |
| [0, 0] | N/A | N/A |
| [1, 0] | [0, 0] | N/A |
| [0, 1] | [0, 0] | [1, 0] |
| [r, 0], r > 1 | [r-1, 0] | [r-2, 0] |
| [0, c], c > 1 | [0, c-1] | [0, c-2] |
| [r, c], r > 0, c > 0 | [r-1, c] | [r, c-1] |

In some implementations, contexts used in coding coefficients in a group other than the first group may depend upon the scan order selected for that group. For example, one context may be used for coding the coefficient at position (r, c), where r>0 and c>0, in the second group of FIG. 15B if the selected scan order for the second group is the horizontal or the vertical scan order and a different context may be used for coding the coefficient at position (r, c) if the selected scan order for the second group is the zig-zag scan order.

The process 1600 may be used in tandem with processes (e.g., the process 900) for encoding an intra-prediction mode for a block using context determined based on elements of the block. In some implementations, such a combination of processes (e.g., of the process 1600 with the process 900) may be used to more fully leverage a correlation between intra-prediction modes and quantized transform coefficients in entropy coding.

Figure 19:
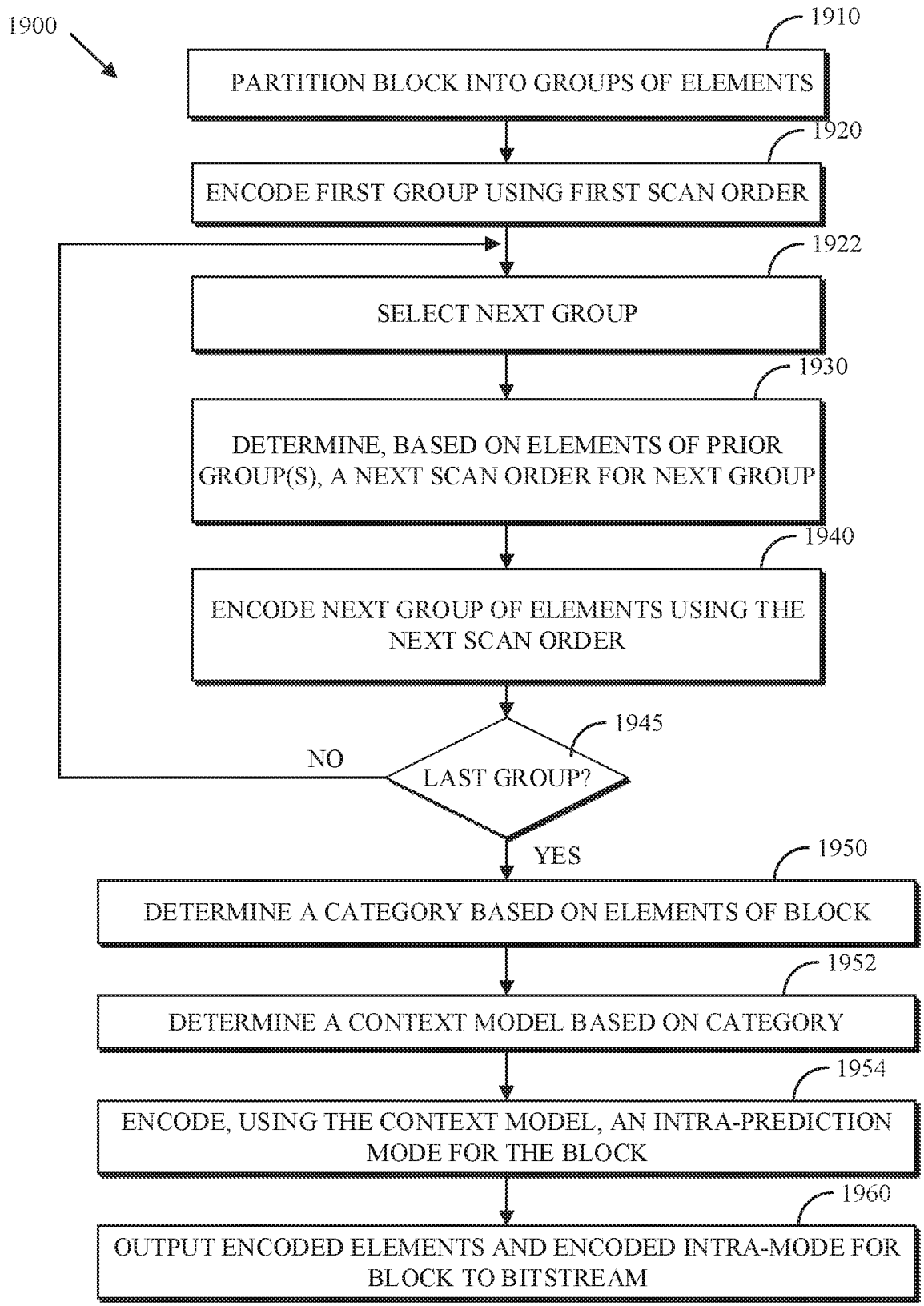
FIG. 19 is a flowchart of an example of a process for adapting scan order to encode a block of video data and encoding an intra-prediction mode for the block using a context selected based on data in the block.

FIG. 19 is a flowchart of an example of a process 1900 for adapting scan order to encode a block of video data and encoding an intra-prediction mode for the block using a context selected based on data in the block. The process 1900 includes partitioning 1910 a block of video data into a plurality of groups of elements; encoding 1920, using an entropy encoder using a first scan order, elements of a first group from the plurality of groups of elements; selecting 1922 a next group from the plurality of groups; determining 1930, based on the elements of the prior group(s), a next scan order for the next group; encoding 1940, using the entropy encoder, using the next scan order, elements of the next group; and continuing (at 1945) to process any remaining groups from the plurality of groups until all groups have been encoded 1940; determining 1950, based on the elements of the block, a category (e.g., horizontal, vertical, or diagonal) for the block; determining 1952 a context based on the category; encoding 1954, using an entropy decoder with the context, an intra-prediction mode for the block; and outputting 1960 the encoded elements of the block and the encoded intra-prediction mode for the block to a bitstream.

For example, the process 1900 may be implemented by the entropy encoder 712. For example, the process 1900 may be implemented by the transmitting station 102. For example, the process 1900 may be implemented by a computing device, such as the computing device 200. For example, the process 1900 may be implemented by a software program including machine-readable instructions that can be stored in a memory such as the memory 204 or the secondary storage 214, and that can be executed by a processor, such as CPU 202, to cause a computing device to perform the process 1900. For example, the process 1900 may be implemented by an encoder such as the encoder 400 of FIG. 4. For example, the process 1900 may be implemented by the entropy encoding stage 408 of the encoder 400 of FIG. 4.

The process 1900 includes partitioning 1910 a block of video data into a plurality of groups of elements. The groups may be disjoint. The block may include a two-dimensional array of elements (e.g., a 4×4, 8×8, 16×16, 32×32, or any other square or rectangular block size). A group from the plurality of groups of elements may be continuous or discontinuous within the structure of the block. For example, the elements of the block may be pixel values (e.g., luminosity values). For example, the elements of the block may be quantized transform coefficients. For example, the elements of the block may be quantized transform coefficients of a residual block (e.g., a residual block resulting from intra-frame prediction or a residual block resulting from inter-frame prediction). For example, the elements of the block may be based on a result of inter-frame prediction. For example, the block may be a residual block resulting from inter-frame prediction. For example, the elements of the block may be based on a result of intra-frame prediction. For example, the block may be a residual block resulting from intra-frame prediction. In some implementations, the plurality of groups includes two groups (e.g., as shown in the example of FIG. 15A). For example, a first group may include elements of a first row of the block and elements of a first column of the block. For example, a second group may include all remaining elements of the block outside of the first group. In some implementations, the plurality of groups includes more than two groups of elements. For example, a second group may include elements of a first row and a first column of remaining elements of the block outside of the first group, and a third group may include all remaining elements of the block outside of the union of the first group and the second group.

The process 1900 includes encoding 1920, using an entropy encoder using a first scan order, elements (e.g., quantized transform coefficients of an intra-prediction residual block) of a first group from the plurality of groups of elements. The first scan order may be a default or initial scan order that a compatible entropy decoder is configured to use to decode elements of the first group for the block. For example, the first scan order may be a zig-zag order (e.g., as shown in FIG. 15A). For example, the entropy encoder may employ entropy encoding techniques such as, for example, variable length coding (VLC), context adaptive binary arithmetic coding (CABAC), or context adaptive (multi-symbol) arithmetic coding.

The process 1900 includes selecting 1922 a next group (e.g., a second group) from the plurality of groups of elements of the block. For example, the next group may be selected 1922 by incrementing a group index.

The process 1900 includes determining 1930, based on the elements of one or more prior groups (e.g., the first group), a next scan order (e.g., a second scan order) for the next group (e.g., the second group) from the plurality of groups of elements. In some implementations, the next scan order may be determined 1930 by selecting from among options including horizontal, vertical, diagonal, zig-zag, etc. (e.g., as illustrated in FIG. 15A). For example, the next scan order may be determined 1930 based on a distribution of non-zero elements (e.g., quantized transform coefficients of an intra-prediction residual block) within the first group. For example, the next scan order may be determined 1930 based on a distribution of non-zero elements within a union of prior groups). For example, the process 1800 of FIG. 18A may be implemented to determine 1930 the next scan order. For example, the process 1840 of FIG. 18B may be implemented to determine 1930 the next scan order. In some implementations, the determined 1930 scan order may increase the probability that non-zero elements will be front loaded within the next group or remaining groups and that a sequence of elements at the end of the resulting scan order for the block will be zeros that may be efficiently encoded, implicitly or explicitly, using the entropy encoder.

The process 1900 includes encoding 1940, using the entropy encoder using the next scan order (e.g., the second scan order), elements of the next group (e.g., the second group) from the plurality of groups of elements of the block. For example, the next scan order may be a horizontal scan order, a vertical scan order, a zig-zag scan order, etc. (e.g., as shown in FIG. 15A). For example, the entropy encoder may employ entropy encoding techniques such as, for example, variable length coding (VLC), context adaptive binary arithmetic coding (CABAC), or context adaptive (multi-symbol) arithmetic coding. In some implementations, by adapting the scan order for the next group, the coding efficiency of the entropy encoder may be improved.

If (at 1945) the last group from the plurality of groups of elements of the block has not yet been encoded, then the next group is selected 1922 and the processing of groups continues to encode 1940 remaining elements of the block.

When (at 1945) the last group from the plurality of groups of elements of the block has been encoded, a category for the block is determined 1950 based on the elements (e.g., quantized transform coefficients of an intra-prediction residual block) of the block. For example, the category may be determined as one of horizontal, vertical, and other (i.e., not horizontal or vertical, e.g., diagonal). The category may indicate a directional pattern in a distribution of non-zero elements within the block, which may be related to an intra-prediction mode that was used to generate the block. In some implementations, the category may be determined 1950 based on a first count of non-zero elements in a first portion of the block (e.g., a right half of the block) and based on a second count of non-zero elements in a second portion of the block (e.g., a bottom half of the block). For example, if the first count is zero and the second count is positive, the category may be determined 1950 to be vertical. For example, if the first count is positive and the second count is zero, the category may be determined 1950 to be horizontal. For example, if the first count and the second count are both zero or both positive, the category may be determined 1950 to be diagonal. In some implementations, the category may be determined 1950 based on elements in the first group of elements of the block. For example, the category may be determined 1950 to be vertical when CR of equation 11 is zero and CC of equation 12 is positive. For example, the category may be determined 1950 to be horizontal when CR of equation 11 is positive and CC of equation 12 is zero. For example, the category may be determined 1950 to be diagonal when CR of equation 11 and CC of equation 12 are both zero or both positive. In some implementations, the category (t) may be determined using the algorithm (2) described in relation to FIG. 9. In some implementations, the category (t) may be determined using the algorithm (6) described in relation to FIG. 9. In some implementations, the category (t) may be determined using the algorithm (7) described in relation to FIG. 9. In some implementations, the category (t) may be determined using the algorithm (8) described in relation to FIG. 9.

The process 1900 includes determining 1952 a context based on the category. Because patterns in the distribution of non-zero elements of the block may be correlated with an intra-prediction mode that was used to generate the block, the category may be used to select a more useful context for the intra-prediction mode, which may improve coding efficiency for encoding the intra-prediction mode. For example, the context may be determined 1952 as described with respect to operation 904 of FIG. 9. For example, the context may be determined 1952 using the equation (3) described in relation to FIG. 9. For example, the context may be determined 1952 using the equation (4) described in relation to FIG. 9. For example, the context may be determined 1952 using the equation (5) described in relation to FIG. 9.

The process 1900 includes encoding 1954, using an entropy decoder with the context, an intra-prediction mode for the block. For example, the intra-prediction mode may be encoded 1954 as described in relation to operation 906 of FIG. 9.

The process 1900 includes outputting 1960 the encoded elements of the block and the encoded intra-prediction mode for the block to an encoded bitstream. For example, the encoded elements may be output 1960 from the entropy encoder 712 through the multiplexer 718 to be included in the bitstream 720 that bears a video signal including the block. For example, the encoded intra-prediction mode may be output 1960 from the entropy encoder 716 through the multiplexer 718 to be included in the bitstream 720 that bears a video signal including the block. In some implementations, the bitstream may be stored (e.g., in memory or on a disk) or transmitted (e.g., via network communication link). In some implementations (not shown), encoded elements may be output to an encoded bitstream as they become available.

In some implementations, the process 1900 may be implemented by specialized hardware and/or software that performs operations corresponding to the following pseudo-code (which uses the definitions provided in relation to equation 11 and equation 12 above):

1. Determine an intra-prediction mode m to generate prediction P for the current block X.
2. Compute the residual block E=X−P, and obtain quantized coefficients by performing transform (if applicable) and quantization.
3. Use a default scan order (e.g. zigzag, diagonal, etc.) to encode r[0], . . . , r[N−1] and c[0], . . . , c[N−1]. (An example of such a scan order is shown in FIG. 15A.)
   a. if CC>=1 and CR==0, set t=1, and select the vertical scan order.
   b. if CC==0 and CR>=1, set t=2, and select the horizontal scan order.
   c. otherwise, set t=0, and select the default scan order (e.g., zigzag, diagonal, etc.).
4. Encode the intra-prediction mode m by using the category t.
5. Encode the remaining coefficients of the block by using the scan order selected in Step 3.

The process 1700 may be used in tandem with techniques (e.g., the process 1100) for decoding an intra-prediction mode for a block using context determined based on elements of the block. In some implementations, such a combination of techniques (e.g., of the process 1700 with the process 1100) may be used to more fully leverage a correlation between intra-prediction modes and quantized transform coefficients in entropy coding.

Figure 20:
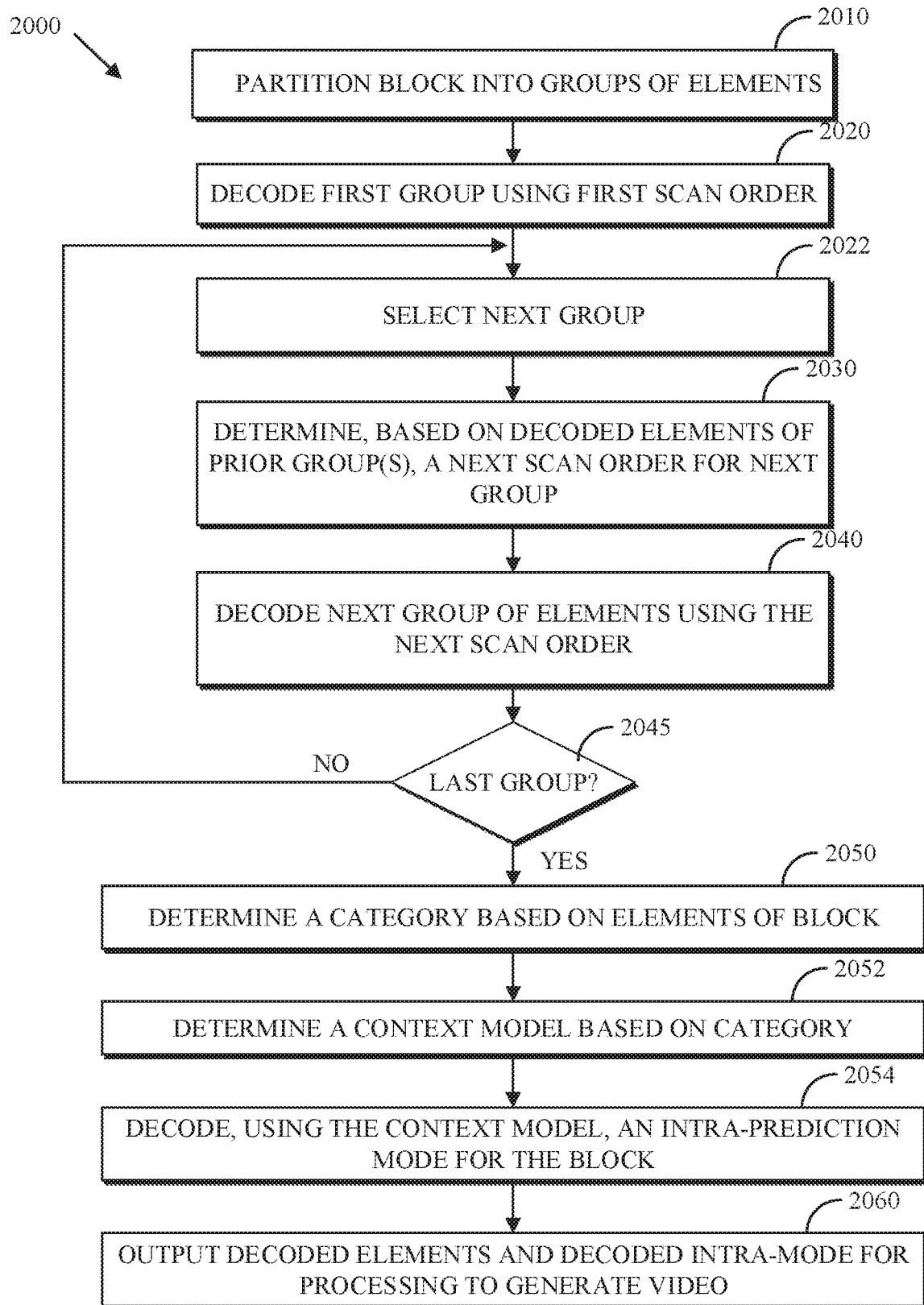
FIG. 20 is a flowchart of an example of a process for adapting scan order to decode a block of video data and decoding an intra-prediction mode for the block using a context selected based on data in the block.

FIG. 20 is a flowchart of an example of a process 2000 for adapting scan order to decode a block of video data and decoding an intra-prediction mode for the block using a context selected based on data in the block. The process 2000 includes partitioning 2010 a block of video data into a plurality of groups of elements; decoding 2020, using an entropy decoder, data from an encoded bitstream to obtain, using a first scan order, elements of a first group from the plurality of groups of elements; selecting 2022 a next group from the plurality of groups; determining 2030, based on the elements of the prior group(s), a next scan order for the next group; decoding 2040, using the entropy decoder, data from the encoded bitstream to obtain, using the next scan order, elements of the next group; and continuing (at 2045) to process any remaining groups from the plurality of groups until all groups of elements of the block have been decoded 2040; determining 2050, based on the decoded elements of the block, a category (e.g., horizontal, vertical, or diagonal) for the block; determining 2052 a context based on the category; decoding 2054, using an entropy decoder with the context, data from the encoded bitstream to obtain an intra-prediction mode for the block; and outputting 2060 the decoded elements of the block and the decoded intra-prediction mode for processing to generate video. For example, the process 2000 may be implemented by the entropy decoder 756. For example, the process 2000 may be implemented by the receiving station 106. For example, the process 2000 may be implemented by a computing device, such as the computing device 200. For example, the process 2000 may be implemented by a software program including machine-readable instructions that can be stored in a memory such as the memory 204 or the secondary storage 214, and that can be executed by a processor, such as CPU 202, to cause a computing device to perform the process 2000. For example, the process 2000 may be implemented by a decoder such as the decoder 500 of FIG. 5. For example, the process 2000 may be implemented by the entropy decoding stage 502 of the decoder 500 of FIG. 5.

The process 2000 includes partitioning 2010 a block of video data into a plurality of groups of elements. The groups may be disjoint. The block may include a two-dimensional array of elements (e.g., a 4×4, 8×8, 16×16, 32×32, or any other square or rectangular block size). A group from the plurality of groups of elements may be continuous or discontinuous within the structure of the block. For example, the elements of the block may be pixel values (e.g., luminosity values). For example, the elements of the block may be quantized transform coefficients. For example, the elements of the block may be quantized transform coefficients of a residual block (e.g., a residual block resulting from intra-frame prediction or a residual block resulting from inter-frame prediction). For example, the elements of the block may be based on a result of inter-frame prediction. For example, the block may be a residual block resulting from inter-frame prediction. For example, the elements of the block may be based on a result of intra-frame prediction. For example, the block may be a residual block resulting from intra-frame prediction. In some implementations, the plurality of groups includes two groups (e.g., as shown in the example of FIG. 15A). For example, a first group may include elements of a first row of the block and elements of a first column of the block. For example, a second group may include all remaining elements of the block outside of the first group. In some implementations, the plurality of groups includes more than two groups of elements. For example, a second group may include elements of a first row and a first column of remaining elements of the block outside of the first group, and a third group may include all remaining elements of the block outside of the union of the first group and the second group.

The process 2000 includes decoding 2020, using an entropy decoder, data from an encoded bitstream to obtain, using a first scan order, elements of a first group from the plurality of groups of elements. The first scan order may be a default or initial scan order that a compatible entropy encoder is configured to use to encode elements of the first group for the block. For example, the first scan order may be a zig-zag order (e.g., as shown in FIG. 15A). For example, the entropy decoder may employ entropy decoding techniques such as, for example, variable length coding (VLC), context adaptive binary arithmetic coding (CABAC), or context adaptive (multi-symbol) arithmetic coding.

The process 2000 includes selecting 2022 a next group (e.g., a second group) from the plurality of groups of elements of the block. For example, the next group may be selected 2022 by incrementing a group index.

The process 2000 includes determining 2030, based on the elements of one or more prior groups (e.g., the first group), a next scan order (e.g., a second scan order) for the next group (e.g., the second group) from the plurality of groups of elements. In some implementations, the next scan order may be determined 2030 by selecting from among options including horizontal, vertical, diagonal, zig-zag, etc. (e.g., as illustrated in FIG. 15A). For example, the next scan order may be determined 2030 based on a distribution of non-zero elements (e.g., quantized transform coefficients) within the first group. For example, the next scan order may be determined 2030 based on a distribution of non-zero elements within a union of prior groups). For example, the process 1800 of FIG. 18A may be implemented to determine 2030 the next scan order. For example, the process 1840 of FIG. 18B may be implemented to determine 2030 the next scan order. In some implementations, the determined 2030 scan order may increase the probability that non-zero elements will be front loaded within the next group or remaining groups and that a sequence of elements at the end of the resulting scan order for the block will be zeros that may be efficiently decoded, implicitly or explicitly, using the entropy decoder.

The process 2000 includes decoding 2040, using the entropy decoder, data from the encoded bitstream to obtain, using the next scan order (e.g., the second scan order), elements of next group (e.g., the second group) from the plurality of groups of elements of the block. For example, the next scan order may be a horizontal scan order, a vertical scan order, a zig-zag scan order, etc. (e.g., as shown in FIG. 15A). For example, the entropy decoder may employ entropy decoding techniques such as, for example, variable length coding (VLC), context adaptive binary arithmetic coding (CABAC), or context adaptive (multi-symbol) arithmetic coding. In some implementations, by adapting the scan order for the next group, the coding efficiency of the entropy decoder may be improved.

If (at 2045) the last group from the plurality of groups of elements of the block has not yet been decoded, then the next group is selected 2022 and the processing of groups continues to decode 2040 remaining elements of the block.

When (at 2045) the last group from the plurality of groups of elements of the block has been decoded, a category for the block is determined 2050 based on the decoded elements (e.g., quantized transform coefficients of an intra-prediction residual block) of the block. For example, the category may be determined as one of horizontal, vertical, and other (i.e., not horizontal or vertical, e.g., diagonal). The category may indicate a directional pattern in a distribution of non-zero elements within the block, which may be related to an intra-prediction mode that was used to generate the block. In some implementations, the category may be determined 2050 based on a first count of non-zero elements in a first portion of the block (e.g., a right half of the block) and based on a second count of non-zero elements in a second portion of the block (e.g., a bottom half of the block). For example, if the first count is zero and the second count is positive, the category may be determined 2050 to be vertical. For example, if the first count is positive and the second count is zero, the category may be determined 2050 to be horizontal. For example, if the first count and the second count are both zero or both positive, the category may be determined 2050 to be diagonal. In some implementations, the category may be determined 2050 based on elements in the first group of elements of the block. For example, the category may be determined 2050 to be vertical when CR of equation 11 is zero and CC of equation 12 is positive. For example, the category may be determined 2050 to be horizontal when CR of equation 11 is positive and CC of equation 12 is zero. For example, the category may be determined 2050 to be diagonal when CR of equation 11 and CC of equation 12 are both zero or both positive. In some implementations, the category (t) may be determined using the algorithm (2) described in relation to FIG. 9. In some implementations, the category (t) may be determined using the algorithm (6) described in relation to FIG. 9. In some implementations, the category (t) may be determined using the algorithm (7) described in relation to FIG. 9. In some implementations, the category (t) may be determined using the algorithm (8) described in relation to FIG. 9.

The process 2000 includes determining 2052 a context based on the category. Because patterns in the distribution of non-zero elements of the block may be correlated with an intra-prediction mode that was used to generate the block, the category may be used to select a more useful context for the intra-prediction mode, which may improve coding efficiency for decoding the intra-prediction mode. For example, the context may be determined 2052 as described with respect to operation 904 of FIG. 9. For example, the context may be determined 2052 using the equation (3) described in relation to FIG. 9. For example, the context may be determined 2052 using the equation (4) described in relation to FIG. 9. For example, the context may be determined 2052 using the equation (5) described in relation to FIG. 9.

The process 2000 includes decoding 2054, using an entropy decoder with the context, data from the encoded bitstream to obtain an intra-prediction mode for the block. For example, the intra-prediction mode may be decoded 2054 as described in relation to operation 1106 of FIG. 11.

The process 2000 includes outputting 2060 the decoded elements of the block and the decoded intra-prediction mode for the block for processing to generate video. For example, the decoded elements may be output 2060 from the entropy decoder 756 through the inverse quantization/transform 760 and used to generate the reconstructed block 764 that forms part of a video. For example, the decoded intra-prediction mode may be output 2060 from the entropy decoder 754 to the intra prediction 768 and used to generate the reconstructed block 764 that forms part of a video. In some implementations, the resulting video may be stored (e.g., in memory or on a disk), transmitted (e.g., via network communication link), or displayed (e.g., in a user interface, such as on screen or a projection). For example, the process 2000 may include displaying video that is generated based in part on the decoded elements of the block (e.g., where the elements of the block are quantized transform coefficients of a residual block) and based in part on the decoded intra-prediction mode.

In some implementations, the process 2000 may be implemented by specialized hardware and/or software that performs operations corresponding to the following pseudo-code (which uses the definitions provided in relation to equation 11 and equation 12 above):

1. Use a default scan order (e.g. zigzag, diagonal, etc.) to decode r[0], . . . , r[N−1] and c[0], . . . , c[N−1]. (An example of such a scan order is shown in FIG. 15A.)
   a. if CC>=1 and CR==0, set t=1, and select the vertical scan order.
   b. if CC==0 and CR>=1, set t=2, and select the horizontal scan order.
   c. otherwise, set t=0, and select the default scan order (e.g., zigzag, diagonal, etc.).
2. Decode an intra-prediction mode m by using t.
3. Decode the remaining coefficients of the block by using the scan order selected in Step 1.
4. Use the intra-prediction mode m to generate prediction P.
5. From the decoded coefficients, reconstruct a residual block E by performing inverse quantization and inverse transform (if applicable).
6. Reconstruct the current image block $\hat{X}=P+\hat{E}$.

In some implementations, a category for a block, determined based on elements of the block, may be used to encode and decode an intra-prediction mode m in a variety of ways, such as, deriving the context used to encode and decode the intra-prediction mode m, and/or deriving a predictor for the intra-prediction mode m (e.g., as described with respect to the intra-prediction mode predictor p of FIG. 9). For example, an intra-prediction mode m may be differentially encoded and decoded using a prediction of m that is determined based on a category for the block.

The adaptive scan order scheme of FIGS. 15A-B may be modified using a smaller first group of elements with a different shape, which may include elements that are less likely to be zero (e.g., the element in the second row and second column may be likely to be non-zero where it is a low frequency transform coefficient). Adjusting a first group to be smaller and more likely to include all non-zero values of the block may improve coding efficiency. FIG. 21A is a diagram of an example of a set of scan orders 2100 for a block that are adapted based on data of a first group of elements of the block. The numbers shown in the cells of FIG. 21A are scan order sequence numbers for respective elements of the block at the corresponding locations within the block. The example set of scan orders 2100 includes four scan orders: alternating diagonal, horizontal scan order 2110; alternating diagonal, vertical scan order 2120; alternating diagonal, diagonal-right scan order 2130; and alternating diagonal, diagonal-left scan order 2140. In the example of FIG. 21A, the block to be coded is partitioned into two groups of elements: a first group that is coded (e.g., encoded or decoded) first using an alternating diagonal scan order reflected in the scan order sequence numbers 0-5 in the shaded cells of the diagram of FIG. 21A; and a second group that is coded (e.g., encoded or decoded) next using a scan order that is selected or adapted based on the elements from the first group. For example, a horizontal scan order may be selected for the second group, resulting in the alternating diagonal, horizontal scan order 2110 for the block. For example, a vertical scan order may be selected for the second group, resulting in the alternating diagonal, vertical scan order 2120 for the block. For example, a diagonal-right scan order may be selected for the second group, resulting in the alternating diagonal, diagonal-right scan order 2130 for the block. For example, a diagonal-left scan order may be selected for the second group, resulting in the alternating diagonal, diagonal-left scan order 2140 for the block. In the example of FIG. 21A, the first group includes elements forming a triangle in a corner of the block, and wherein the triangle includes elements of a first row of the block and elements of a first column of the block. In the example of FIG. 21A, the second group includes all remaining elements of the block outside of the first group. For example, the elements of the block may be quantized transform coefficients. For example, the elements of the block may be quantized transform coefficients of a residual block (e.g., a residual block resulting from intra-frame prediction or a residual block resulting from inter-frame prediction).

Figure 21B:
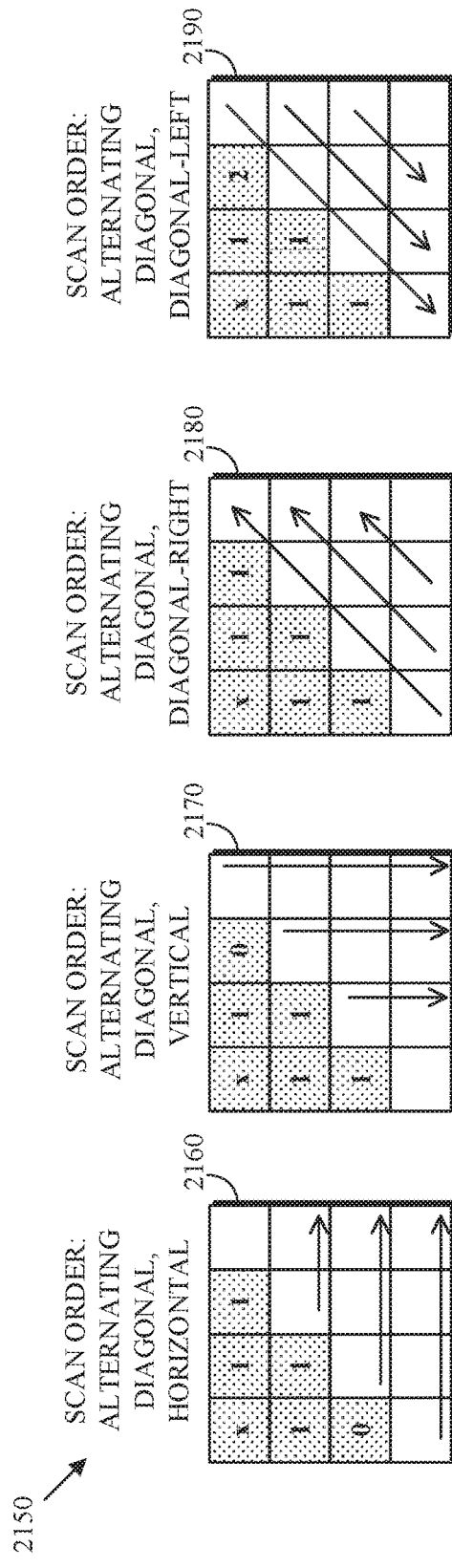
FIG. 21B is a diagram of an example of a set of scan orders for a block that are adapted based on magnitudes for a first group of elements of the block.

FIG. 21B is a diagram of an example of a set of scan orders 2150 for a block that are adapted based on magnitudes for a first group of elements of the block. The numbers shown in the cells of FIG. 21B are magnitudes of values for respective elements of the block at the corresponding locations within the block. The example set of scan orders 2150 includes four scan orders: alternating diagonal, horizontal scan order 2160; alternating diagonal, vertical scan order 2170; alternating diagonal, diagonal-right scan order 2180; and alternating diagonal, diagonal-left scan order 2190. In the example of FIG. 21B, the block to be coded is partitioned into two groups of elements: a first group that is coded (e.g., encoded or decoded) first using an alternating diagonal scan order; and a second group that is coded (e.g., encoded or decoded) next using a scan order that is selected or adapted based on a distribution (e.g., sums of magnitudes in certain portions of the first group) of non-zero elements from the first group. In the example of FIG. 21B, the first group includes elements forming a triangle in a corner of the block, and wherein the triangle includes elements of a first row of the block and elements of a first column of the block. In the example of FIG. 21B, the second group includes all remaining elements of the block outside of the first group. For example, a horizontal scan order may be selected for the second group, resulting in the alternating diagonal, horizontal scan order 2160 for the block, where a sum of magnitudes of elements in a portion of the first row is positive and a sum of magnitudes of elements in a portion of the first column is zero. For example, a vertical scan order may be selected for the second group, resulting in the alternating diagonal, vertical scan order 2170 for the block, where a sum of magnitudes of elements in a portion of the first row is zero. For example, a diagonal-left scan order may be selected for the second group, resulting in the alternating diagonal, diagonal-left scan order 2190 for the block, where a sum of magnitudes of elements in a portion of the first row is greater than a sum of magnitudes of elements in a portion of the first column and both sums are positive. For example, a diagonal-right scan order may be selected for the second group, resulting in the alternating diagonal, diagonal-right scan order 2180 for the block otherwise (e.g., where both sums are positive and the row sum is less than or equal to the column sum). For example, the elements of the block may be quantized transform coefficients. For example, the elements of the block may be quantized transform coefficients of a residual block (e.g., a residual block resulting from intra-frame prediction or a residual block resulting from inter-frame prediction).

In the examples shown in FIGS. 21A-B, after scanning the first group of elements (shown in shaded cells), the scan order for the coefficients in the remaining second group of elements (shown in unshaded cells) may be determined as follows: Let r[j], j=0, . . . , N−1 denote the absolute value of the jth coefficient (from left to right) in the first row and let c[i], i=0, . . . N−1, denote the absolute value of the ith coefficient (from top to bottom) in the first column of an N×N current block, where N=4 in FIGS. 21A-B and, more generally, may be any integer numbers greater than or equal 2. Then, for the remaining coefficients in the current block:
1. Compute cSum=c[L]+ . . . +c[N−1−K] and rSum=r[L]+ . . . +r[N−1−K], where L and K are a non-negative constants with L+K<N (e.g., in FIGS. 21A-B, L=1 and K=1).
2. Then
   a. if rSum>cSum and cSum==0, select the horizontal scan order;
   b. If rSum>cSum and cSum>0, select the diagonal-left scan order (e.g., downward to the left parallel to the anti-diagonal line);
   c. if rSum<=cSum and rSum==0, select the vertical scan order; otherwise
   d. select the diagonal-right scan order (e.g., upward to the right parallel to the anti-diagonal line).

Note that the scan order used for the first group can be any default scan order (horizontal, diagonal, alternating diagonal, zig-zag, vertical, etc.) that is known to both the encoder and the decoder. Note further that for larger blocks like 8×8, 16×16, 32×32 or even bigger ones, L and/or K may be increased correspondingly. For example, K may be N/2−1, i.e., K=3 when N=8, K=7 when N=16, K=15 when N=32, etc. In some implementations, the value of L and/or K may be sent as part of header information, e.g. picture or coding block header, to the decoder. Different values of L and/or K for the first column and the first row may be used. In that case, cSum and rSum may be scaled according to the number of positions used to accumulate the respective sums. Note also that though a set of four distinct scan orders (diagonal-left, horizontal, vertical, diagonal-right) are used in this document to illustrate the solution, these are merely examples. Other scan orders including but not limited to zig-zag (downward first), zig-zag (right first) may be used.

In some implementations, r[i] above indicates whether the i-th coefficient in the first row is non-zero or not, and c[j] above indicates whether the j-th coefficient in the first column is non-zero or not, where i, j=0, . . . , N−1. As such, rSum=r[L]+ . . . +r[N−1−K] indicates a count of non-zero coefficients in the first row between indices L and N−1−K inclusive, and cSum=c[L]+ . . . +c[N−1−K] indicates a count of non-zero coefficients in the first column between indices L and N−1−K inclusive. Then
1. if rSum>cSum and cSum==0, select the horizontal scan order;
2. If rSum>cSum and cSum>0, select the diagonal-left scan order;
3. if rSum<=cSum and rSum==0, select the vertical scan order; otherwise
4. select the diagonal-right scan order.

In comparison to the example scheme of FIGS. 15A-B where the first row and the first column were used to define the first group of elements of the block, the scheme of FIGS. 21A-B defines a smaller first group of elements and thus has the potential to leverage a better scan order in a larger second group of elements to improve coding efficiency.

In some implementations, cSum and rSum may be computed by using coefficient values at positions beyond the first row and the first column. For example, let u[i,j] denote the absolute value or magnitude of the coefficient at block position [i, j] (i-th row and j-th column). Then cSum and rSum may be computed as follows in Equation (13) below. Let K<2N be a non-negative constant that is known to the encoder and the decoder.

$$cSum = \sum_{m=1}^{K} \sum_{i=ceil(\frac{m+1}{2})}^{m} u[i, m-i] \qquad (13)$$

$$rSum = \sum_{m=1}^{K} \sum_{i=ceil(\frac{m+1}{2})}^{m} u[m-j, j]$$

In Equation (13), cSum in effect is the sum of absolute values of coefficients that are located below the main diagonal line, and above or on an antidiagonal line defined by K, that is, coefficients at positions [i, j] where i+j<=K, and j<i. Correspondingly, in Equation (13), rSum is the sum of absolute values of coefficients that are located above the main diagonal line, and above or on an antidiagonal line defined by K, that is, coefficients at positions [i, j] where i+j<=K, and i<j.

The size and shape of the first group of elements of a block may be selected based on the size of the block of image data to implement a size dependent partition of the block. In view of the fact that the number of boundary pixels in an N×N block of image data (e.g., transform coefficients) grows linearly in the order O(N) with the dimension N and the number of pixels in the block grows quadratically in the order O(N²), and the fact that the first group of elements uses a fixed scan order and the second group potentially benefits from a scan order learned from the first group, we see that coding efficiency might be improved by making the partition of a block into two groups of elements dependent upon the block size and possibly other information like a transform type (e.g., Discrete Cosine Transform, Discrete Fourier Transform, identity, etc.).

To see this, let us examine the following table.

TABLE 2

Size of the first group of elements of a block relative to block size

| N | Size of the first group consisting of the upper-left triangle as in FIGS. 21A-B | Percentage of the block size | Size of the first group consisting of the first row and the first column as in FIGS. 15A-B | Percentage of the block size |
| --- | --- | --- | --- | --- |
| 4 | 6 | 0.375 | 7 | 0.4375 |
| 8 | 15 | 0.234375 | 15 | 0.234375 |
| 16 | 45 | 0.17578125 | 31 | 0.12109375 |
| 32 | 153 | 0.1494140625 | 63 | 0.0615234375 |
| 64 | 561 | 0.1369628906 | 127 | 0.03100585938 |

In view of Table 2, we see that using the upper-left triangle to define the first group of elements as described in relation to FIGS. 21A-B produces a smaller first group than using the first row and column as in relation to FIGS. 15A-B when N=4, the two schemes are even when N=8, and the scheme of 15A-B produces a smaller first group when N>8.

As such, in some implementations the scheme of FIGS. 21A-B may be used for smaller transforms like 4×4 or 8×8 and the scheme of 15A-B or a combination of the scheme of 21A-B and the scheme of 15A-B may be used for larger transforms like 8×8 and above. As an example of combining the scheme of 21A-B and the scheme of 15A-B, the first group may consist of a fixed size of upper-left triangle plus an additional segment of the first row and an additional segment of the first column. FIGS. 22A-B show two examples of combining the two algorithms for an 8×8 transform, where the size of the first group of elements in FIG. 22A is 12 and the size of the first group of elements in FIG. 22B is 14, both are smaller than the first group of elements that would be used by the scheme of 21A-B or the scheme of 15A-B.

FIG. 22A is a diagram of an example of a scan order 2200 for a first group of elements of a block of image data. In FIG. 22A, the elements of the first group appear in shaded cells and are labeled with are scan order sequence numbers for respective elements of the block at the corresponding locations within the block. The scan order 2200 includes an alternating diagonal scan order for the first group of elements of the block. The first group of elements for the scan order 2200 includes elements forming a triangle in a corner of the block, and wherein the triangle includes elements of a first row of the block and elements of a first column of the block (e.g., the elements labeled 0-5 in the scan order 2200). The first group of elements for the scan order 2200 also includes elements of a first row of the block that are outside of the triangle and elements of a first column of the block that are outside of the triangle (e.g., the elements labeled 6-11 in the scan order 2200). For example, a second group of elements of the block may include all remaining elements of the block outside of the first group.

FIG. 22B is a diagram of an example of a scan order 2250 for a first group of elements of a block of image data. In FIG. 22B, the elements of the first group appear in shaded cells and are labeled with are scan order sequence numbers for respective elements of the block at the corresponding locations within the block. The scan order 2250 includes an alternating diagonal scan order for the first group of elements of the block. The first group of elements for the scan order 2250 includes elements forming a triangle in a corner of the block, and wherein the triangle includes elements of a first row of the block and elements of a first column of the block (e.g., the elements labeled 0-9 in the scan order 2250). The first group of elements for the scan order 2250 also includes elements of a first row of the block that are outside of the triangle and elements of a first column of the block that are outside of the triangle (e.g., the elements labeled 10-13 in the scan order 2200). For example, a second group of elements of the block may include all remaining elements of the block outside of the first group.

When adaptive scan order is used, the scan order for the second group of elements is inferred from the elements (e.g., transform coefficients) decoded in the first group. Though the inferred scan order may work well for the second group in many cases, there might still be cases where the inferred scan order is not the best scan order among a given set of available scan orders, i.e., another scan order might provide better compression performance (e.g., coding efficiency) for a given block of image data. To address this opportunity, some implementations may code and send (e.g., in a bitstream) the scan order for the second group of elements, and use the first group of elements to determine a scan order predictor and the context used in coding the this scan order for the second group.

To illustrate this predictive coding of the second scan order, consider the following example. Suppose now that a block of transform coefficients is partitioned into two groups as shown in FIGS. 21A-B. Let $t \in \{0, 1, 2, 3\}$ denote a variable indicating the scan order for the second group determined based on elements of the first group (e.g., using a scheme described in relation to FIGS. 21A-B), where 0 indicates the default diagonal-right scan order
1 indicates the horizontal scan order
2 indicates the vertical scan order
3 indicates the diagonal-left scan order.

Compute $cSum = c[1] + \ldots + c[N-1-K]$ and $rSum = r[1] + \ldots + r[N-1-K]$, where $K<N$ is a non-negative constant. Then determine t as follows:

if rSum>cSum and cSum==0, set t=1;
if rSum>cSum and cSum>0, set t=3;
if rSum<=cSum and rSum==0, set t=2;
otherwise, set t=0.

Next, encode or decode the selected scan order $s \in \{0, 1, 2, 3\}$ given t. In one example, encoding s given t is as follows:

Encode a binary flag ScanOrderNotEqualToPredictor indicating whether s==t.
If ScanOrderNotEqualToPredictor is 0, encoding of s terminates;
otherwise encode s as a symbol in $\{0,1,2,3\}\backslash\{t\}$, where for two sets A and B, A\B indicates the complement of B with respect to A.
Correspondingly, decoding s given t from a coded bitstream is as follows:

Decode from the bitstream a binary flag ScanOrderNotEqualToPredictor.
If ScanOrderNotEqualToPredictor is 0, set s=t and decoding of s terminates;
otherwise decode s as a symbol in $\{0,1,2,3\}\backslash\{t\}$.

In the above, encoding and decoding s as a symbol in $\{0,1,2,3\}\backslash\{t\}$ may further use t to determine a context. In one example, t itself may be used as the context. In another example, f(t)=0 if t==0 or t==3 and f(t)=1 if t==1 or t==2 may be used as the context.

The predictive coding of the second scan order described above can be integrated with the process 1600 of FIG. 16 and the process 1700 of FIG. 17. For example, the process 1600 of FIG. 16 may be modified to include determining a scan order prediction based on the elements of the first group; and encoding, using the entropy encoder, a scan order adjustment parameter that is based on the second scan order and the scan order prediction. This scan order adjustment parameter may be output as part of the bitstream. For example, the process 1700 of FIG. 17 may be modified such that determining 1730, based on the elements of the first group, the second scan order for the second group from the plurality of groups of elements includes determining a scan order prediction based on the elements of the first group; decoding, using the entropy decoder, data from the encoded bitstream to obtain a scan order adjustment parameter; and determining the second scan order based on the scan order prediction and the scan order adjustment parameter.

Some implementations may provide for embedded signaling of whether scan order adaptation is enabled. In some applications, flexibility to enable or disable scan order adaptation is advantageous. To implement a scan order adaptation enablement feature, a signaling scheme may be used to instruct the decoder to enable or disable scan order adaptation. Typically such a signaling scheme involves coding and sending a binary flag to the decoder. For example, suppose that the flag is named EnableScanOrderSelection. Then the scan order selection is enabled if EnableScanOrderSelection is set (i.e. equal to 1) and the scan order selection is disable if the flag is cleared (i.e. equal to 0).

Coding EnableScanOrderSelection adds additional bits to the coded bitstream and impacts compression performance. In some implementations, the processes described herein (e.g., the process 1600 of FIG. 16 and the process 1700 of FIG. 17) may be modified to embed signaling indicating whether scan order adaptation (e.g., as described in relation to FIGS. 15A-B, FIGS. 21A-B, or combinations of these schemes) is enabled or not. For example, let absSum denote the sum of absolute values of all quantized coefficients (available to both the encoder and the decoder) in the first group of elements of a block of image data. Then the parity of absSum may be used to signal whether scan order adaptation is enabled for the second group of elements of the block. In one example, if absSum is greater than or equal to a threshold (e.g., 2), and if absSum is even, then the scan order for the second group is determined as described in relation to FIGS. 21A-B; otherwise (i.e., if absSum is less than the threshold or if absSum is odd) the scan order for the second group is a default scan order (e.g., diagonal-right or zig-zag).

In the above examples, whether scan order adaptation is enabled or disabled is inferred from the values of the first group of elements (e.g., transform coefficients), and does not require additional bits in the coded bitstream. As such, such information may be regarded as being embedded in the coefficients at the possible cost of increased distortion.

The embedded coding to enable adaptation of the second scan order described above can be integrated with the process 1600 of FIG. 16 and the process 1700 of FIG. 17. For example, the process 1600 of FIG. 16 may be modified to include determining a sum of magnitudes of all the elements of the first group; checking a parity of the sum; and adjusting an element of the first group to change the parity of the sum to signal that use of the second scan order is enabled. For example, the process 1700 of FIG. 17 may be modified to include determining a sum of magnitudes of all the elements of the first group; checking a parity of the sum; and enabling use of the second scan order based on the parity of the sum.

In some implementations, the parity of absSum may be used to signal the scan order directly. For example, if absSum is even, the scan order for the second group is a default scan order (e.g., diagonal-right or zig-zag); and if absSum is odd, the scan order is an alternate scan order (e.g. diagonal-left, horizontal, or vertical). In addition, to allow for flexibility to disable such a signaling scheme, scan order inference based on absSum may be disabled if absSum is less than a prescribed a threshold and/or the number of nonzero coefficients in the first group of elements of a block of image data is less than a threshold.

To facilitate frequency band derivation in the presence of adaptive scan orders, where the same scan position may correspond to different block positions in different blocks, block positions (rather than scan positions) may be used in band derivation operations.

Coding efficiency for a block of image data may be improved by adapting context based on elements in a first group or subset of the block. Non-zero quantized transform (e.g., Discrete Cosine Transform) coefficients typically concentrate in the top left corner around the DC position. However, the exact locations of these non-zero coefficients are entropy coded and sent to the decoder. It may nevertheless be possible to shed light on where these non-zero coefficients will likely appear in a transform block if some values in the transformed block are already decoded and known, and leverage such knowledge to improve coding efficiency. Drawing inspiration from the idea of two-stage scan for adapting scan order, a context model is designed to adapt based on a subset of decoded coefficients in the block (e.g., block of quantized transform coefficients). This adaptive context model design may a refinement of a current context model (e.g. an AV1 or VP9 context model for coefficient coding).

Figure 23:
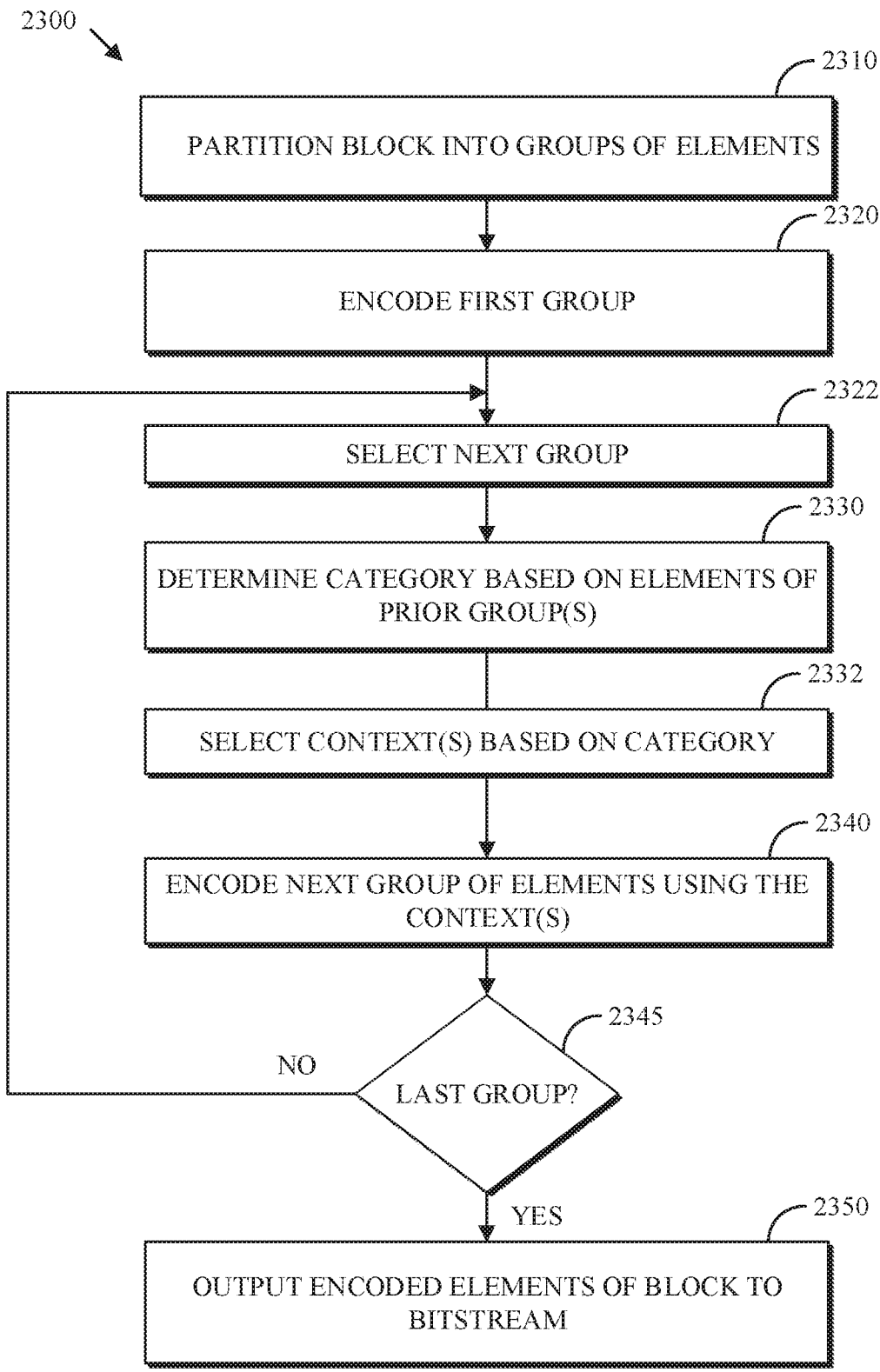
FIG. 23 is a flowchart of an example of a process for adapting context to encode a block of video data.

FIG. 23 is a flowchart of an example of a process 2300 for adapting context to encode a block of video data. The process 2300 includes partitioning 2310 a block of video data into a plurality of groups of elements; encoding 2320, using an entropy encoder, elements of a first group from the plurality of groups of elements; selecting 2322 a next group from the plurality of groups; determining 2330 a category based on the elements of the prior group(s); based on the category, selecting 2332 one or more contexts for elements from a next group from the plurality of groups of elements; encoding 2340, using the entropy encoder using the context(s), the elements of the next group from the plurality of groups of elements; and continuing (at 2345) to process any remaining groups from the plurality of groups until all groups have been encoded 2340 and then outputting 2350 the encoded elements of the block to a bitstream. For example, the process 2300 may be implemented by the entropy encoder 712. For example, the process 2300 may be implemented by the transmitting station 102. For example, the process 2300 may be implemented by a computing device, such as the computing device 200. For example, the process 2300 may be implemented by a software program including machine-readable instructions that can be stored in a memory such as the memory 204 or the secondary storage 214, and that can be executed by a processor, such as CPU 202, to cause a computing device to perform the process 2300. For example, the process 2300 may be implemented by an encoder such as the encoder 400 of FIG. 4. For example, the process 2300 may be implemented by the entropy encoding stage 408 of the encoder 400 of FIG. 4.

The process 2300 includes partitioning 2310 a block of video data into a plurality of groups of elements. The groups may be disjoint. The block may include a two-dimensional array of elements (e.g., a 4×4, 8×8, 16×16, 32×32, or any other square or rectangular block size). A group from the plurality of groups of elements may be continuous or discontinuous within the structure of the block. For example, the elements of the block may be pixel values (e.g., luminosity values). For example, the elements of the block may be quantized transform coefficients. For example, the elements of the block may be quantized transform coefficients of a residual block (e.g., a residual block resulting from intra-frame prediction or a residual block resulting from inter-frame prediction). For example, the elements of the block may be based on a result of inter-frame prediction. For example, the block may be a residual block resulting from inter-frame prediction. For example, the elements of the block may be based on a result of intra-frame prediction. For example, the block may be a residual block resulting from intra-frame prediction. In some implementations, the elements of the block each represent a sub-block of quantized transform coefficients. In some implementations, the plurality of groups includes two groups (e.g., as shown in the examples of FIGS. 15A-B, FIGS. 21A-B, FIG. 22A or FIG. 22B). For example, a first group may include elements of a first row of the block and elements of a first column of the block. In some implementations, the first group includes elements forming a triangle in a corner of the block, and wherein the triangle includes elements of a first row of the block and elements of a first column of the block (e.g., as shown in the examples of FIGS. 21A-B, FIG. 22A or FIG. 22B). In some implementations, the first group includes elements of a first row of the block that are outside of the triangle and elements of a first column of the block that are outside of the triangle (e.g., as shown in the examples of FIG. 22A or FIG. 22B). For example, a shape of the first group may be selected based on a size of the block (e.g., as described in relation to Table 2). For example, a second group may include all remaining elements of the block outside of the first group. In some implementations, the plurality of groups includes more than two groups of elements.

The process 2300 includes encoding 2320, using an entropy encoder, elements of a first group from the plurality of groups of elements. For example, the first group of elements may be encoded using a default or initial scan order that a compatible entropy decoder is configured to use to decode elements of the first group for the block. For example, the first scan order may be a zig-zag order (e.g., as shown in FIG. 15A) or an alternating diagonal order (e.g., as shown in FIG. 21A). For example, the entropy encoder may employ entropy encoding techniques such as, for example, variable length coding (VLC), context adaptive binary arithmetic coding (CABAC), or context adaptive (multi-symbol) arithmetic coding.

The process 2300 includes selecting 2322 a next group (e.g., a second group) from the plurality of groups of elements of the block.

The process 2300 includes determining 2330 a category based on the elements of one or more prior groups (e.g., based on the elements of the first group). The category may be used to select 2332 a context for encoding one or more elements of a subsequent group (e.g., a second group) of elements of the block. For example, the category may correspond a spatial distribution of element values of the block and/or to a scan order that may be used for one or more subsequent groups of elements of the block. In some implementations, the category is one of horizontal, vertical, diagonal-left, and diagonal-right (e.g., as illustrated in FIG. 21A). For example, the category may be determined 2330 based on a distribution of non-zero elements (e.g., quantized transform coefficients of a residual block) within the first group of elements of the block. For example, the category order may be determined 2330 based on a distribution of non-zero elements within a union of prior groups). For example, the process 2500 of FIG. 25A may be implemented to determine 2330 the category. For example, the process 2550 of FIG. 25B may be implemented to determine 2330 the category. In some implementations, the process 2300 includes determining, based on the category, a scan order for the second group from the plurality of groups of elements. In some implementations, a process similar to the process 1800 of FIG. 18A may be used to determine 2430 the category. For example, determining 2430 the category may include determining a first sum of magnitudes of elements in a portion of a first row of the block; determining a second sum of magnitudes of elements in a portion of a first column of the block; and responsive to the first sum being positive and the second sum being zero, determine the category to be a value corresponding to a horizontal scan order. In some implementations, a process similar to the process 1840 of FIG. 18B may be used to determine 2430 the category. For example, determining 2430 the category may include determining a first count of non-zero elements in a portion of a first row of the block; determining a second count of non-zero elements in a portion of a first column of the block; and responsive to the first count being zero and the second count being positive, determine the category to be a value corresponding to a vertical scan order.

For example, the category may be determined 2330 using the following technique: Let u[i, j] denote a coefficient at block position (i, j) in a block (e.g., a transform block) of size N×N, where i=0, . . . , N−1 and j=0, . . . , N−1. Suppose that the block is partitioned into two groups of elements as in FIGS. 15A-B, FIGS. 21A-B, FIG. 22A or FIG. 22B. Then the category is determined 2330 by 1.) Compute cSum=c[L]+ . . . +c[N−1-K] and rSum=r[L]+ . . . +r[N−1-K], where L<N and K<N are non-negative constants.
2.) Then derive a category t from {0, 1, 2, 3}.
   if rSum>cSum and cSum==0, set t=1;
   if rSum>cSum and cSum>0, set t=3;
   if rSum<=cSum and rSum==0, set t=2;
   otherwise, set t=0;

The category values may correspond to scan orders and may be used to select both scan orders and contexts for elements of the second group of elements of the block. For example, t=0 may correspond to a diagonal-right scan order, t=1 may correspond to a horizontal scan order, t=2 may correspond to a vertical scan order, and t=3 may correspond to a diagonal-left scan order. In some implementations, the rSum and cSum that are used to determine 2330 the category, may be determined according to Equation (13) above. For example, these sums may be sums of magnitudes of the respective elements or counts of binary indicators of whether a respective element has a non-zero value.

The process 2300 includes based on the category, selecting 2332 a context for an element from a second group from the plurality of groups of elements. In some implementations, all the elements in the second group will be encoded with a single context that is selected 2332 based on the category. In some implementations, individual elements in the second group have position dependent contexts for decoding that are selected 2332 based on the category. For example an entropy encoder may be configured to use a context from a table of contexts (e.g., including 18 or 72 contexts) shared with a matching decoder. An index to this table used to select one of the contexts for decoding an element of the block may be modified based on the category determined 2330 based on elements of the first group of elements. Suppose now that to encode u[i, j] or a syntax element like whether u[i,j]==0 that is derived from u[i,j], a default context Ctx[i,j] is derived by using an existing context (e.g., a VP9 context model for coefficient coding). Then a new context is determined based on the default context for the element and the category t that has been determined 2330 for the block. For example, the context may be selected 2332 according to: Ctx_new[i, j]=f(Ctx[i,j], i, j, t) where f is a mapping satisfying the constraint: f(x,i, j, t)≠f(x,i,j,t') for at least one three-tuple (x, i, j), and a distinct pair (t, t') where 0≤t<t'≤3. Examples of function f include f(x,i, j, t)=x*4+t and f(x,i,j,t)=t*W+x, where W is the number of distinct values that Ctx[i,j] may take. Note that in the above, x might depend upon (i, j). In some implementations, to alleviate the so-called context dilution problem caused by having too many distinct contexts, the proposed design may impose the following constraint on the function f. f(x,i, j, t=1)=f(x, j, i, t=2) and/or f(x,i, j, t=0)=f(x, j, i, t=3).

The process 2300 includes encoding 2340, using the entropy encoder using the context, the element of the next group (e.g., the second group) from the plurality of groups of elements. For example, the entropy encoder may employ entropy encoding techniques such as, for example, variable length coding (VLC), context adaptive binary arithmetic coding (CABAC), or context adaptive (multi-symbol) arithmetic coding. In some implementations, by adapting the context used for elements of the next group, the coding efficiency of the entropy encoder may be improved.

In some implementations, encoding 2340 of elements of the next group (e.g., the second group) uses a scan order that has determined based on the category. For example, the process 2300 may include encoding, using the entropy encoder using the scan order, elements of the second group from the plurality of groups of elements. For example, the scan order may be a horizontal scan order, a vertical scan order, a diagonal-right scan order, a diagonal-left scan order, a zig-zag scan order, etc. (e.g., as shown in FIG. 15A or FIG. 21A).

If (at 2345) the last group from the plurality of groups of elements of the block has not yet been encoded, then the next group is selected 2322 and the processing of groups continues to encode remaining elements of the block.

When (at 2345) the last group from the plurality of groups of elements of the block has been encoded, the encoded elements of the block are output 2350 to an encoded bitstream. For example, the encoded elements may be output from the entropy encoder 712 through the multiplexer 718 to be included in the bitstream 720 that bears a video signal including the block. In some implementations, the bitstream may be stored (e.g., in memory or on a disk) or transmitted (e.g., via network communication link). In some implementations (not shown), encoded elements may be output to an encoded bitstream as they become available.

Figure 24:
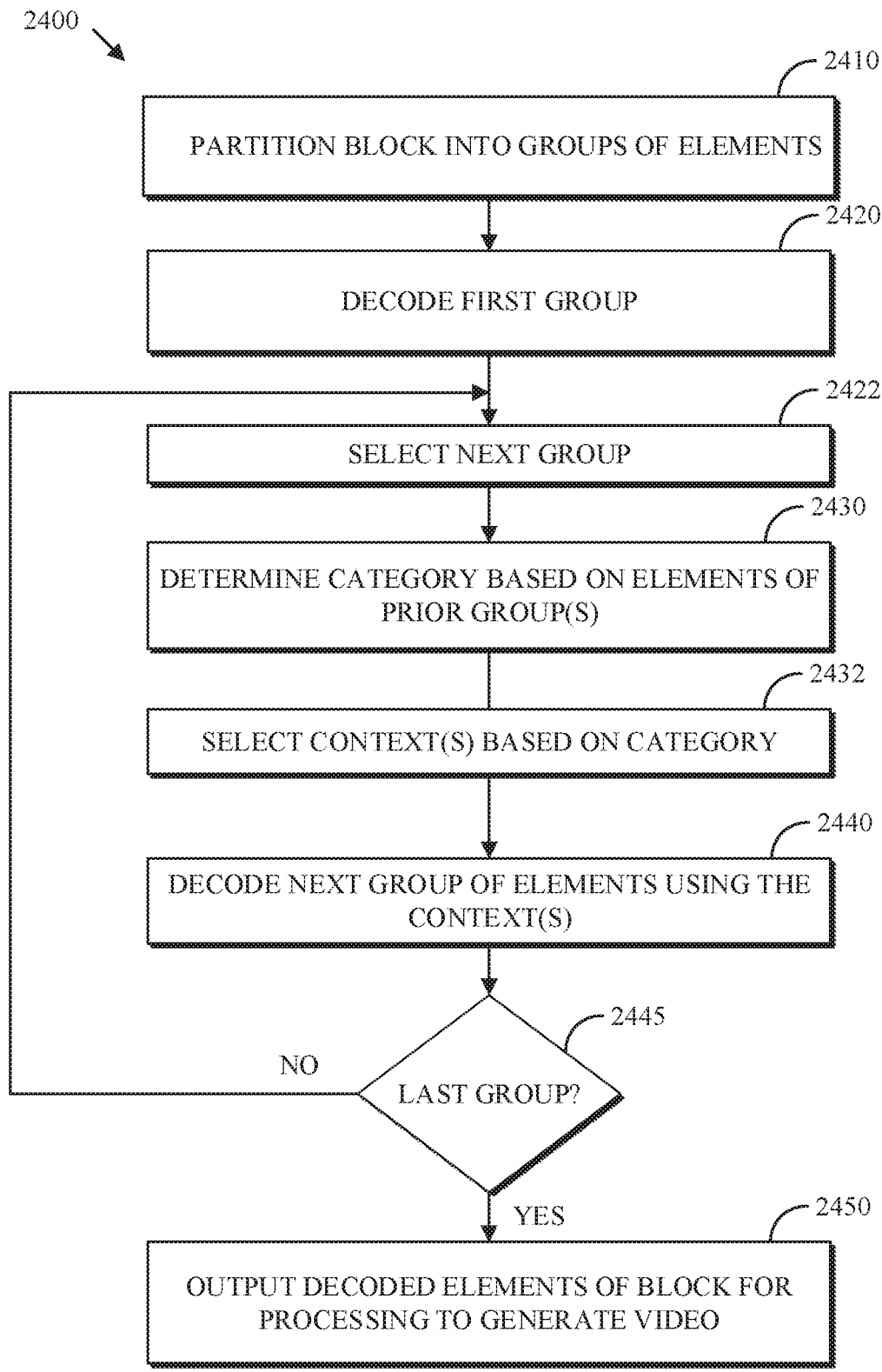
FIG. 24 is a flowchart of an example of a process for adapting context to decode a block of video data.

FIG. 24 is a flowchart of an example of a process 2400 for adapting context to decode a block of video data. The process 2400 includes partitioning 2410 a block of video data into a plurality of groups of elements; decoding 2420, using an entropy decoder, data from an encoded bitstream to obtain elements of a first group from the plurality of groups of elements; selecting 2422 a next group from the plurality of groups; determining 2430 a category based on the elements of the prior group(s); based on the category, selecting 2432 one or more contexts for elements from the next group from the plurality of groups of elements; decoding 2440, using the entropy decoder using the context(s), data from the encoded bitstream to obtain the elements of the next group from the plurality of groups of elements; and continuing (at 2445) to process any remaining groups from the plurality of groups until all groups have been decoded 2440 and then outputting 2450 the decoded elements of the block for processing to generate video. For example, the process 2400 may be implemented by the entropy decoder 756. For example, the process 2400 may be implemented by the receiving station 106. For example, the process 2400 may be implemented by a computing device, such as the computing device 200. For example, the process 2400 may be implemented by a software program including machine-readable instructions that can be stored in a memory such as the memory 204 or the secondary storage 214, and that can be executed by a processor, such as CPU 202, to cause a computing device to perform the process 2400. For example, the process 2400 may be implemented by a decoder such as the decoder 500 of FIG. 5. For example, the process 2400 may be implemented by the entropy decoding stage 502 of the decoder 500 of FIG. 5.

The process 2400 includes partitioning 2410 a block of video data into a plurality of groups of elements. The groups may be disjoint. The block may include a two-dimensional array of elements (e.g., a 4×4, 8×8, 16×16, 32×32, or any other square or rectangular block size). A group from the plurality of groups of elements may be continuous or discontinuous within the structure of the block. For example, the elements of the block may be pixel values (e.g., luminosity values). For example, the elements of the block may be quantized transform coefficients. For example, the elements of the block may be quantized transform coefficients of a residual block (e.g., a residual block resulting from intra-frame prediction or a residual block resulting from inter-frame prediction). For example, the elements of the block may be based on a result of inter-frame prediction. For example, the block may be a residual block resulting from inter-frame prediction. For example, the elements of the block may be based on a result of intra-frame prediction. For example, the block may be a residual block resulting from intra-frame prediction. In some implementations, the elements of the block each represent a sub-block of quantized transform coefficients. In some implementations, the plurality of groups includes two groups (e.g., as shown in the examples of FIGS. 15A-B, FIGS. 21A-B, FIG. 22A or FIG. 22B). For example, a first group may include elements of a first row of the block and elements of a first column of the block. In some implementations, the first group includes elements forming a triangle in a corner of the block, and wherein the triangle includes elements of a first row of the block and elements of a first column of the block (e.g., as shown in the examples of FIGS. 21A-B, FIG. 22A or FIG. 22B). In some implementations, the first group includes elements of a first row of the block that are outside of the triangle and elements of a first column of the block that are outside of the triangle (e.g., as shown in the examples of FIG. 22A or FIG. 22B). For example, a shape of the first group may be selected based on a size of the block (e.g., as described in relation to Table 2). For example, a second group may include all remaining elements of the block outside of the first group. In some implementations, the plurality of groups includes more than two groups of elements.

The process 2400 includes decoding 2420, using an entropy decoder, data from an encoded bitstream to obtain elements of a first group from the plurality of groups of elements. For example, the first group of elements may be decoded using a default or initial scan order that a compatible entropy encoder is configured to use to encode elements of the first group for the block. For example, the first scan order may be a zig-zag order (e.g., as shown in FIG. 15A) or an alternating diagonal order (e.g., as shown in FIG. 21A). For example, the entropy decoder may employ entropy decoding techniques such as, for example, variable length coding (VLC), context adaptive binary arithmetic coding (CABAC), or context adaptive (multi-symbol) arithmetic coding.

The process 2400 includes selecting 2422 a next group (e.g., a second group) from the plurality of groups of elements of the block.

The process 2400 includes determine 2430 a category based on the elements of one or more prior groups (e.g., based on the elements of the first group). The category may be used to select 2432 a context for decoding one or more elements of a subsequent group (e.g., a second group) of elements of the block. For example, the category may correspond a spatial distribution of element values of the block and/or to a scan order that may be used for one or more subsequent groups of elements of the block. In some implementations, the category is one of horizontal, vertical, diagonal-left, and diagonal-right (e.g., as illustrated in FIG. 21A). For example, the category may be determined 2430 based on a distribution of non-zero elements (e.g., quantized transform coefficients of a residual block) within the first group of elements of the block. For example, the category order may be determined 2430 based on a distribution of non-zero elements within a union of prior groups). For example, the process 2500 of FIG. 25A may be implemented to determine 2430 the category. For example, the process 2550 of FIG. 25B may be implemented to determine 2430 the category. In some implementations, the process 2400 includes determining, based on the category, a scan order for the second group from the plurality of groups of elements. In some implementations, a process similar to the process 1800 of FIG. 18A may be used to determine 2430 the category. For example, determining 2430 the category may include determining a first sum of magnitudes of elements in a portion of a first row of the block; determining a second sum of magnitudes of elements in a portion of a first column of the block; and responsive to the first sum being positive and the second sum being zero, determine the category to be a value corresponding to a horizontal scan order. In some implementations, a process similar to the process 1840 of FIG. 18B may be used to determine 2430 the category. For example, determining 2430 the category may include determining a first count of non-zero elements in a portion of a first row of the block; determining a second count of non-zero elements in a portion of a first column of the block; and responsive to the first count being zero and the second count being positive, determine the category to be a value corresponding to a vertical scan order.

For example, the category may be determined 2430 using the following technique: Let u[i, j] denote a coefficient at block position (i, j) in a block (e.g., a transform block) of size N×N, where i=0, . . . , N−1 and j=0, . . . , N−1. Suppose that the block is partitioned into two groups of elements as in FIGS. 15A-B, FIGS. 21A-B, FIG. 22A or FIG. 22B. Then the category may be determined 2430 by 3.) Compute cSum=c[L]+ . . . +c[N−1−K] and rSum=r[L]+ . . . +r[N−1−K], where L<N and K<N are non-negative constants.
4.) Then derive a category t from {0, 1, 2, 3}.
   if rSum>cSum and cSum==0, set t=1;
   if rSum>cSum and cSum>0, set t=3;
   if rSum<=cSum and rSum==0, set t=2;
   otherwise, set t=0;

The category values may correspond to scan orders and may be used to select both scan orders and contexts for elements of the second group of elements of the block. For example, t=0 may correspond to a diagonal-right scan order, t=1 may correspond to a horizontal scan order, t=2 may correspond to a vertical scan order, and t=3 may correspond to a diagonal-left scan order. In some implementations, the rSum and cSum that are used to determine 2430 the category, may be determined according to Equation (13) above. For example, these sums may be sums of magnitudes of the respective elements or counts binary indicators of whether a respective element has a non-zero value.

The process 2400 includes based on the category, selecting 2432 a context for an element from a second group from the plurality of groups of elements. In some implementations, all the elements in the second group will be decoded with a single context that is selected 2432 based on the category. In some implementations, individual elements in the second group have position dependent contexts for decoding that are selected 2432 based on the category. For example an entropy decoder may be configured to use a context from a table of contexts (e.g., including 18 or 72 contexts) shared with a matching encoder. An index to this table used to select one of the contexts for decoding an element of the block may be modified based on the category determined 2430 based on elements of the first group of elements. Suppose now that to decode u[i, j] or a syntax element like whether u[i,j]==0 that is derived from u[i,j], a default context Ctx[i,j] is derived by using an existing context (e.g., a VP9 context model for coefficient coding). Then a new context is determined based on the default context for the element and the category t that has been determined 2430 for the block. For example, the context may be selected 2432 according to: Ctx_new[i, j]=f(Ctx[i,j], i, j, t) where f is a mapping satisfying the constraint: $f(x,i, j, t) \neq f(x,i,j,t')$ for at least one three-tuple (x, i, j), and a distinct pair (t, t') where $0 \leq t < t' \leq 3$. Examples of function f include $f(x,i, j, t)=x*4+t$ and $f(x,i,j,t)=t*W+x$, where W is the number of distinct values that Ctx[i,j] may take. Note that in the above, x might depend upon (i, j). In some implementations, to alleviate the so-called context dilution problem caused by having too many distinct contexts, the proposed design may impose the following constraint on the function f. $f(x,i, j, t=1)=f(x, j, i, t=2)$ and/or $f(x,i, j, t=0)=f(x, j, i, t=3)$.

The process 2400 includes decoding 2440, using the entropy decoder using the context, data from the encoded bitstream to obtain the element of the next group (e.g., the second group) from the plurality of groups of elements. For example, the entropy decoder may employ entropy decoding techniques such as, for example, variable length coding (VLC), context adaptive binary arithmetic coding (CABAC), or context adaptive (multi-symbol) arithmetic coding. In some implementations, by adapting the context used for elements of the next group, the coding efficiency of the entropy decoder may be improved.

In some implementations, decoding 2440 of elements of the next group (e.g., the second group) uses a scan order that has determined based on the category. For example, the process 2400 may include decoding, using the entropy decoder, data from the encoded bitstream to obtain, using a scan order, elements of the second group from the plurality of groups of elements. For example, the scan order may be a horizontal scan order, a vertical scan order, a diagonal-right scan order, a diagonal-left scan order, a zig-zag scan order, etc. (e.g., as shown in FIG. 15A or FIG. 21A).

If (at 2445) the last group from the plurality of groups of elements of the block has not yet been decoded, then the next group is selected 2422 and the processing of groups continues to decode remaining elements of the block.

When (at 2445) the last group from the plurality of groups of elements of the block has been decoded, the decoded elements of the block are output 2450 for processing to generate video. For example, the decoded elements may be output 2450 from the entropy decoder 756 through the inverse quantization/transform 760 and used to generate the reconstructed block 764 that forms part of a video. In some implementations, the resulting video may be stored (e.g., in the memory 204 or the secondary storage 214), transmitted (e.g., via a network communication link), or displayed (e.g., in a user interface, such as on screen or a projection). For example, the process 2400 may include displaying video that is generated based in part on decoded elements of the block (e.g., where the elements of the block are quantized transform coefficients of a residual block).

FIG. 25A is a flowchart of an example of a process 2500 for determining a category for a block based on a subset of elements of the block of image data. The process 2500 includes determining 2510 a first sum of magnitudes of elements in a portion of the first group below a main diagonal of the block and at or above an anti-diagonal of the block; determining 2512 a second sum of magnitudes of elements in a portion of the first group above the main diagonal of the block and at or above the anti-diagonal of the block; and determining 2520 the category based on the first sum and the second sum. The same process 2500 may be used for determining a category in both an encoder and a compatible decoder. For example, the process 2500 may be implemented by the entropy encoder 712 or the entropy decoder 756. For example, the process 2500 may be implemented by the transmitting station 102 or the receiving station 106. For example, the process 2500 may be implemented by a computing device, such as the computing device 200. For example, the process 2500 may be implemented by a software program including machine-readable instructions that can be stored in a memory such as the memory 204 or the secondary storage 214, and that can be executed by a processor, such as CPU 202, to cause a computing device to perform the process 2500. For example, the process 2500 may be implemented by a decoder such as the decoder 500 of FIG. 5. For example, the process 2500 may be implemented by an encoder such as the encoder 400 of FIG. 4. For example, the process 2500 may be implemented by the entropy encoding stage 408 of the encoder 400 of FIG. 4. For example, the process 2500 may be implemented by the entropy decoding stage 502 of the decoder 500 of FIG. 5.

For example, a first sum of magnitudes of elements in a portion of the first group below a main diagonal of the block and at or above an anti-diagonal of the block may be determined 2510 as cSum according to Equation (13). For example, a second sum of magnitudes of elements in a portion of the first group above the main diagonal of the block and at or above the anti-diagonal of the block may be determined 2512 as rSum according to Equation (13).

Figure 25B:
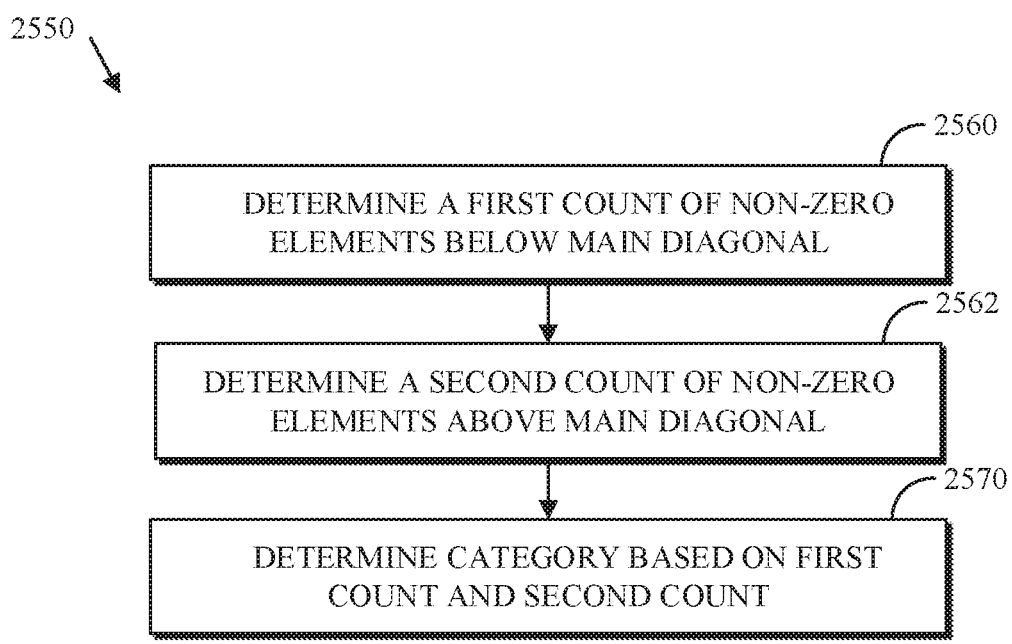
FIG. 25B is a flowchart of an example of a process for determining a category for a block based on a subset of elements of the block of image data.

The process 2500 includes determining 2520 the category based on the first sum and the second sum. For example, the category may be determined by comparing the first sum and the second sum to each other and/or to zero. For example, the category t may be determined 2570 according to:
 if Sum_2>Sum_1 and Sum_1==0, set t=1;
 if Sum_2>Sum_1 and Sum_1>0, set t=3;
 if Sum_2<=Sum_1 and Sum_2==0, set t=2;
 otherwise, set t=0;

FIG. 25B is a flowchart of an example of a process 2550 for determining a category for a block based on a subset of elements of the block of image data. The process 2550 includes determining 2560 a first count of non-zero elements in a portion of the first group below a main diagonal of the block and at or above an anti-diagonal of the block; determining 2562 a second count of non-zero elements in a portion of the first group above the main diagonal of the block and at or above the anti-diagonal of the block; and determining 2570 the category based on the first count and the second count. The same process 2500 may be used for determining a category in both an encoder and a compatible decoder. For example, the process 2500 may be implemented by the entropy encoder 712 or the entropy decoder 756. For example, the process 2500 may be implemented by the transmitting station 102 or the receiving station 106. For example, the process 2500 may be implemented by a computing device, such as the computing device 200. For example, the process 2500 may be implemented by a software program including machine-readable instructions that can be stored in a memory such as the memory 204 or the secondary storage 214, and that can be executed by a processor, such as CPU 202, to cause a computing device to perform the process 2500. For example, the process 2500 may be implemented by a decoder such as the decoder 500 of FIG. 5. For example, the process 2500 may be implemented by an encoder such as the encoder 400 of FIG. 4. For example, the process 2500 may be implemented by the entropy encoding stage 408 of the encoder 400 of FIG. 4. For example, the process 2500 may be implemented by the entropy decoding stage 502 of the decoder 500 of FIG. 5.

For example, a first count of non-zero elements in a portion of the first group below a main diagonal of the block and at or above an anti-diagonal of the block may be determined 2560 as cSum according to Equation (13). For example, a second count of non-zero elements in a portion of the first group above the main diagonal of the block and at or above the anti-diagonal of the block may be determined 2562 as rSum according to Equation (13).

The process 2550 includes determining 2570 the category based on the first count and the second count. For example, the category may be determined by comparing the first count and the second count to each other and/or to zero. For example, the category t may be determined 2570 according to:
 if Count_2>Count_1 and Count_1==0, set t=1;
 if Count_2>Count_1 and Count_1>0, set t=3;
 if Count_2<=Count_1 and Count_2==0, set t=2;
 otherwise, set t=0;

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A system for decoding video, comprising:
a memory; and
a processor, wherein the memory stores instructions executable by the processor to cause the system to:
partition a block of video data into a plurality of groups of elements;
decode, using an entropy decoder, data from an encoded bitstream to obtain, using a first scan order, elements of a first group from the plurality of groups of elements, wherein the first group includes elements forming a triangle in a corner of the block, and wherein the triangle includes elements of a first row of the block and elements of a first column of the block;
determine, based on the elements of the first group, a second scan order, from a plurality of scan orders, for a second group from the plurality of groups of elements, wherein the plurality of scan orders includes at least one scan order that differs from the first scan order with respect to the first group, wherein, to determine the second scan order, the processor executes the instructions to:
determine a scan order prediction based on the elements of the first group;
decode, using the entropy decoder, data from the encoded bitstream to obtain a scan order adjustment parameter; and
determine the second scan order based on the scan order prediction and the scan order adjustment parameter; and
decode, using the entropy decoder, data from the encoded bitstream to obtain, using the second scan order, elements of the second group from the plurality of groups of elements.

2. The system of claim 1, wherein the elements of the block are quantized transform coefficients.

3. The system of claim 1, wherein the first group includes at least one element from:
the first row outside of the triangle;
the first column outside of the triangle; or
the block outside the first row and outside the first column.

4. The system of claim 1, wherein a shape of the first group is selected based on a size of the block.

5. The system of claim 1, wherein the memory stores instructions executable by the processor to cause the system to:
determine a sum of magnitudes of all the elements of the first group;
check a parity of the sum; and
enable use of the second scan order based on the parity of the sum.

6. The system of claim 1, wherein the instructions for determining, based on the elements of the first group, the second scan order for the second group from the plurality of groups of elements include instructions executable by the processor to cause the system to:
determine a first count of non-zero elements in a portion of the first group below a main diagonal of the block and at or above an anti-diagonal of the block;
determine a second count of non-zero elements in a portion of the first group above the main diagonal of the block and at or above the anti-diagonal of the block; and
determine the second scan order based on the first count and the second count.

7. The system of claim 1, wherein the instructions for determining, based on the elements of the first group, the second scan order for the second group from the plurality of groups of elements include instructions executable by the processor to cause the system to:
determine a first sum of magnitudes of elements in a portion of the first group below a main diagonal of the block and at or above an anti-diagonal of the block;
determine a second sum of magnitudes of elements in a portion of the first group above the main diagonal of the block and at or above the anti-diagonal of the block; and
determine the second scan order based on the first sum and the second sum.

8. A method for decoding video comprising:
partitioning a block of video data into a plurality of groups of elements;

decoding, using an entropy decoder, data from an encoded bitstream to obtain, using a first scan order, elements of a first group from the plurality of groups of elements, wherein the first group includes elements forming a triangle in a corner of the block, and wherein the triangle includes elements of a first row of the block and elements of a first column of the block;

determining, based on the elements of the first group, a second scan order, from a plurality of scan orders, for a second group from the plurality of groups of elements, wherein the plurality of scan orders includes at least one scan order that differs from the first scan order with respect to the first group, wherein determining the second scan order includes:

determining a scan order prediction based on the elements of the first group;

decoding, using the entropy decoder, data from the encoded bitstream to obtain a scan order adjustment parameter; and determining the second scan order based on the scan order prediction and the scan order adjustment parameter; and decoding, using the entropy decoder, data from the encoded bitstream to obtain, using the second scan order, elements of the second group from the plurality of groups of elements.

9. The method of claim 8, wherein the elements of the block are quantized transform coefficients.

10. The method of claim 8, wherein the first group includes at least one element from:
the first row outside of the triangle;
the first column outside of the triangle; or
the block outside the first row and outside the first column.

11. The method of claim 8, wherein determining, based on the elements of the first group, the second scan order for the second group from the plurality of groups of elements comprises:

determining a scan order prediction based on the elements of the first group;

decoding, using the entropy decoder, data from the encoded bitstream to obtain a scan order adjustment parameter; and determining the second scan order based on the scan order prediction and the scan order adjustment parameter.

12. The method of claim 8, wherein determining, based on the elements of the first group, the second scan order for the second group from the plurality of groups of elements comprises:

determining a first count of non-zero elements in a portion of the first group below a main diagonal of the block and at or above an anti-diagonal of the block;

determining a second count of non-zero elements in a portion of the first group above the main diagonal of the block and at or above the anti-diagonal of the block; and determining the second scan order based on the first count and the second count.

13. The method of claim 8, wherein determining, based on the elements of the first group, the second scan order for the second group from the plurality of groups of elements comprises:

determining a first sum of magnitudes of elements in a portion of the first group below a main diagonal of the block and at or above an anti-diagonal of the block;

determining a second sum of magnitudes of elements in a portion of the first group above the main diagonal of the block and at or above the anti-diagonal of the block; and determining the second scan order based on the first sum and the second sum.

14. A system for encoding video, comprising:
a memory; and
a processor, wherein the memory stores instructions executable by the processor to cause the system to:

partition a block of video data into a plurality of groups of elements;

encode, using an entropy encoder using a first scan order, elements of a first group from the plurality of groups of elements, wherein the first group includes elements forming a triangle in a corner of the block, and wherein the triangle includes elements of a first row of the block and elements of a first column of the block;

determine, based on the elements of the first group, a second scan order, from a plurality of scan orders, for a second group from the plurality of groups of elements, wherein the plurality of scan orders includes at least one scan order that differs from the first scan order with respect to the first group, wherein, to determine the second scan order the memory stores instructions executable by the processor to cause the system to:

determine a scan order prediction based on the elements of the first group; and encode, using the entropy encoder, a scan order adjustment parameter that is based on the second scan order and the scan order prediction; and encode, using the entropy encoder using the second scan order, elements of the second group from the plurality of groups of elements.

15. The system of claim 14, wherein the first group includes at least one element from:
the first row outside of the triangle;
the first column outside of the triangle; or
the block outside the first row and outside the first column.

16. The system of claim 14, wherein the memory stores instructions executable by the processor to cause the system to:

determine a sum of magnitudes of all the elements of the first group;

check a parity of the sum; and adjust an element of the first group to change the parity of the sum to signal that use of the second scan order is enabled.

17. The system of claim 14, wherein the instructions for determining, based on the elements of the first group, the second scan order for the second group from the plurality of groups of elements include instructions executable by the processor to cause the system to:

determine a first count of non-zero elements in a portion of the first group below a main diagonal of the block and at or above an anti-diagonal of the block;

determine a second count of non-zero elements in a portion of the first group above the main diagonal of the block and at or above the anti-diagonal of the block; and determine the second scan order based on the first count and the second count.

* * * * *